United States Patent
Lee et al.

(10) Patent No.: US 11,228,783 B2
(45) Date of Patent: *Jan. 18, 2022

(54) IMAGE DECODING METHOD AND APPARATUS BASED ON MOTION PREDICTION IN SUB-BLOCK UNIT IN IMAGE CODING SYSTEM

(71) Applicant: LG ELECTRONICS INC., Seoul (KR)

(72) Inventors: Jaeho Lee, Seoul (KR); Junghak Nam, Seoul (KR); Naeri Park, Seoul (KR); Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/124,231

(22) Filed: Dec. 16, 2020

(65) Prior Publication Data

US 2021/0144399 A1 May 13, 2021

Related U.S. Application Data

(63) Continuation of application No. 16/836,248, filed on Mar. 31, 2020, now Pat. No. 10,904,561, which is a
(Continued)

(51) Int. Cl.
*H04N 19/52* (2014.01)
*H04N 19/119* (2014.01)
*H04N 19/176* (2014.01)

(52) U.S. Cl.
CPC ........... *H04N 19/52* (2014.11); *H04N 19/119* (2014.11); *H04N 19/176* (2014.11)

(58) Field of Classification Search
None
See application file for complete search history.

(56) References Cited

U.S. PATENT DOCUMENTS

| 2016/0219278 A1 | 7/2016 | Chen et al. |
| 2017/0332095 A1 | 11/2017 | Zou ...................... H04N 19/513 |

(Continued)

FOREIGN PATENT DOCUMENTS

| KR | 1020180006961 A | 1/2018 |
| WO | 2017200771 A1 | 11/2017 |
| WO | 2018067823 A1 | 4/2018 |

OTHER PUBLICATIONS

JVET-K0337: Han et al., Joint Video Exploration Team (JVET) of ITU-T SG 16 WP 3 and ISO/IEC JTC 1/SC 29/WG 11, "CE4.1.3: Affine motion compensation prediction," 11th meeting, Ljublijana, SI, Jul. 10-18, 2018 (6 Pages).

(Continued)

*Primary Examiner* — Samuel D Fereja
(74) *Attorney, Agent, or Firm* — Dentons US LLP

(57) ABSTRACT

An image decoding method according to the present document includes obtaining motion prediction information for a current block from a bitstream, generating an affine MVP candidate list for the current block, deriving CPMVPs for CPs of the current block based on the affine MVP candidate list, deriving CPMVDs for the CPs of the current block based on the motion prediction information, deriving CPMVs for the CPs of the current block based on the CPMVPs and the CPMVDs, and deriving prediction samples for the current block based on the CPMVs.

12 Claims, 29 Drawing Sheets

Related U.S. Application Data continuation of application No. PCT/KR2019/011827, filed on Sep. 11, 2019.

(60) Provisional application No. 62/730,528, filed on Sep. 12, 2018.

(56) References Cited

U.S. PATENT DOCUMENTS

| | | |
|---|---|---|
| 2018/0098063 A1 | 4/2018 | Chen .................. H04N 19/176 |
| 2018/0220149 A1 | 8/2018 | Son et al. |

OTHER PUBLICATIONS

JVET-K1024-V2: CE coorinators. Joint Video Exploration Team (JVET) of ITU-T SG 16 WP 3 and ISO/IEC JTC 1/SC 29/WG 11, "Description of Core Experiment 4 (CE4): Inter prediction and motion vector coding," 11th meeting, Ljublijana, SI, Jul. 10 -18, 2018 (45 Pages).

JVET-K0185-V3: Chen et al., Joint Video Exploration Team (JVET) of ITU-T SG 16 WP 3 and ISO/IEC JTC 1/SC 29/WG 11, "CE4: Affine iner prediction (Test 1.5)," 11th meeting, Ljublijana, SI, Jul. 10-18, 2018 (15 Pages).

FIG. 7
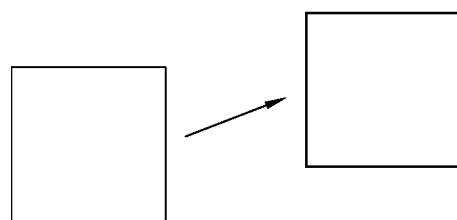
Translate
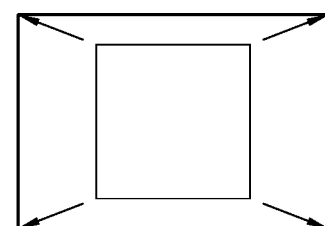
Scale
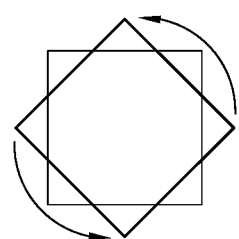
Rotate
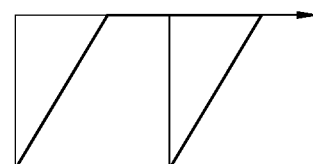
Shear ns. No. 16/836,248, filed on Mar. 31, 2020, now allowed, which is a continuation of International Application No. PCT/KR2019/011827, filed on Sep. 11, 2019, which claims the benefit of U.S. Provisional Application No. 62/730,528, filed on Sep. 12, 2018, the contents of which are hereby incorporated by reference herein in their entirety.

IMAGE DECODING METHOD AND APPARATUS BASED ON MOTION PREDICTION IN SUB-BLOCK UNIT IN IMAGE CODING SYSTEM

CROSS-REFERENCE TO RELATED APPLICATIONS

This application is a continuation of U.S. patent application Ser. No. 16/836,248, filed on Mar. 31, 2020, now allowed, which is a continuation of International Application No. PCT/KR2019/011827, filed on Sep. 11, 2019, which claims the benefit of U.S. Provisional Application No. 62/730,528, filed on Sep. 12, 2018, the contents of which are hereby incorporated by reference herein in their entirety.

BACKGROUND OF THE DISCLOSURE

Field of the Disclosure

The present document relates to an image coding technique, and more particularly, to an image decoding method and apparatus based on motion prediction using a motion candidate list for deriving motion information of a subblock unit in an image coding system.

Related Art

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), and artificial reality (AR) contents or holograms, or the like is increasing, and broadcasting for images/videos having image features different from a real image, such as a game image, is increasing.

Accordingly, there is a need for a highly efficient image/video compression technique for effectively compressing and transmitting or storing, and reproducing information of high resolution and high quality images/videos having various features as described above.

SUMMARY

A technical problem to be addressed in the present document lies in providing a method and an apparatus which increase image coding efficiency.

Another technical problem to be addressed in the present document lies in providing an image decoding method and apparatus which configure an affine MVP candidate list of the current block by deriving a constructed affine MVP candidate based on a neighboring block only when all candidate motion vectors for CPs are available, and perform prediction for the current block based on the configured affine MVP candidate list.

Another technical problem to be addressed in the present document lies in providing an image decoding method and apparatus which derive an affine MVP candidate using a candidate motion vector that has been derived in a process of deriving the constructed affine MVP candidate, as an added affine MVP candidate when the number of available inherited affine MVP candidates and constructed affine MVP candidates is less than the maximum number of candidates of a MVP candidate list, and which perform prediction for the current block based on the configured affine MVP candidate list.

According to an example of the present document, there is provided an image decoding method, by a decoding apparatus, comprising: obtaining motion prediction information for a current block from a bitstream; configuring an affine motion vector predictor (MVP) candidate list for the current block; deriving control point motion vector predictors (CPMVPs) for control points (CPs) of the current block based on the affine MVP candidate list; deriving control point motion vector differences (CPMVDs) for CPs of the current block based on the motion prediction information; deriving control point motion vectors (CPMVs) for CPs of the current block based on the CPMVPs and CPMVDs; deriving prediction samples for the current block based on the CPMVs; and generating a reconstructed picture for the current block based on the derived prediction samples, wherein the configuring of the affine MVP candidate list comprises: checking whether a first affine MVP candidate is available, wherein the first affine MVP candidate is available when a first block in a left block group is coded with an affine motion model and a reference picture index of the first block is same as a reference picture index of the current block; checking whether a second affine MVP candidate is available, wherein the second affine MVP candidate is available when a second block in a top block group is coded with an affine motion model and a reference picture index of the second block is same as a reference picture index of the current block; when a number of the available affine MVP candidate is less than 2, checking whether a third affine MVP candidate available, wherein the third MVP affine candidate is available when a first motion vector for CP0 of the current block and a second motion vector for CP1 of the current block are derived from a top-left block group of the current block and a top-right block group of the current block respectively for a 4-parameter affine model being applied to inter prediction, and wherein the third MVP affine candidate is available when a first motion vector for CP0 of the current block, a second motion vector for CP1 of the current block and a third motion vector for CP2 of the current block are derived from a top-left block group of the current block, a top-right block group of the current block, and the left block group respectively for a 6-parameter affine model being applied to inter prediction; when the number of available affine MVP candidates is less than 2 and the first motion vector is available, deriving a fourth affine MVP candidate, wherein the fourth affine MVP candidate includes a motion vector for the CP0 as candidate motion vectors for the CPs; when the number of available affine MVP candidates is less than 2 and the second motion vector is available, deriving a fifth affine MVP candidate, wherein the fifth affine MVP candidate includes a motion vector for the CP1 as candidate motion vectors for the CPs; when the number of available affine MVP candidates is less than 2 and a third motion vector for CP2 of the current block is available, deriving a sixth affine MVP candidate, wherein the sixth affine MVP candidate includes the third motion vector as candidate motion vectors for the CPs; when the number of available affine MVP candidates is less than 2 and a temporal MVP candidate derived based on a temporal neighboring block of the current block is available, deriving a seventh affine MVP candidate including the temporal MVP as candidate motion vectors for the CPs; and when the number of available affine MVP candidates is less than 2, derives an eighth affine MVP candidate including a zero motion vector as candidate motion vectors for the CPs.

According to an example of the present document, there is provided an image encoding method, by an encoding apparatus, comprising: configuring an affine motion vector predictor (MVP) candidate list for a current block; deriving control point motion vector predictors (CPMVPs) for control points (CPs) of the current block based on the affine MVP candidate list; deriving CPMVs for the CPs of the current block; deriving control point motion vector differences (CPMVDs) for the CPs of the current block based on the CPMVPs and CPMVs; and encoding motion prediction information including information on the CPMVDs, wherein the configuring of the affine MVP candidate list comprises: checking whether a first affine MVP candidate is available, wherein the first affine MVP candidate is available when a first block in a left block group is coded with an affine motion model and a reference picture index of the first block is same as a reference picture index of the current block; checking whether a second affine MVP candidate is available, wherein the second affine MVP candidate is available when a second block in a top block group is coded with an affine motion model and a reference picture index of the second block is same as a reference picture index of the current block; when a number of the available affine MVP candidate is less than 2, checking whether a third affine MVP candidate available, wherein the third MVP affine candidate is available when a first motion vector for CP0 of the current block and a second motion vector for CP1 of the current block are derived from a top-left block group of the current block and a top-right block group of the current block respectively for a 4-parameter affine model being applied to inter prediction, and wherein the third MVP affine candidate is available when a first motion vector for CP0 of the current block, a second motion vector for CP1 of the current block and a third motion vector for CP2 of the current block are derived from a top-left block group of the current block, a top-right block group of the current block, and the left block group respectively for a 6-parameter affine model being applied to inter prediction; when the number of available affine MVP candidates is less than 2 and the first motion vector is available, deriving a fourth affine MVP candidate, wherein the fourth affine MVP candidate includes a motion vector for the CP0 as candidate motion vectors for the CPs; when the number of available affine MVP candidates is less than 2 and the second motion vector is available, deriving a fifth affine MVP candidate, wherein the fifth affine MVP candidate includes a motion vector for the CP1 as candidate motion vectors for the CPs; when the number of available affine MVP candidates is less than 2 and a third motion vector for CP2 of the current block is available, deriving a sixth affine MVP candidate, wherein the sixth affine MVP candidate includes the third motion vector as candidate motion vectors for the CPs; when the number of available affine MVP candidates is less than 2 and a temporal MVP candidate derived based on a temporal neighboring block of the current block is available, deriving a seventh affine MVP candidate including the temporal MVP as candidate motion vectors for the CPs; and when the number of available affine MVP candidates is less than 2, derives an eighth affine MVP candidate including a zero motion vector as candidate motion vectors for the CPs.

According to an example of the present document, it is possible to increase general image/video compression efficiency.

According to the present document, it is possible to increase the efficiency of image coding based on the affine motion prediction.

According to the present document, in deriving the affine MVP candidate list, only when all the candidate motion vectors for the CPs of the constructed affine MVP candidate are available, the constructed affine MVP candidate may be added, through which it is possible to reduce the complexity of the process of deriving the constructed affine MVP candidate and the process of configuring the affine MVP candidate list, and to improve the coding efficiency.

According to the present document, in deriving the affine MVP candidate list, the additional affine MVP candidate may be derived based on the candidate motion vector for the CP derived in the process of deriving the constructed affine MVP candidate, through which it is possible to reduce the complexity of the process of configuring the affine MVP candidate list, and to improve the coding efficiency.

According to the present document, in the process of deriving the inherited affine MVP candidate, only when the top neighboring block is included in the current CTU, the inherited affine MVP candidate may be derived using the top neighboring block, through which it is possible to reduce the storing amount of the line buffer for affine prediction, and to minimize hardware costs.

BRIEF DESCRIPTION OF THE DRAWINGS

FIG. 7 illustratively represents motions which are expressed through an affine motion model.

DESCRIPTION OF EXEMPLARY EMBODIMENTS

Figure 1:
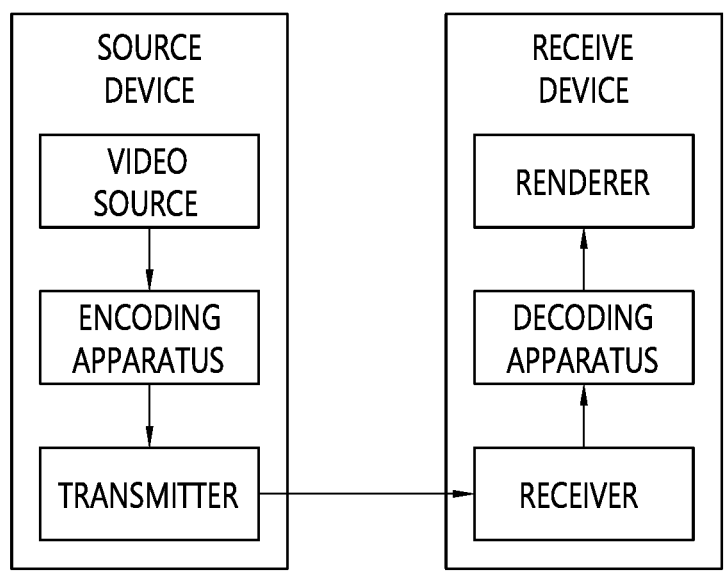
FIG. 1 schematically represents an example of a video/image coding system to which the present document may be applied.

While the present document may be susceptible to various modifications and include various embodiments, specific embodiments thereof have been shown in the drawings by way of example and will now be described in detail. However, this is not intended to limit the present document to the specific embodiments disclosed herein. The terminology used herein is for the purpose of describing specific embodiments only, and is not intended to limit technical idea of the present document. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present document as long as they do not depart from the essence of the present document.

Hereinafter, preferred embodiments of the present document will be explained in more detail while referring to the attached drawings. In addition, the same reference signs are used for the same components on the drawings, and repeated descriptions for the same components will be omitted.

FIG. 1 schematically represents an example of a video/image coding system to which the present document may be applied.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

This document relates to video/image coding. For example, a method/embodiment disclosed in this document may be applied to methods disclosed in versatile video coding (VVC) standard, essential video coding (EVC) standard, AOMedia Video 1 (AV1) standard, 2nd generation of audio video coding standard (AVS2) or next generation video/image coding standard (e.g., H.267, H.268, or the like).

In this document, a variety of embodiments relating to video/image coding may be provided, and, unless specified to the contrary, the embodiments may be combined to each other and be performed.

In this document, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles. A brick may represent a rectangular region of CTU rows within a tile in a picture. A tile may be partitioned into a multiple bricks, each of which consisting of one or more CTU rows within the tile. A tile that is not partitioned into multiple bricks may be also referred to as a brick. A brick scan may be a specific sequential ordering of CTUs partitioning a picture in which the CTUs may be ordered in CTU raster scan in a brick, bricks within a tile may be ordered consecutively in a raster scan of the bricks of the tile, and tiles in a picture may be ordered consecutively in a raster scan of the tiles of the picture (A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture). A tile is a rectangular region of CTUs within a particular tile column and a particular tile column (A tile is a rectangular region of CTUs within a particular tile column and a particular tile row in a picture). The tile column is a rectangular region of CTUs having a height equal to the height of the picture and a width specified by syntax elements in the picture parameter set. The tile row is a rectangular region of CTUs having a width specified by syntax elements in the picture parameter set and a height equal to the height of the picture (The tile row is a rectangular region of CTUs having a height specified by syntax elements in the picture parameter set and a width equal to the width of the picture). A tile scan may be a specific sequential ordering of CTUs partitioning a picture in which the CTUs may be ordered consecutively in CTU raster scan in a tile whereas tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice may include an integer number of bricks of a picture that may be contained in a single NAL unit (A slice includes an integer number of bricks of a picture that may be exclusively contained in a single NAL unit). A slice may consist of either a number of complete tiles or only a consecutive sequence of complete bricks of one tile. In this document, a tile group and a slice may be used in place of each other. For example, in this document, a tile group/tile group header may be referred to as a slice/slice header.

A pixel or a pel may mean a minimum unit constituting one picture (or image). Further, a "sample" may be used as a term corresponding to a pixel. A sample may generally represent a pixel or a value of a pixel, and may represent only a pixel/pixel value of a luma component, or only a pixel/pixel value of a chroma component.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term"/" and "," should be interpreted to indicate "and/or." For instance, the expression"A/B" may mean "A and/or B." Further, "A, B" may mean "A and/or B." Further, "A/B/C" may mean "at least one of A, B, and/or C." Also, "A, B, C" may mean "at least one of A, B, and/or C." (In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C.")

Further, in the document, the term "or" should be interpreted to indicate "and/or." For instance, the expression "A or B" may comprise 1) only "A", 2) only "B", and/or 3) both "A and B". In other words, the term "or" in this document should be interpreted to indicate "additionally or alternatively." (Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively.")

Figure 2:
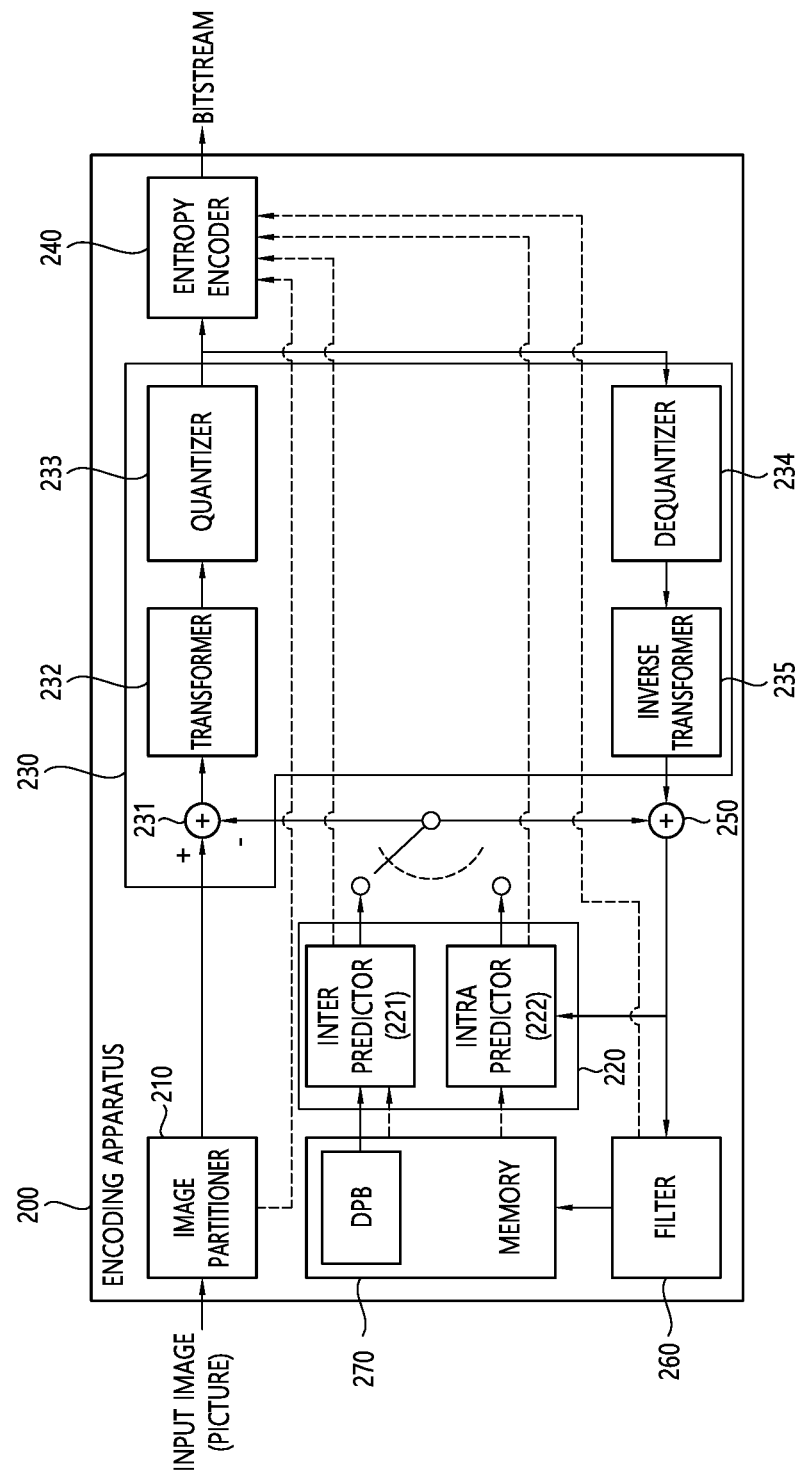
FIG. 2 is a diagram schematically describing a configuration of a video/image encoding apparatus to which the present document may be applied.

FIG. 2 is a diagram schematically describing a configuration of a video/image encoding apparatus to which the present document may be applied. Hereinafter, what is referred to as the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present document may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

In the encoding apparatus 200, a prediction signal (predicted block, prediction sample array) output from the inter predictor 221 or the intra predictor 222 is subtracted from an input image signal (original block, original sample array) to generate a residual signal (residual block, residual sample array), and the generated residual signal is transmitted to the transformer 232. In this case, as shown, a unit which subtracts the prediction signal (predicted block, prediction sample array) from the input image signal (original block, original sample array) in the encoder 200 may be called the subtractor 231. The predictor may perform prediction on a processing target block (hereinafter, referred to as 'current block'), and may generate a predicted block including prediction samples for the current block. The predictor may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The prediction signal generated through the predictor (including inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded video/image information) may be transmitted or stored on a unit basis of a network abstraction layer (NAL) in the form of a bitstream. The video/image information may further include information on various parameter sets such as an adaptation parameter set (APS), a picture parameter set (PPS), a sequence parameter set (SPS), a video parameter set (VPS) or the like. Further, the video/image information may further include general constraint information. In the present document, information and/or syntax elements which are transmitted/signaled to the decoding apparatus from the encoding apparatus may be included in video/image information. The video/image information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 100 and a decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
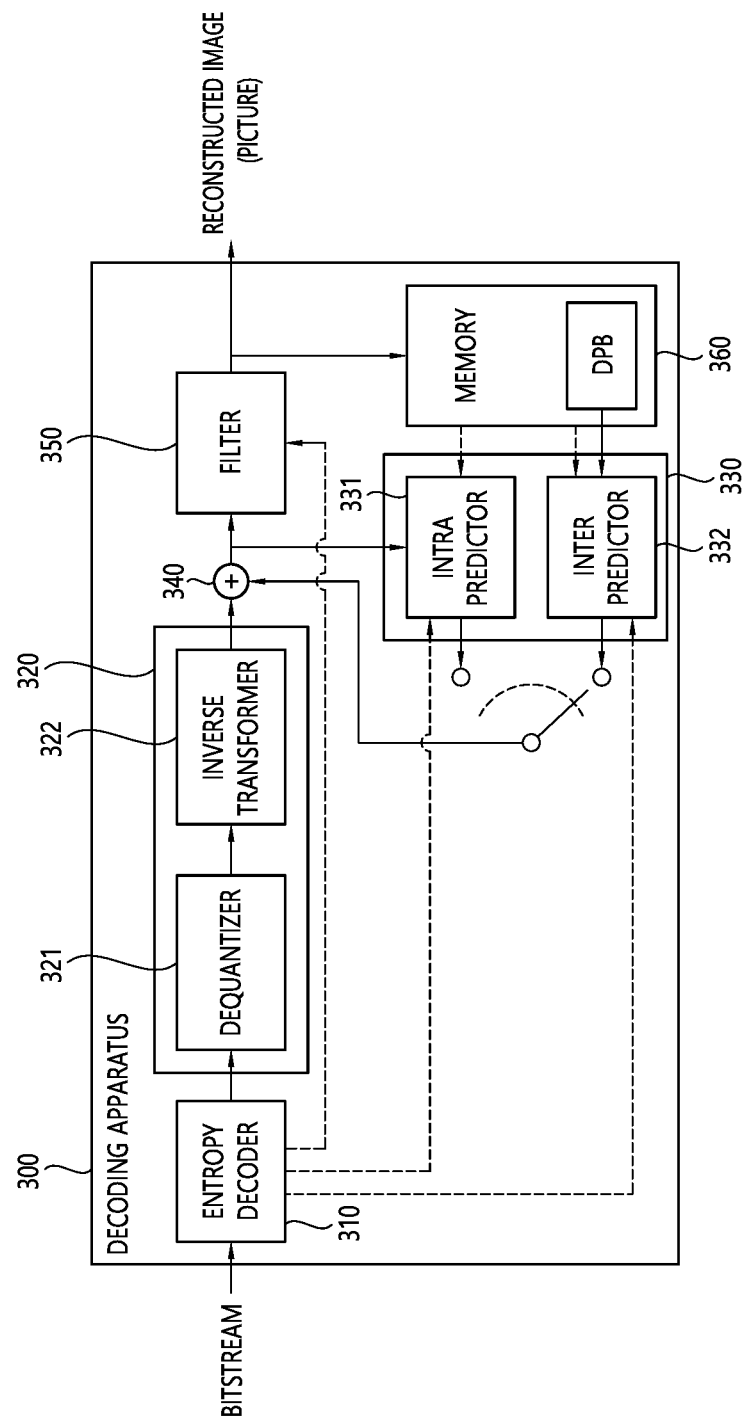
FIG. 3 is a diagram schematically describing a configuration of a video/image decoding apparatus to which the present document may be applied.

FIG. 3 is a diagram schematically describing a configuration of a video/image decoding apparatus to which the present document may be applied.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including video/image information is input, the decoding apparatus 300 may reconstruct an image correspondingly to a process by which video/image information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present document, signaled/received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present document may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The dequantizer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor 320 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture.

For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 adds obtained residual signal to a prediction signal (predicted block, predicted sample array) output from the predictor (inter predictor 332 and/or intra predictor 331), so that a reconstructed signal (reconstructed picture, reconstructed block, reconstructed sample array) may be generated. When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In the present description, embodiments described in the filter 260, the inter predictor 221 and the intra predictor 222 of the encoding apparatus 200 may be similarly or correspondingly applied to the filter 350, the inter predictor 332 and the intra predictor 331 of the decoding apparatus 300.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

When inter prediction is applied, the predictor of the encoding apparatus/decoding apparatus may perform the inter prediction on a block unit basis and derive the prediction sample. Inter prediction can be a prediction derived in a manner that is dependent on data elements (e.g., sample values or motion information) of picture(s) other than the current picture. When inter prediction is applied to the current block, a predicted block (prediction sample array) for the current block may be derived based on a reference block (reference sample array) specified by a motion vector on a reference picture which a reference picture index indicates. At this time, in order to reduce the amount of motion information transmitted in the inter prediction mode, the motion information of the current block may be predicted on a unit basis of a block, a subblock, or a sample based on correlation of motion information between the neighboring block and the current block. The motion information may include a motion vector and a reference picture index. The motion information may further include inter prediction type (L0 prediction, L1 prediction, Bi prediction, etc.) information. When inter prediction is applied, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, motion information candidate list may be configured based on neighboring blocks of the current block, and a flag or index information indicating which candidate is selected (used) in order to derive a motion vector and/or a reference picture index of the current block may be signaled. Inter prediction may be performed based on various prediction modes. For example, in the case of a skip mode and a (normal) merge mode, motion information of the current block may be the same as motion information of the selected neighboring block. In the skip mode, unlike the merge mode, the residual signal may not be transmitted. In the case of motion information prediction (motion vector prediction (MVP)) mode, a motion vector of the selected neighboring block may be used as a motion vector predictor, and a motion vector difference may be signaled. In this case, a motion vector of the current block may be derived using the sum of the motion vector predictor and motion vector difference.

The video/image encoding procedure based on inter prediction may schematically include, for example, the following.

Figure 4:
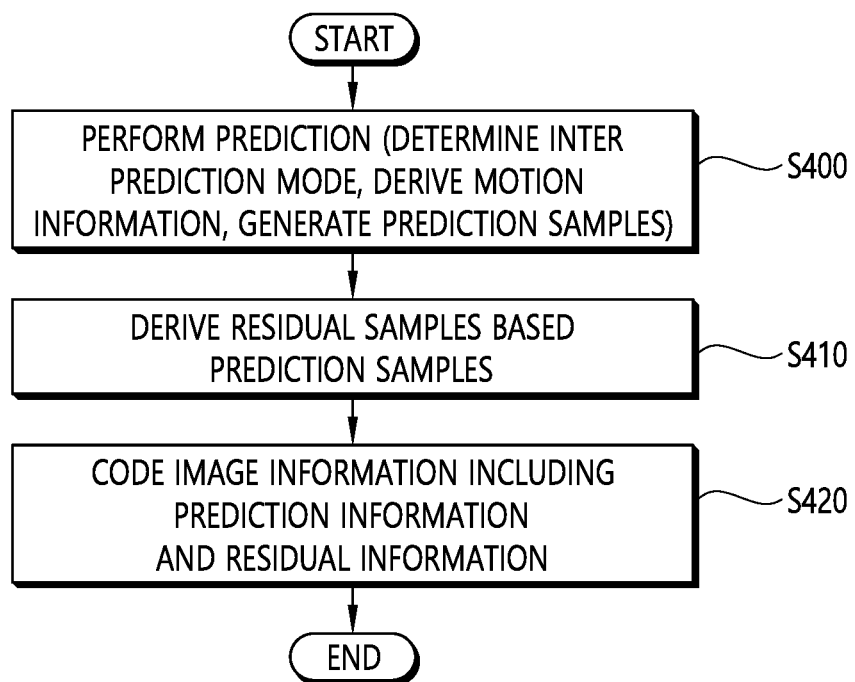
FIG. 4 represents an example of an inter prediction based video/image encoding method.

FIG. 4 represents an example of an inter prediction based video/image encoding method.

The encoding apparatus performs inter prediction on a current block (S400). The encoding apparatus may derive inter prediction mode and motion information of the current block, and generate prediction samples of the current block. Here, inter prediction mode determination, motion information derivation, and prediction sample generation procedure may be performed at the same time, or performed one after another. For example, the inter predictor of the encoding apparatus may include a prediction mode determining part, a motion information deriving part, and a predicted sample deriving part. The prediction mode determining part may determine a prediction mode for the current block, the motion information deriving part may derive motion information of the current block, and the prediction sample deriving part may derive predicted samples of the current block. For example, the inter predictor of the encoding apparatus may search for a block similar to the current block in a certain region (search region) of the reference pictures through motion estimation, and derive a reference block whose difference from the current block is minimum, or less than or equal to a certain level. Based on this, the reference picture index indicating a reference picture on which the reference block is located may be derived, and based on the difference in position between the reference block and the current block, the motion vector may be derived. The encoding apparatus may determine a mode from among various prediction modes, which is applied to the current block. The encoding apparatus may compare RD costs for the various prediction modes, and determine the optimal prediction mode for the current block.

For example, when the skip mode or the merge mode is applied to the current block, the encoding apparatus may configure a merge candidate list to be described later, and derive a reference block whose difference from the current block is minimum or less than or equal to a certain level from among reference blocks which merge candidates included in the merge candidate list indicate. In this case, the merge candidate associated with the derived reference block may be selected, and merge index information indicating the selected merge candidate may be generated and be signaled to the decoding apparatus. The motion information of the current block may be derived using motion information of the selected merge candidate.

As another example, when the (A)MVP mode is applied to the current block, the encoding apparatus may configure an (A)MVP candidate list, and use the motion vector of an mvp (motion vector predictor) candidate selected from among mvp candidates included in the (A)MVP candidate list as the mvp of the current block. In this case, for example, the motion vector indicating the reference block derived by the above-described motion estimation may be used as a motion vector of the current block, and among the mvp candidates, the mvp candidate which has a motion vector whose difference from the motion vector of the current block is smallest may be the selected mvp candidate. MVD (motion vector difference), which is a difference obtained by subtracting the mvp from the motion vector of the current block, may be derived. In this case, information on the MVD may be signaled to the decoding apparatus. Additionally, when the (A)MVP mode is applied, a value of the reference picture index may be configured as a reference picture index information and signaled separately to the decoding apparatus.

The encoding apparatus may derive residual samples based on the prediction samples (S410). The encoding apparatus may derive the residual samples via comparison of original samples of the current block and the prediction samples.

The encoding apparatus encodes image information including prediction information and residual information (S420). The encoding apparatus may output the encoded image information in the form of a bitstream. The prediction information may include a prediction mode information (e.g., skip flag, merge flag, mode index or the like) and information on motion information as information on the prediction procedure. The information on motion information may include candidate selection information (e.g., merge index, mvp flag, or mvp index), which is information for deriving a motion vector. Further, the information on motion information may include information on the above-described MVD, and/or the reference picture index information. Further, the information on motion information may include information indicating whether the L0 prediction, the L1 prediction, or bi-prediction is applied. The residual information is information on the residual samples. The residual information may include information on quantized transform coefficients for the residual samples.

The output bitstream may be stored in a (digital) storage medium and delivered to the decoding apparatus, or may be delivered to the decoding apparatus through a network.

Meanwhile, as described above, the encoding apparatus may generate a reconstructed picture (including reconstructed samples and a reconstructed block) based on the reference samples and the residual samples. This is to derive the same prediction result in the encoding apparatus as one that is performed in the decoding apparatus, and the reason is that coding efficiency can be increased through this. Therefore, the encoding apparatus may store a reconstructed picture (or reconstructed samples, a reconstructed block) in the memory, and utilize it as a reference picture for inter prediction. The in-loop filtering procedure may be further applied to the reconstructed picture as described above.

The video/image decoding procedure based on inter prediction may schematically include, for example, the following.

Figure 5:
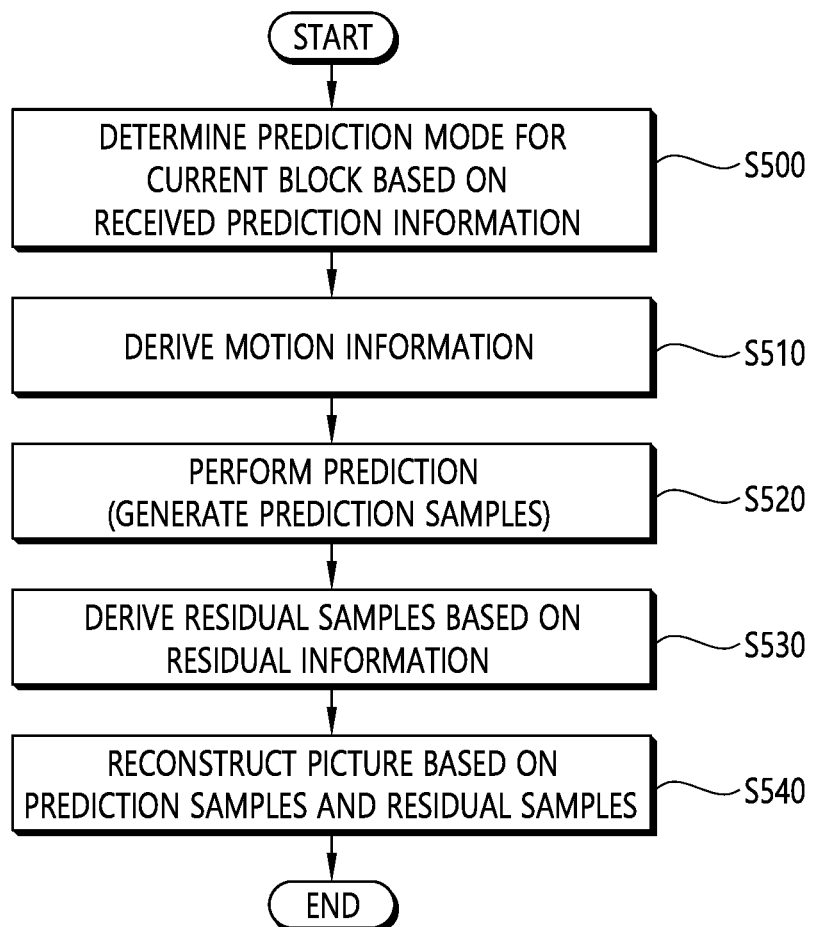
FIG. 5 represents an example of an inter prediction based video/image encoding method.

FIG. 5 represents an example of an inter prediction based video/image decoding method.

Referring to FIG. 5, the decoding apparatus may perform an operation corresponding to the operation which has been performed in the encoding apparatus. The decoding apparatus may perform prediction on the current block and derive the prediction samples based on the received prediction information.

Specifically, the decoding apparatus may determine the prediction mode for the current block based on the received prediction information (S500). The decoding apparatus may determine which inter prediction mode is applied to the current block based on the prediction mode information in the prediction information.

For example, it may be determined based on the merge flag whether the merge mode is applied to the current block or (A)MVP mode is determined. Alternatively, one inter prediction mode may be selected from among various inter prediction mode candidates based on the mode index. The inter prediction mode candidates may include the skip mode, the merge mode and/or the (A)MVP mode, or may include various inter prediction modes to be described later.

The decoding apparatus derives the motion information of the current block based on the determined inter prediction mode (S510). For example, when the skip mode or the merge mode is applied to the current block, the decoding apparatus may configure a merge candidate list to be described later, and select one of merge candidates included in the merge candidate list. The selection may be performed based on the above-described selection information (merge index). The motion information of the current block may be derived using motion information of the selected merge candidate. The motion information of the selected merge candidate may be used as the motion information of the current block.

As another example, when the (A)MVP mode is applied to the current block, the decoding apparatus may configure an (A)MVP candidate list to be described later, and use a motion vector of a motion vector predictor (MVP) candidate selected from among mvp candidates included in the (A)MVP candidate list as the MVP of the current block. The selection may be performed based on the above-described selection information (mvp flag or mvp index). In this case, MVD of the current block may be derived based on information on the MVD, and the motion vector of the current block may be derived based on the MVD and the mvp of the current block. Further, the reference picture index of the current block may be derived based on the reference picture index information. The picture in the reference picture list concerning the current block, which the reference picture index indicates may be derived as a reference picture which is referred to for the inter prediction of the current block.

Meanwhile, as described later, the motion information of the current block may be derived without configuring the candidate list, and in this case, the motion information of the current block may be derived according to the procedure disclosed in the prediction mode to be described later. In this case, the configuring of the candidate list as described above may be omitted.

The decoding apparatus may generate prediction samples for the current block based on the motion information of the current block (S520). In this case, the reference picture may be derived based on the reference picture index of the current block, and the prediction samples of the current block may be derived using the samples of the reference block on the reference picture which is indicated by the motion vector of the current block. In this case, a prediction sample filtering procedure for the all or some of prediction samples of the current block may be further performed according to circumstances as described later.

For example, the inter predictor of the encoding apparatus may include a prediction mode determining part, a motion information deriving part, and a predicted sample deriving part, may determine a prediction mode for the current block based on prediction mode information received at the prediction mode determining part, may derive motion information (motion vector and/or reference picture index and/or the like) of the current block based on information on motion information received at the motion information deriving part, and may derive predicted samples of the current block at the prediction sample deriving part.

The decoding apparatus generates the residual samples for the current block based on the received residual information (S530). The decoding apparatus may generate the reconstructed samples for the current block based on the residual samples and the prediction samples, and generate the reconstructed picture based on the reconstructed samples. (S540). Hereinafter, the in-loop filtering procedure may be applied to the reconstructed picture as described above.

Figure 6:
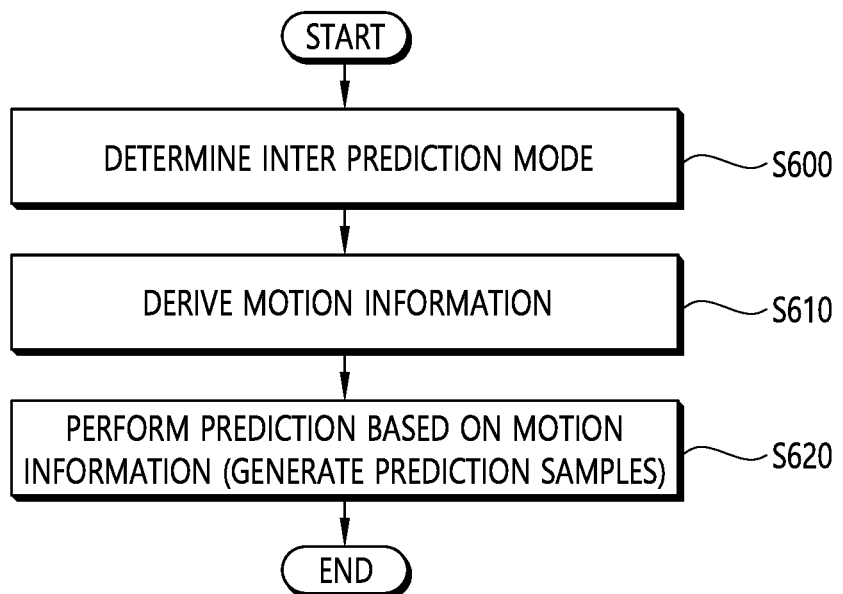
FIG. 6 illustratively represents an inter prediction procedure.

FIG. 6 illustratively represents an inter prediction procedure.

Referring to FIG. 6, as described above, the inter prediction procedure may include determining an inter prediction mode, deriving motion information according to the determined prediction mode, and performing prediction based on the derived motion information (generating a prediction sample). The inter prediction procedure may be performed in the encoding apparatus and the decoding apparatus as described above. In the present document, a coding apparatus may include an encoding apparatus and/or a decoding apparatus.

Referring to FIG. 6, the coding apparatus determines an inter prediction mode for a current block (S600). Various inter prediction modes may be used for prediction of the current block in a picture. For example, a variety of modes, such as a merge mode, a skip mode, a motion vector prediction (MVP) mode, an affine mode, a subblock merge mode, a merge with MVD mode or the like, may be used. A decoder side motion vector refinement (DMVR) mode, an adaptive motion vector resolution (AMVR) mode, bi-prediction with CU-level weight (BCW), bi-directional optical flow (BDOF) or the like may be used as an additional mode, or as a substitute. The affine mode may be called an affine motion prediction mode. The MVP mode may be called an advanced motion vector prediction (AMVP) mode. In the present document, some modes and/or a motion information candidate derived by some modes may be included as one of candidates relating to motion information of another mode. For example, the HMVP candidate may be added as a merge candidate of the merge/skip mode, or may be added as an MVP candidate of the MVP mode. When the HVMP candidate is used as a motion information candidate of the merge mode or the skip mode, the HVMP candidate may be called an HMVP merge candidate.

The prediction mode information indicating the inter prediction mode of the current block may be signaled from the encoding apparatus to the decoding apparatus. The prediction mode information may be included in a bitstream and received at the decoding apparatus. The prediction mode information may include index information indicating one of multiple candidate modes. Further, the inter prediction mode may be indicated through hierarchical signaling of flag information. In this case, the prediction mode information may include one or more flags. For example, it may be indicated whether the skip mode is applied by signaling the skip flag, it may be indicated whether the merge mode is applied by signaling the merge flag for the skip mode not being applied, and it may be indicated that the MVP mode is applied or a flag for further partition may be further signaled when the merge mode is not applied. The affine mode may be signaled as an independent mode, or may be signaled as a mode dependent on the merge mode, the MVP mode or the like. For example, the affine mode may include an affine merge mode and an affine MVP mode.

The coding apparatus derives motion information for the current block (S610). The deriving of the motion information may be derived based on the inter prediction mode.

The coding apparatus may perform inter prediction using motion information for the current block. The encoding apparatus may derive optimal motion information for the current block through a motion estimation procedure. For example, the encoding apparatus may search a similar reference block of a high correlation in a predetermined search range in a reference picture in a fractional pixel unit using an original block in an original picture for the current block, and may derive motion information through this. Similarity of a block may be derived based on difference between phase-based sample values. For example, similarity of a block may be calculated based on SAD between the current block (or template of the current block) and the reference block (or template of the reference block). In this case, the motion information may be derived based on the reference block having the smallest SAD in a search region. The derived motion information may be signaled to the decoding apparatus according to various methods based on inter prediction mode.

The coding apparatus performs inter prediction based on motion information for the current block (S620). The coding apparatus may derive prediction sample(s) for the current block based on the motion information. The current block including the prediction samples may be called a predicted block.

Meanwhile, in the case of inter prediction, inter prediction method in which the distortion of image is considered is being proposed. Specifically, there is proposed an affine motion model which efficiently derives the motion vector for sample blocks or sub-blocks of the current block, and which increases the accuracy of inter prediction despite deformation such as rotation, zoom in, zoom out of an image. That is, the affine motion model is one that derives the motion vector for sample points or sub-blocks of the current block, and the prediction using the affine motion model may be called an affine motion prediction, an affine motion prediction, motion prediction of a sub-block unit or a sub-block motion prediction.

For example, the sub-block motion prediction using the affine motion model may efficiently express such four motions as described later, that is, such four deformations as described later.

FIG. 7 illustratively represents motions which are expressed through an affine motion model. Referring to FIG. 7, the motions which can be expressed through the affine motion model may include translate motion, scale motion, rotate motion and shear motion. That is, as shown in FIG. 7, the translate motion that an image (or a part thereof) is moved in a plane over time, the scale motion that an image (or a part thereof) is scaled over time, the rotate motion that an image (or a part thereof) is rotated over time, and the shear motion that an image (or a part thereof) is deformed to a parallelogram over time may be efficiently expressed through motion prediction of the sub-block unit.

The encoding apparatus/decoding apparatus may predict distortion shape of the image based on motion vectors at control points (CP) of the current block through the affine inter prediction, which can lead to increase in prediction accuracy, thus improving compression performance of an image. Further, by using the motion vector of the neighboring block of the current block, a motion vector for at least one control point of the current block may be derived, and thus it is possible to reduce data amount of added additional information, and considerably improve inter prediction efficiency.

As one example of the affine motion prediction, motion information at three control points, that is, three reference points may be required.

Figure 8:
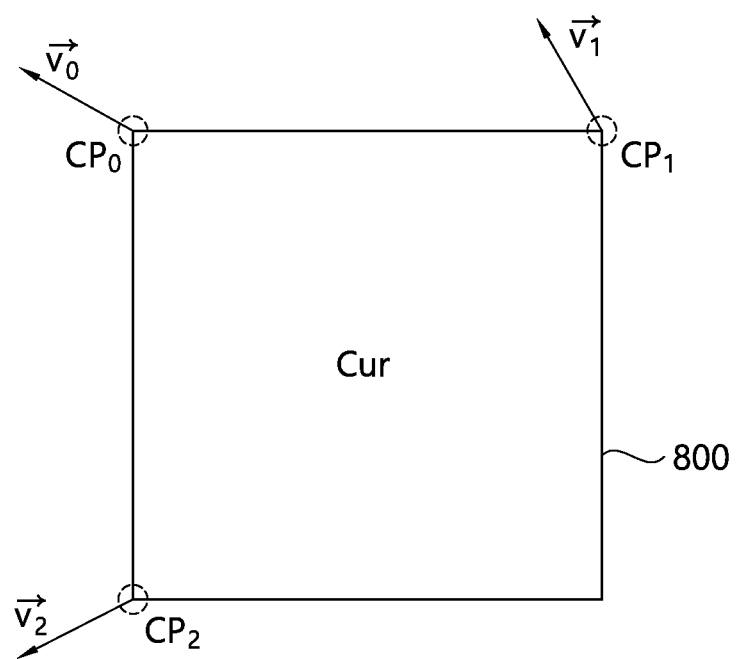
FIG. 8 illustratively represents the affine motion model in which motion vectors for three control points are used.

FIG. 8 illustratively represents the affine motion model in which motion vectors for three control points are used.

If a top-left sample position in the current block 800 is set as (0, 0), as shown in FIG. 8, sample positions (0, 0), (w, 0), (0, h) may be determined as the control points. Hereinafter, the control point of (0, 0) sample position may be represented as CP0; the control point of (w, 0) sample position, CP1; and the control point of (0, h) sample position, CP2.

By using each of the above-described control points and the motion vector for the corresponding control point, an equation for the affine motion model may be derived. The equation for the affine motion model may be represented as below:

$$\begin{cases} v_x = \frac{(v_{1x} - v_{0x})}{w} * x + \frac{(v_{2x} - v_{0x})}{h} * y + v_{0x} \\ v_y = \frac{(v_{1y} - v_{0y})}{w} * x - \frac{(v_{2y} - v_{0y})}{h} * y + v_{0y} \end{cases} \quad \text{[Equation 1]}$$

where w represents a width of the current block 800; h, a height of the current block 800; v0x and v0y, an x component and y component of the motion vector of CP0, respectively; v1x and v1y, an x component and y component of the motion vector of CP1, respectively; and v2x and v2y, an x component and y component of the motion vector of CP2, respectively. Further, x represents an x component of a position of a target sample in the current block 800; y, a y component of the position of the target sample in the current block 800; vx, an x component of a motion vector of the target sample in the current block 800; and vy, a y component of the motion vector of the target sample in the current block 800.

Since the motion vector of CP0, the motion vector of CP1, and the motion vector of CP2 are known, the motion vector according to the sample position in the current block may be derived based on Equation 1. That is, according to the affine motion model, the motion vectors v0(v0x, v0y), v1(v1x, v1y), v2(v2x, v2y) at the control points may be scaled based on ratios of distances between coordinates (x, y) of the target sample and three control points, so that the motion vector of the target sample according to the target sample position may be derived. That is, according to the affine motion model, the motion vector of each sample in the current block may be derived based on the motion vectors of the control points. Meanwhile, a set of the motion vectors of the samples in the current block which have been derived according to the affine motion model may be represented as an affine motion vector field (MVF).

Meanwhile, six parameters for Equation 1 above may be represented as a, b, c, d, e and f of following equations, and equation for the affine motion model which is represented using the six parameters may be as below:

$$a = \frac{(v_{1x} - v_{0x})}{w} \quad b = \frac{(v_{2x} - v_{0x})}{h} \quad c = v_{0x} \quad \text{[Equation 2]}$$
$$d = \frac{(v_{1y} - v_{0y})}{w} \quad e = -\frac{(v_{2y} - v_{0y})}{h} \quad f = v_{0y}$$

$$\begin{cases} v_x = a*x + b*y + c \\ v_y = d*x + e*y + f \end{cases}$$

where w represents a width of the current block 800; h, a height of the current block 800; v0x and v0y, an x component and y component of the motion vector of CP0, respectively; v1x and v1y, an x component and y component of the motion vector of CP0, respectively; and v2x and v2y, an x component and y component of the motion vector of CP1, respectively. Further, x represents an x component of a position of a target sample in the current block 800; y, a y component of the position of the target sample in the current block 800; vx, an x component of a motion vector of the target sample in the current block 800; and vy, a y component of the motion vector of the target sample in the current block 800.

The affine motion model using the six parameters or the affine inter prediction may be represented as 6-parameter affine motion model or AF6.

Further, as one example of the affine motion prediction, motion information at two control points, that is, two reference points may be required.

Figure 9:
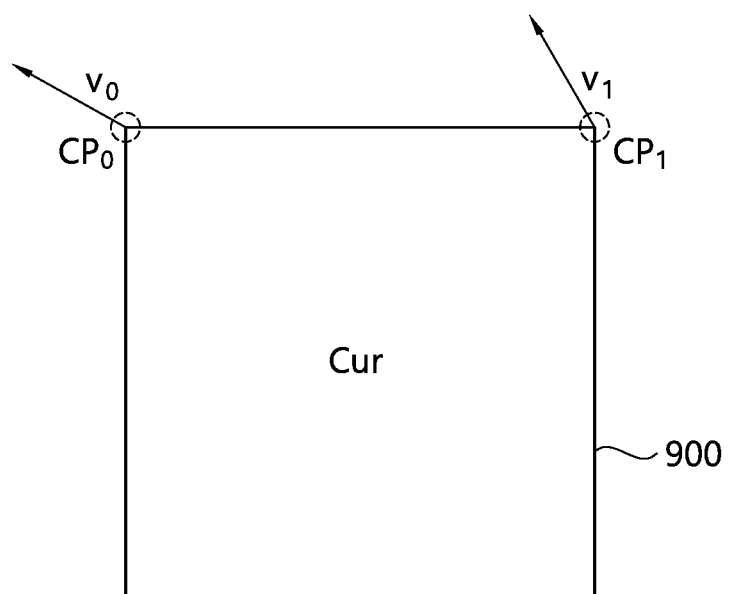
FIG. 9 illustratively represents a motion model of the affine unit in which motion vectors for two control points are used.

FIG. 9 illustratively represents a motion model of the affine unit in which motion vectors for two control points are used. The affine motion model using two control points may express three motions including the translate motion, the scale motion and the rotate motion. The affine motion model expressing three motions may be represented as a similarity affine motion model or a simplified affine motion model.

If a top-left sample position in the current block 900 is set as (0, 0), as shown in FIG. 9, sample positions (0,0), (w, 0) may be determined as the control points. Hereinafter, the control point of (0, 0) sample position may be represented as CP0; and the control point of (w, 0) sample position, CP0.

By using each of the above-described control points and the motion vector for the corresponding control point, an equation for the affine motion model may be derived. The equation for the affine motion model may be represented as below:

$$\begin{cases} v_x = \frac{(v_{1x} - v_{0x})}{w} * x - \frac{(v_{1y} - v_{0y})}{w} * y + v_{0x} \\ v_y = \frac{(v_{1y} - v_{0y})}{w} * x - \frac{(v_{1x} - v_{0x})}{w} * y + v_{0y} \end{cases}$$ [Equation 3]

where w represents a width of the current block 900; v0x and v0y, an x component and y component of the motion vector of CP0, respectively; v1x and v1y, an x component and y component of the motion vector of CP0, respectively. Further, x represents an x component of a position of a target sample in the current block 900; y, a y component of the position of the target sample in the current block 900; vx, an x component of a motion vector of the target sample in the current block 900; and vy, a y component of the motion vector of the target sample in the current block 900.

Meanwhile, four parameters for Equation 3 above may be represented as a, b, c and d of following equations, and equation for the affine motion model which is represented using the four parameters may be as below:

$$a = \frac{(v_{1x} - v_{0x})}{w} \quad b = \frac{(v_{1y} - v_{0y})}{w} \quad c = v_{0x} \quad d = v_{0y}$$ [Equation 4]

$$\begin{cases} v_x = a*x - b*y + c \\ v_y = b*x + a*y + d \end{cases}$$

where w represents a width of the current block 900; v0x and v0y, an x component and y component of the motion vector of CP0, respectively; v1x and v1y, an x component and y component of the motion vector of CP0, respectively. Further, x represents an x component of a position of a target sample in the current block 900; y, a y component of the position of the target sample in the current block 900; vx, an x component of a motion vector of the target sample in the current block 900; and vy, a y component of the motion vector of the target sample in the current block 900. Since the affine motion model using the two control points may be expressed with four parameters a, b, c and d as in Equation 4, the affine motion model or the affine motion prediction using the four parameters may be represented as 4-parameter affine motion model or AF4. That is, according to the affine motion model, the motion vector of each sample in the current block may be derived based on the motion vectors of the control points. Meanwhile, a set of the motion vectors of the samples in the current block which have been derived according to the affine motion model may be represented as an affine motion vector field (MVF).

Meanwhile, as described above, the motion vector of the sample unit may be derived through the affine motion model, and the accuracy of inter prediction can be considerably improved through this. However, in this case, complexity may be greatly increased in the motion compensation process.

Thus, it may be limited to derive the motion vector of the sub-block unit in the current block instead of the motion vector of the sample unit.

Figure 10:
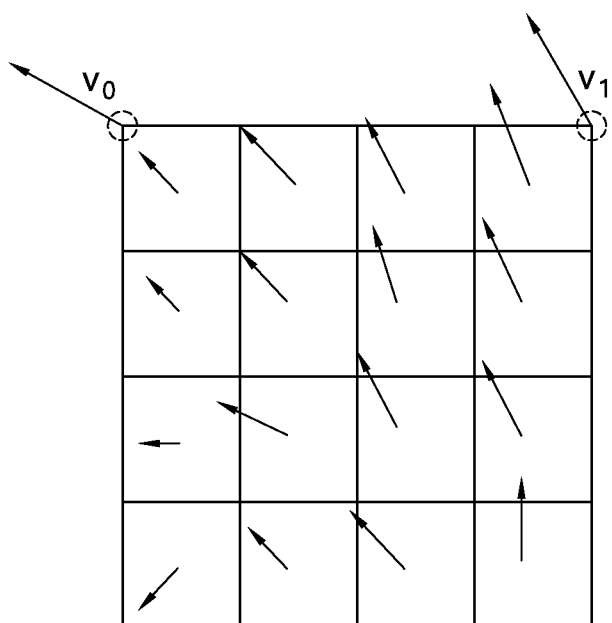
FIG. 10 illustratively represents a method of deriving a motion vector in a subblock unit based on the affine motion model.

FIG. 10 illustratively represents a method of deriving a motion vector in a subblock unit based on the affine motion model. FIG. 10 illustratively represents a case where the size of the current block is 16×16, and the motion vector is derived in 4×4 sub-block units. The sub-block may be set in various sizes, and for example, if the sub-block is set in an n×n size (n is a positive integer, and for example, n is 4), the motion vector may be derived in an n×n sub-block unit in the current block based on the affine motion model, and various method for deriving a motion vector representing each sub-block may be applied.

For example, referring to FIG. 10, the motion vector of each sub-block may be derived setting a center or center lower right side sample position of each sub-block as representative coordinates. Here, the center lower right side position may represent a sample position among four samples located at the center of the sub-block, which is located at a lower right side. For example, if n is an odd number, one sample may be located at the center of the sub-block, and in this case, the center sample position may be used for deriving the motion vector of the sub-block. However, if n is an even number, four samples may be located adjacent to the center of the sub-block, and in this case, the lower right side sample position may be used for deriving the motion vector. For example, referring to FIG. 10, representative coordinates for each of the sub-blocks may be derived as (2, 2), (6, 2), (10, 2), . . . (14, 14), and the encoding apparatus/decoding apparatus may derive the motion vector of each sub-block by inputting each of the representative coordinates of the sub-blocks into Equations 1 to 3. Predicting the motion of the sub-block in the current block through the affine motion model may be named motion prediction of sub-block unit or sub-block motion prediction, and such motion vectors of sub-blocks may be represented as MVF.

Meanwhile, as one example, the size of the sub-block in the current block may be derived based on the following equation:

$$\begin{cases} M = clip3\left(4, w, \dfrac{w*MvPre}{\max(\text{abs}(v_{1x} - v_{0x}), \text{abs}(v_{1y} - v_{0y}))}\right) \\ N = clip3\left(4, h, \dfrac{h*MvPre}{\max(\text{abs}(v_{2x} - v_{0x}), \text{abs}(v_{2y} - v_{0y}))}\right) \end{cases}$$ [Equation 5]

where M represents a width of the sub-block; and N, a height of the sub-block. Further, v0x and v0y represent an x component and y component of CPMV0 of the current block, respectively; v1x and v1y, an x component and y component of CPMV1 of the current block, respectively; w, a width of the current block; h, a height of the current block; and MvPre, motion vector fraction accuracy. For example, the motion vector fraction accuracy may be set as 1/16.

Meanwhile, in the inter prediction using above-described affine motion model, that is, the affine motion prediction, there may exist a merge mode (AF_MERGE) and an affine inter mode (AF_INTER). Here, the affine inter mode may be represented as an affine motion vector prediction mode (affine MVP mode, AF_MVP).

The merge mode using the affine motion model is similar to the existing merge mode in that MVD for motion vectors of the control points is not transmitted. That is, like the existing skip/merge mode, the merge mode using the affine motion model may represent an encoding/decoding method which performs prediction by deriving CPMV for each of two or three control points from the neighboring block of the current block without decoding for MVD (motion vector difference).

For example, if the AF_MRG mode is applied to the current block, MV for CP0 and CP0 (i.e., CPMV0 and CPMV1) may be derived from the neighboring block among the neighboring blocks of the current block, to which the prediction mode using the affine mode, that is, the affine motion prediction has been applied. That is, CPMV0 and CPMV1 of the neighboring block to which the affine mode has been applied may be derived as the merge candidate, and the merge candidate may be derived as CPMV0 and CPMV1 for the current block.

The affine inter mode may represent inter prediction in which prediction based on affine MVF is performed by deriving MVP (motion vector predictor) for motion vectors of the control points, deriving motion vectors of the control points based on the MVP and received MVP, and deriving affine MVF of the current block based on the motion vectors of the control points. Here, the motion vector of the control point may be represented as a control point motion vector (CPMV); MVP of the control point, a control point motion vector predictor (CPMVP); and MVD of the control point, control point motion vector difference (CPMVD). Specifically, for example, the encoding apparatus may derive the control point motion vector predictor (CPMVP) and the control point motion vector (CPMV) for each of CP0 and CP1 (or CP0, CP1 and CP2), and may transmit or store information on the CPMVP and/or CPMVD which is a difference value between the CPMVP and CPMV.

Here, if the affine inter mode is applied to the current block, the encoding apparatus/decoding apparatus may constitute an affine MVP candidate list based on the neighboring block of the current block, and the affine MVP candidate may be referred to as CPMVP pair candidate, and the affine MVP candidate list may be referred to as CPMVP candidate list.

Further, each affine MVP candidate may mean combination of CPMVPs of CP0 and CP1 in the four-parameter affine motion model (four parameter affine motion model), and may mean combination of CPMVPs of CP0, CP1 and CP2 in the six-parameter affine motion model.

Meanwhile, with regard to the affine inter prediction, an inherited affine candidate or an inherited candidate, and a constructed affine candidate are being considered for the affine MVP candidate list configuration. The inherited candidate may refer to a candidate that the motion information of the neighboring block of the current block without other modification or combination, that is, CPMV itself of the neighboring block, is added into the motion candidate list of the current block. Here, the neighboring blocks may include a bottom-left corner neighboring block A0, left neighboring block A1, top neighboring block B0, top-right corner neighboring block B1, and top-left corner neighboring block B2 of the current block. The constructed affine candidate means an affine candidate which configures CPMV of the current block by the combination of CPMWs of at least two neighboring blocks. The driving of the constructed affine candidate will be described in detail below.

Here, the inherited affine candidate may be like following.

For example, when the neighboring block of the current block is an affine block, and the reference picture of the current block is the same as the reference picture of the neighboring block, the affine MVP pair of the current block may be determined from the affine motion model of the neighboring block. Here, the affine block may represent a block to which the affine inter prediction is applied. The inherited affine candidate may represent CPMVPs (e.g., the affine MVP pair) which has been derived based on the affine motion model of the neighboring block.

Specifically, for example, the inherited affine candidate may be derived as described below.

Figure 11:
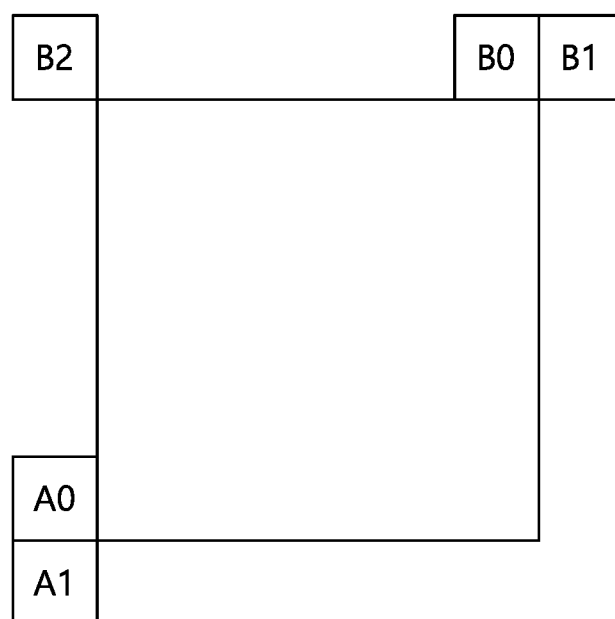
FIG. 11 illustratively represents neighboring blocks for deriving the inherited affine candidate.

FIG. 11 illustratively represents neighboring blocks for deriving the inherited affine candidate.

Referring to FIG. 11, the neighboring blocks of the current block may include a left neighboring block A0 of the current block, a bottom-left corner neighboring block A1 of the current block, a top neighboring block B0 of the current block, a top-right corner neighboring block B1 of the current block, and a top-left corner neighboring block B2 of the current block.

For example, if a size of the current block is W×H, and x component of the top-left sample position of the current block is 0 and y component thereof is 0, the left neighboring block may be a block including a sample at coordinates (−1, H−1); the top neighboring block, a block including a sample at coordinates (W−1, −1); the top-right corner neighboring block, a block including a sample at coordinates (W, −1); the bottom-left corner neighboring block, a block including a sample at coordinates (−1, H); and the top-left corner neighboring block, a block including a sample at coordinates (−1, −1).

The encoding apparatus/decoding apparatus may check the neighboring blocks A0, A1, B0, B1, and B2 sequentially, and, if the neighboring block has been coded using the affine motion model, and the reference picture of the current block is the same as the reference picture of the neighboring block, may derive two CPMVs or three CPMVs of the current block based on the affine motion model of the neighboring block. The CPMVs may be derived as an affine MVP candidate of the current block. The affine MVP candidate may represent the inherited affine candidate.

As one example, up to two inherited affine candidates may be derived based on the neighboring blocks.

For example, the encoding apparatus/decoding apparatus may derive the first affine MVP candidate of the current block based on a first block in the neighboring blocks. Here, the first block may be coded with the affine motion model, and the reference picture of the first block may be the same as the reference picture of the current block. That is, the first block may be a block which has been first confirmed to satisfy a condition while checking neighboring blocks in a specific order. The condition may be that a block is coded with the affine motion model, and that a reference picture of a block is the same as a reference picture of the current block.

Hereinafter, the encoding apparatus/decoding apparatus may derive a second affine MVP candidate of the current block based on a second block in the neighboring blocks. Here, the second block may be coded with the affine motion model, and the reference picture of the second block may be the same as the reference picture of the current block. That is, the second block may be a block which has been second confirmed to satisfy a condition while checking neighboring blocks in a specific order. The condition may be that a block is coded with the affine motion model, and that a reference picture of a block is the same as a reference picture of the current block.

Meanwhile, for example, when the number of the available inherited affine candidates is less than two (that is, the number of derived inherited affine candidates is less than two), the constructed affine candidate may be considered. The configured affine candidate may be derived as below.

Figure 12:
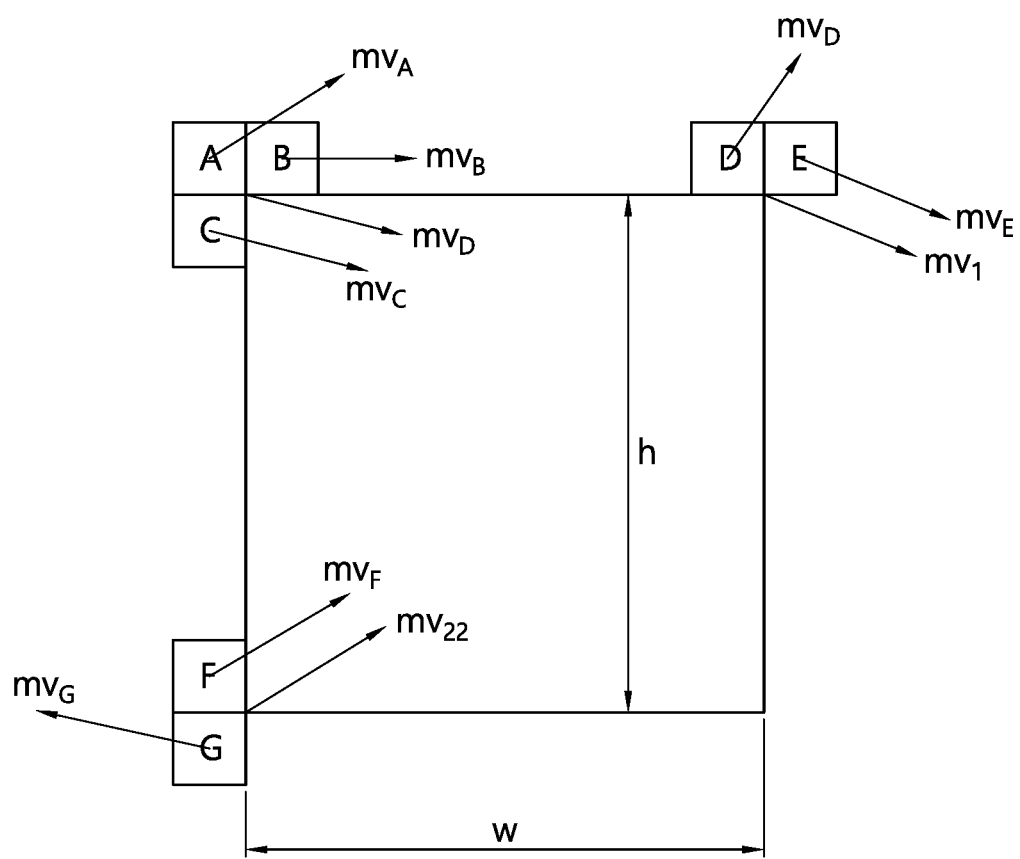
FIG. 12 illustratively represents a spatial candidate for the constructed affine candidate.

FIG. 12 illustratively represents a spatial candidate for the constructed affine candidate.

As shown in FIG. 12, motion vectors of the neighboring blocks of the current block may be divided into three groups. Referring to FIG. 12, the neighboring blocks may include a neighboring block A, a neighboring block B, a neighboring block C, a neighboring block D, a neighboring block E, a neighboring block F, and a neighboring block G.

The neighboring block A may represent a neighboring block located top left of a top-left sample position of the current block; the neighboring block B, a neighboring block located top of the top-left sample position of the current block; and the neighboring block C, a neighboring block located left of the top-left sample position of the current block. In addition, the neighboring block D may represent a neighboring block located top of a top-right sample position of the current block; and the neighboring block E, a neighboring block located top right of the top-right sample position of the current block. In addition, the neighboring block F may represent a neighboring block located left of a bottom-left sample position of the current block; and the neighboring block G, a neighboring block located bottom left of the bottom-left sample position of the current block.

For example, the three groups may include $S_0$, $S_1$, and $S_2$, and the $S_0$, the $S_1$ and the $S_2$ may be derived as following Table.

TABLE 1

| $S_0 = \{mv_A, mv_B, mv_C\}$ | $S_1 = \{mv_D, mv_E\}$ | $S_2 = \{mv_F, mv_G\}$ |
| --- | --- | --- | where $mv_A$ represents a motion vector of the neighboring block A; $mv_B$, a motion vector of the neighboring block B; $mv_C$, a motion vector of the neighboring block C; $mv_D$, a motion vector of the neighboring block D; $mv_E$, a motion vector of the neighboring block E; $mv_F$, a motion vector of the neighboring block F; and $mv_G$, a motion vector of the neighboring block G. The $S_0$ may be represented as a first group; the $S_1$, as a second group; and the $S_2$, as a third group.

The encoding apparatus/decoding apparatus may derive $mv_0$ from the $S_0$, may derive $mv_1$ from the $S_1$, may derive $mv_2$ from the $S_2$, and may derive the affine MVP candidate which includes the $mv_0$, the $mv_1$, and the $mv_2$. The affine MVP candidate may represent the constructed affine candidate. Further, the $mv_0$ may be a CPMVP candidate of CP0; the $mv_1$, a CPMVP candidate of CP1; and the $mv_2$, a CPMVP candidate of CP2.

Here, a reference picture for the $mv_0$ may be the same as a reference picture of the current block. That is, the $mv_0$ may be a motion vector which has been first confirmed to satisfy a condition while checking motion vectors in the $S_0$ in a specific order. The condition may be that the reference picture for the motion vector should be the same as the reference picture of the current block. The specific order may be the following one: the neighboring block A→the neighboring block B→the neighboring block C in the $S_0$. Further, it may be performed in an order other than the forgoing order, and may not be limited to the forgoing example.

Further, the reference picture for the $mv_1$ may be the same as the reference picture of the current block. That is, the $mv_1$ may be a motion vector which has been first confirmed to satisfy a condition while checking motion vectors in the $S_1$ in a specific order. The condition may be that the reference picture for the motion vector should be the same as the reference picture of the current block. The specific order may be the following one: the neighboring block D→the neighboring block E in the $S_1$. Further, it may be performed in an order other than the forgoing order, and may not be limited to the forgoing example.

Further, the reference picture for the $mv_2$ may be the same as the reference picture of the current block. That is, the $mv_2$ may be a motion vector which has been first confirmed to satisfy a condition while checking motion vectors in the $S_2$ in a specific order. The condition may be that the reference picture for the motion vector should be the same as the reference picture of the current block. The specific order may be the following one: the neighboring block F→the neighboring block G in the $S_2$. Further, it may be performed in an order other than the forgoing order, and may not be limited to the forgoing example.

Meanwhile, when only the $mv_0$ and the $mv_1$ are available, that is when only the $mv_0$ and the $mv_1$ are derived, the $mv_2$ may be derived as the following equation.

$$\overline{mv}_2^x = \overline{mv}_0^x - h\frac{(\overline{mv}_1^y - \overline{mv}_0^y)}{w}, \overline{mv}_2^y = \overline{mv}_0^y + h\frac{(\overline{mv}_1^x - \overline{mv}_0^x)}{w} \quad \text{[Equation 6]}$$

where $mv_2^x$ represents an x component of the $mv_2$; $mv_2^y$, a y component of the $mv_2$; $mv_0^x$, an x component of the $mv_0$; $mv_0^y$, a y component of the $mv_0$; $mv_1^x$, an x component of the $mv_1$; and $mv_1^y$, a y component of the $mv_1$. Further, w represents the width of the current block, and h represents the height of the current block.

Meanwhile, when only the $mv_0$ and the $mv_2$ are derived, the $mv_1$ may be derived as the following equation.

$$\overline{mv}_1^x = \overline{mv}_0^x + h\frac{(\overline{mv}_2^y - \overline{mv}_0^y)}{w}, \overline{mv}_1^y = \overline{mv}_0^y - h\frac{(\overline{mv}_2^x - \overline{mv}_0^x)}{w} \quad \text{[Equation 7]}$$

where $mv_1^x$ represents an x component of the $mv_1$; $mv_1^y$, a y component of the $mv_1$; $mv_0^x$, an x component of the $mv_0$; $mv_0^y$, a y component of the $mv_0$; $mv_2^x$, an x component of the $mv_2$; and $mv_2^y$, a y component of the $mv_2$. Further, w represents the width of the current block, and h represents the height of the current block.

Further, when the number of the available inherited affine candidate and/or the constructed affine candidate is less than two, the AMVP process of the conventional HEVC standard may be applied to the affine MVP list configuration. That is, when the number of the available inherited affine candidate and/or the constructed affine candidate is less than two, the process to configure an MVP candidate in the conventional HEVC standard may be performed.

Meanwhile, the flow charts of examples of configuring the foregoing affine MVP list are as described later.

Figure 13:
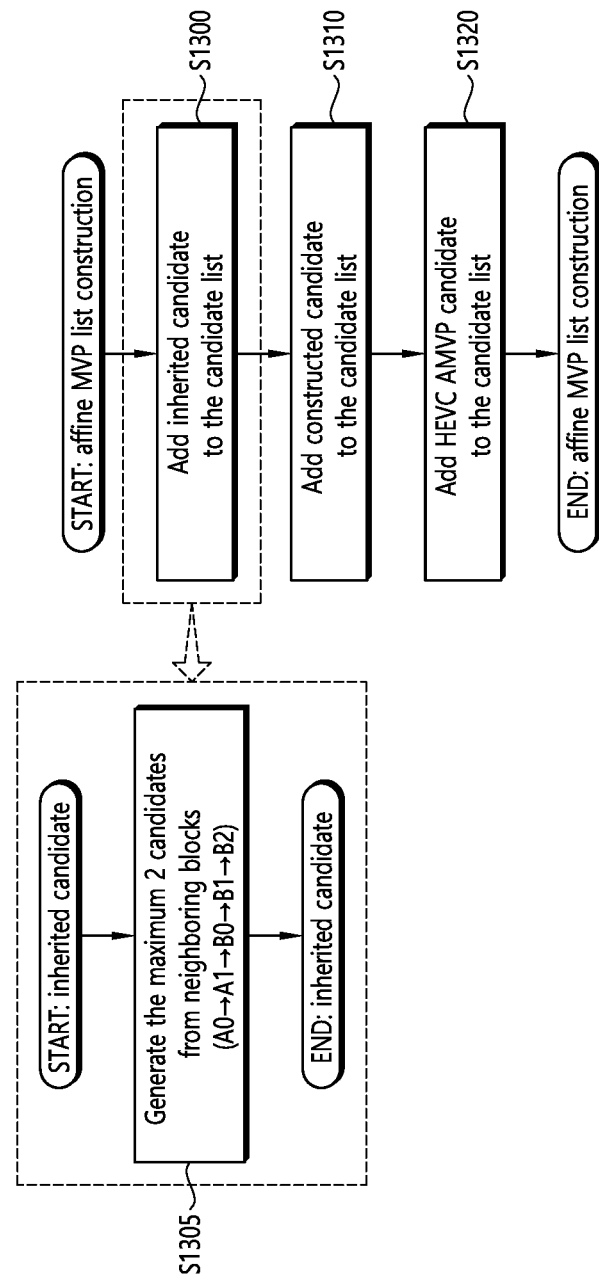
FIG. 13 illustratively represents an example of configuring an affine MVP list.

FIG. 13 illustratively represents an example of configuring an affine MVP list.

Referring to FIG. 13, the encoding apparatus/decoding apparatus may add the inherited candidate to the affine MVP list of the current block (S1300). The inherited candidate may represent the foregoing inherited affine candidate.

Specifically, the encoding apparatus/decoding apparatus may derive the maximum two inherited affine candidates from neighboring blocks of the current block (S1305). Here, the neighboring blocks may include a left neighboring block A0, a bottom-left corner neighboring block A1, a top neighboring block B0, a top-right corner neighboring block B1, and a top-left corner neighboring block B2 of the current block.

For example, the encoding apparatus/decoding apparatus may derive the first affine MVP candidate of the current block based on a first block in the neighboring blocks. Here, the first block may be coded with the affine motion model, and the reference picture of the first block may be the same as the reference picture of the current block. That is, the first block may be a block which has been first confirmed to satisfy a condition while checking neighboring blocks in a specific order. The condition may be that a block is coded with the affine motion model, and that a reference picture of a block is the same as a reference picture of the current block.

Hereinafter, the encoding apparatus/decoding apparatus may derive a second affine MVP candidate of the current block based on a second block in the neighboring blocks. Here, the second block may be coded with the affine motion model, and the reference picture of the second block may be the same as the reference picture of the current block. That is, the second block may be a block which has been second confirmed to satisfy a condition while checking neighboring blocks in a specific order. The condition may be that a block is coded with the affine motion model, and that a reference picture of a block is the same as a reference picture of the current block.

Meanwhile, the specific order may be like this: the left neighboring block A0→the bottom-left corner neighboring block A1→the top neighboring block B0→the top-right corner neighboring block B1→the top-left corner neighboring block B2. Further, it may be performed in an order other than the forgoing order, and may not be limited to the forgoing example.

The encoding apparatus/decoding apparatus may add the constructed candidate to the affine MVP list of the current block (S1310). The constructed candidate may represent the foregoing constructed affine candidate. The constructed candidate may be represented as the constructed affine MVP candidate. When the number of the available inherited candidates is less than two, the encoding apparatus/decoding apparatus may add the constructed candidate to the affine MVP list of the current block. For example, the encoding apparatus/decoding apparatus may derive one constructed affine candidate.

Meanwhile, the method of deriving the constructed affine candidate may be different depending on whether the affine motion model applied to the current block is 6-affine motion model or 4-affine motion model. Specific contents for the method of deriving the constructed candidate will be described later.

The encoding apparatus/decoding apparatus may add the HEVC AMVP candidate to the affine MVP list of the current block (S1320). When the number of the available inherited candidate and/or the constructed candidate is less than two, the encoding apparatus/decoding apparatus may add the HEVC AMVP candidate to the affine MVP list of the current block. That is, when the number of the available inherited candidate and/or the constructed candidate is less than two, the encoding apparatus and/or the decoding apparatus may perform the process to configure an MVP candidate in the conventional HEVC standard.

Meanwhile, a method of deriving the constructed candidate may be as follows.

Figure 14:
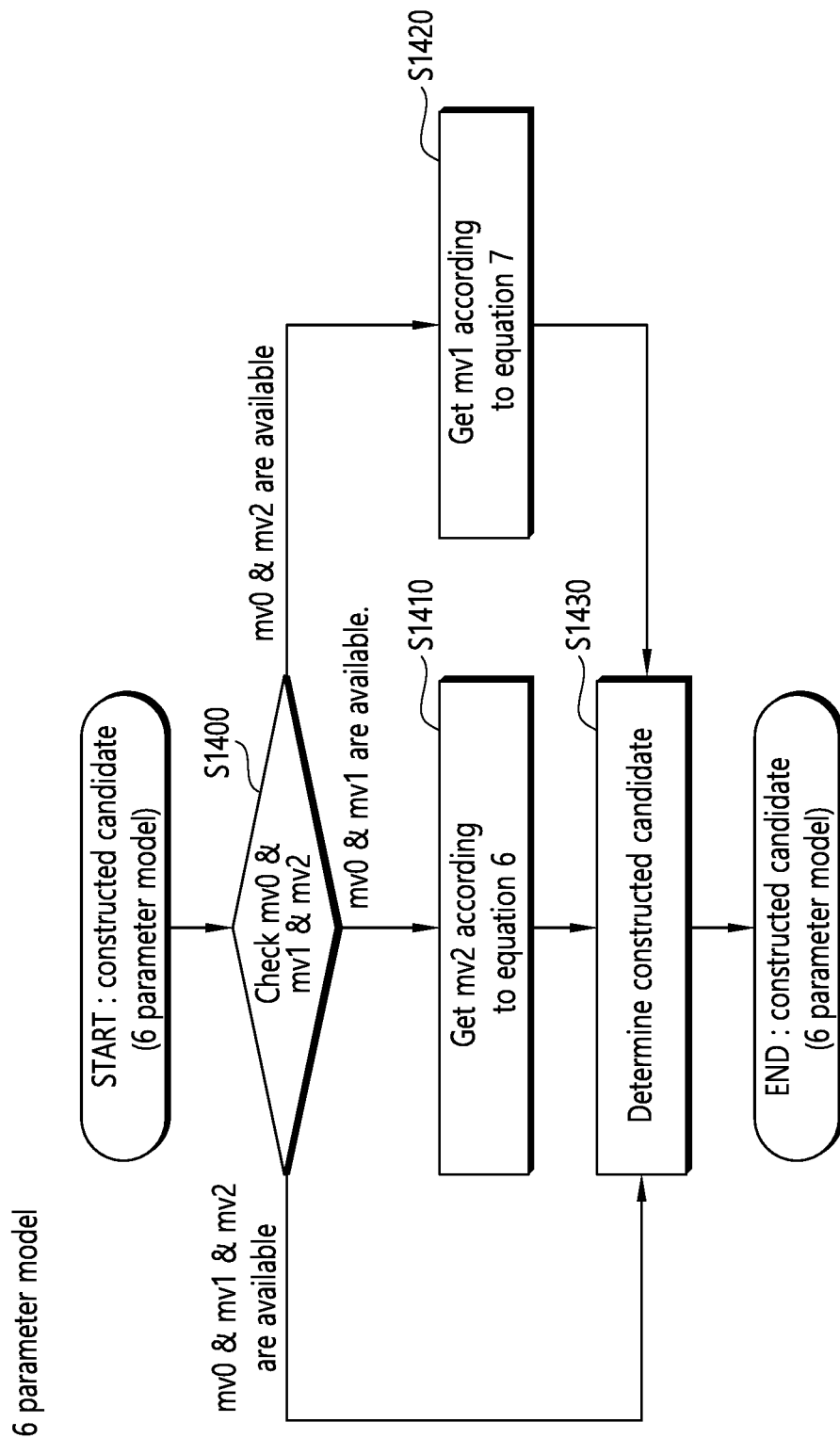
FIG. 14 represents an example of deriving the constructed candidate.

For example, when the affine motion model applied to the current block is 6-affine motion model, the constructed candidate may be derived as in an example shown in FIG. 14.

FIG. 14 represents an example of deriving the constructed candidate.

Referring to FIG. 14, the encoding apparatus/decoding apparatus may check $mv_0$, $mv_1$, and $mv_2$ for the current block (S1400). That is, the encoding apparatus/decoding apparatus may determine whether available $mv_0$, $mv_1$, or $mv_2$ exists in the neighboring blocks of the current block. Here, the $mv_0$ may be a CPMVP candidate of CP0 of the current block; the $mv_1$, a CPMVP candidate of CP1; and the $mv_2$, a CPMVP candidate of CP2. Further, the $mv_0$, the $mv_1$, and the $mv_2$ may be represented to be candidate motion vectors of the CPs.

For example, the encoding apparatus/decoding apparatus may check motion vectors of the neighboring blocks in a first group in a specific order whether it satisfies a specific condition. The encoding apparatus/decoding apparatus may derive as the $mv_0$ the motion vector of the neighboring block which has been first confirmed to satisfy the condition during the check process. That is, the $mv_0$ may be a motion vector which has been first confirmed to satisfy the specific condition while checking motion vectors in the first group in a specific order. When the motion vectors of the neighboring blocks in the first group do not satisfy the specific condition, there may be no available $mv_0$. Here, for example, the specific order may be one from the neighboring block A to the neighboring block B, and then to the neighboring block C in the first group. Further, for example, the specific condition may be that the reference picture for the motion vector of the neighboring block should be the same as the reference picture of the current block.

Further, for example, the encoding apparatus/decoding apparatus may check motion vectors of the neighboring blocks in a second group in a specific order whether it satisfies a specific condition. The encoding apparatus/decoding apparatus may derive as the $mv_1$ the motion vector of the neighboring block which has been first confirmed to satisfy the condition during the check process. That is, the $mv_1$ may be a motion vector which has been first confirmed to satisfy the specific condition while checking motion vectors in the second group in a specific order. When the motion vectors of the neighboring blocks in the second group do not satisfy the specific condition, there may be no available $mv_1$. Here, for example, the specific order may be one from the neighboring block D to the neighboring block E in the second group. Further, for example, the specific condition may be that the reference picture for the motion vector of the neighboring block should be the same as the reference picture of the current block.

Further, for example, the encoding apparatus/decoding apparatus may check motion vectors of the neighboring blocks in a third group in a specific order whether it satisfies a specific condition. The encoding apparatus/decoding apparatus may derive as the $mv_2$ the motion vector of the neighboring block which has been first confirmed to satisfy the condition during the check process. That is, the $mv_2$ may be a motion vector which has been first confirmed to satisfy the specific condition while checking motion vectors in the third group in a specific order. When the motion vectors of the neighboring blocks in the third group do not satisfy the specific condition, there may be no available $mv_2$. Here, for example, the specific order may be one from the neighboring block F to the neighboring block G in the third group. Further, for example, the specific condition may be that the reference picture for the motion vector of the neighboring block should be the same as the reference picture of the current block.

Meanwhile, the first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

When only the $mv_0$ and the $mv_1$ for the current block are available, that is, when only the $mv_0$ and the $mv_1$ for the current block are derived, the encoding apparatus/decoding apparatus may derive $mv_2$ for the current block based on forgoing Equation 6 (S1410). The encoding apparatus/decoding apparatus may derive the $mv_2$ by substituting the derived $mv_0$ and the $mv_1$ in forgoing Equation 6.

When only the $mv_0$ and the $mv_2$ for the current block are available, that is, when only the $mv_0$ and the $mv_2$ for the current block are derived, the encoding apparatus/decoding apparatus may derive $mv_1$ for the current block based on forgoing Equation 7 (S1420). The encoding apparatus/decoding apparatus may derive the $mv_1$ by substituting the derived $mv_0$ and the $mv_2$ in forgoing Equation 7.

The encoding apparatus/decoding apparatus may derive the derived $mv_0$, $mv_1$ and $mv_2$ as the constructed candidate of the current block (S1430). When the $mv_0$, the $mv_1$ and the $mv_2$ are available, that is, when the $mv_0$, the $mv_1$ and the $mv_2$ are derived based on the neighboring block of the current block, the encoding apparatus/decoding apparatus may derive the derived $mv_0$, the $mv_1$ and the $mv_2$ as the constructed candidates of the current block.

Further, when only the $mv_0$ and the $mv_1$ for the current block are available, that is, when only the $mv_0$ and the $mv_1$ for the current block are derived, the encoding apparatus/decoding apparatus may derive as the constructed candidate of the current block $mv_0$, the $mv_1$ and $mv_2$ derived based on forgoing Equation 6.

Further, when only the $mv_0$ and the $mv_2$ for the current block are available, that is, when only the $mv_0$ and the $mv_2$ for the current block are derived, the encoding apparatus/decoding apparatus may derive as the constructed candidate of the current block the derived $mv_0$, the $mv_2$, and $mv_1$ derived based on-forgoing Equation 7.

Figure 15:
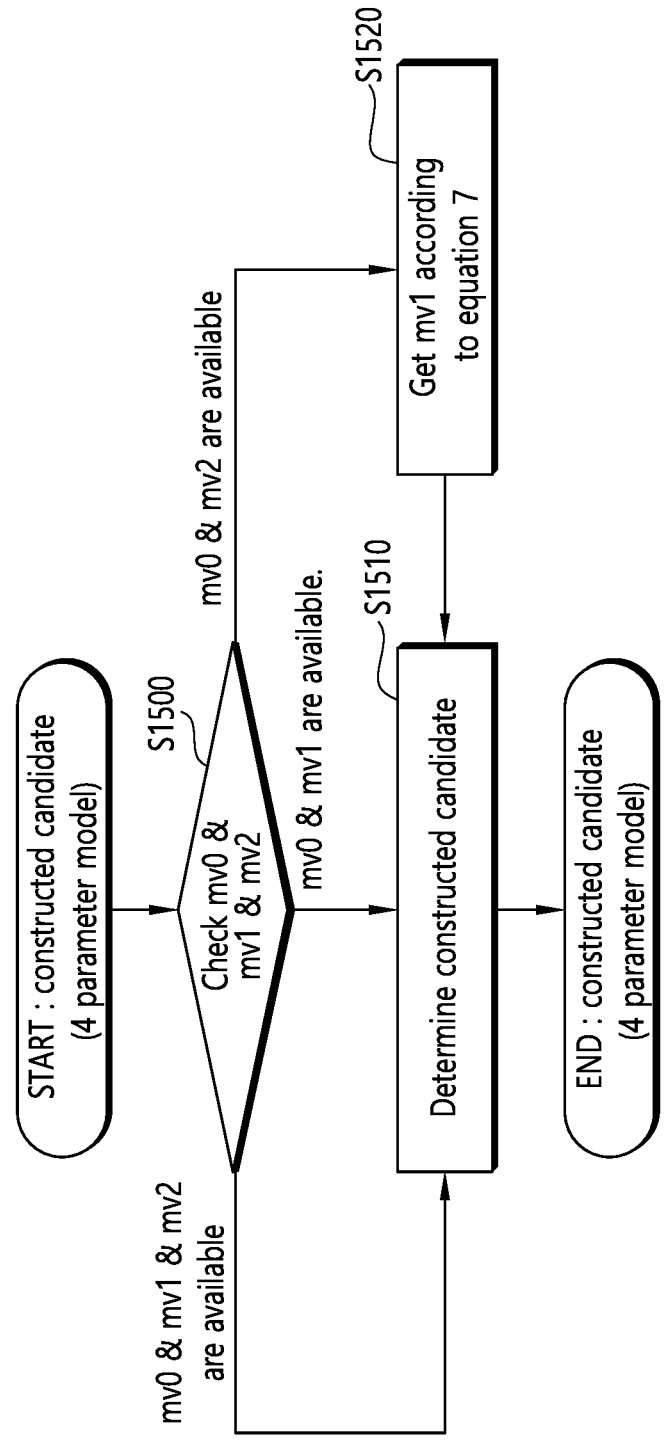
FIG. 15 represents an example of deriving the constructed candidate.

Further, for example, when the affine motion model applied to the current block is 4-affine motion model, the constructed candidate may be derived as in an example shown in FIG. 15.

FIG. 15 represents an example of deriving the constructed candidate.

Referring to FIG. 15, the encoding apparatus/decoding apparatus may check $mv_0$, $mv_1$, and $mv_2$ for the current block (S1500). That is, the encoding apparatus/decoding apparatus may determine whether available $mv_0$, $mv_1$, or $mv_2$ exists in the neighboring blocks of the current block. Here, the $mv_0$ may be a CPMVP candidate of CP0 of the current block; the $mv_1$, a CPMVP candidate of CP1; and the $mv_2$, a CPMVP candidate of CP2.

For example, the encoding apparatus/decoding apparatus may check motion vectors of the neighboring blocks in a first group in a specific order whether it satisfies a specific condition. The encoding apparatus/decoding apparatus may derive as the $mv_0$ the motion vector of the neighboring block which has been first confirmed to satisfy the condition during the check process. That is, the $mv_0$ may be a motion vector which has been first confirmed to satisfy the specific condition while checking motion vectors in the first group in a specific order. When the motion vectors of the neighboring blocks in the first group do not satisfy the specific condition, there may be no available $mv_0$. Here, for example, the specific order may be one from the neighboring block A to the neighboring block B, and then to the neighboring block C in the first group. Further, for example, the specific condition may be that the reference picture for the motion vector of the neighboring block should be the same as the reference picture of the current block.

Further, for example, the encoding apparatus/decoding apparatus may check motion vectors of the neighboring blocks in a second group in a specific order whether it satisfies a specific condition. The encoding apparatus/decoding apparatus may derive as the $mv_1$ the motion vector of the neighboring block which has been first confirmed to satisfy the condition during the check process. That is, the $mv_1$ may be a motion vector which has been first confirmed to satisfy the specific condition while checking motion vectors in the second group in a specific order. When the motion vectors of the neighboring blocks in the second group do not satisfy the specific condition, there may be no available $mv_1$. Here, for example, the specific order may be one from the neighboring block D to the neighboring block E in the second group. Further, for example, the specific condition may be that the reference picture for the motion vector of the neighboring block should be the same as the reference picture of the current block.

Further, for example, the encoding apparatus/decoding apparatus may check motion vectors of the neighboring blocks in a third group in a specific order whether it satisfies a specific condition. The encoding apparatus/decoding apparatus may derive as the $mv_2$ the motion vector of the neighboring block which has been first confirmed to satisfy the condition during the check process. That is, the $mv_2$ may be a motion vector which has been first confirmed to satisfy the specific condition while checking motion vectors in the third group in a specific order. When the motion vectors of the neighboring blocks in the third group do not satisfy the specific condition, there may be no available $mv_2$. Here, for example, the specific order may be one from the neighboring block F to the neighboring block G in the third group. Further, for example, the specific condition may be that the reference picture for the motion vector of the neighboring block should be the same as the reference picture of the current block.

Meanwhile, the first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

When only the $mv_0$ and the $mv_1$ for the current block are available or when the $mv_0$, the $mv_1$, and the $mv_2$ for the current block are available, that is, when only the $mv_0$ and the $mv_1$ for the current block are derived or when the $mv_0$, the $mv_1$, and the $mv_2$ for the current block are derived, the encoding apparatus/decoding apparatus may derive the derived $mv_0$ and the $mv_1$ as the constructed candidate of the current block (S1510).

Meanwhile, when only the $mv_0$ and the $mv_2$ for the current block are available, that is, when only the $mv_0$ and the $mv_2$ for the current block are derived, the encoding apparatus/decoding apparatus may derive $mv_1$ for the current block based on forgoing Equation 7 (S1520). The encoding apparatus/decoding apparatus may derive the $mv_1$ by substituting the derived $mv_0$ and the $mv_2$ in forgoing Equation 7.

After this, the encoding apparatus/decoding apparatus may derive the derived $mv_0$ and $mv_1$ as the constructed candidate of the current block (S1510).

Meanwhile, the present document proposes another example of deriving the inherited affine candidate. The proposed example can improve coding performance by reducing computational complexity in deriving the inherited affine candidate.

Meanwhile, the present document proposes another example of deriving the inherited affine candidate. The proposed example can improve coding performance by reducing computational complexity in deriving the inherited affine candidate.

Figure 16:
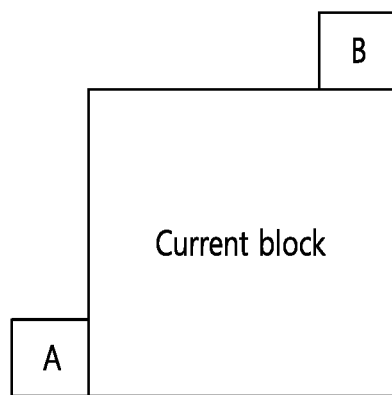
FIG. 16 illustratively represents a neighboring block position which is scanned to derive the inherited affine candidate.

FIG. 16 illustratively represents a neighboring block position which is scanned to derive the inherited affine candidate.

The encoding apparatus/decoding apparatus may derive the maximum two inherited affine candidates from neighboring blocks of the current block. FIG. 16 may represent the neighboring blocks for the inherited affine candidates. For example, the neighboring blocks may include a neighboring block A and a neighboring block B shown in FIG. 16. The neighboring block A may represent the above-described left neighboring block A0, and the neighboring block B may represent the above-described top neighboring block B0.

For example, the encoding apparatus/decoding apparatus may check the neighboring blocks in a specific order whether it is available, and derive the inherited affine candidate of the current block based on the neighboring block which is first confirmed to be available. That is, the encoding apparatus/decoding apparatus may check the neighboring blocks in a specific order whether it satisfies a specific condition, and derive the inherited affine candidate of the current block based on the neighboring block which is first confirmed to be available. Further, the encoding apparatus/decoding apparatus may derive the inherited affine candidate of the current block based on the neighboring block which is second confirmed to satisfy the specific condition. That is, the encoding apparatus/decoding apparatus may derive the inherited affine candidate of the current block based on the neighboring block which is second confirmed to satisfy the specific condition. Here, being available may be that a block is coded with the affine motion model, and that a reference picture of a block is the same as a reference picture of the current block. That is, the specific condition may be that a block is coded with the affine motion model, and that a reference picture of a block is the same as a reference picture of the current block. Further, for example, the specific order may be the following one: the neighboring block A→the neighboring block B. Meanwhile, a pruning check process between two inherited affine candidates (i.e., derived inherited affine candidates) may not be performed. The pruning check process may represent a process by which candidates are checked whether they are the same as each other, and, if they are the same, the candidate derived at a later order is removed.

The foregoing example proposes a method of deriving the inherited affine candidate by checking only two neighboring blocks (i.e., the neighboring blocks A, and B) instead of deriving the inherited affine candidate by checking all the conventional neighboring blocks (i.e., the neighboring blocks A, B, C, D, and E). Here, the neighboring block C may represent the above-described top-right corner neighboring block B1; the neighboring block D, the above-described bottom-left corner neighboring block A1; and the neighboring block E, the above-described top-left corner neighboring block B2.

In order to analyze spatial correlation between the neighboring blocks and the current block according to affine inter prediction, the probability that the affine prediction is applied to the current block when the affine prediction is applied to the respective neighboring blocks may be referenced. The probability that the affine prediction is applied to the current block when the affine prediction is applied to the respective neighboring blocks may be derived as the following table.

TABLE 2

| REFERENCE BLOCK | A | B | C | D | E |
|---|---|---|---|---|---|
| PROBABILITY | 65% | 41% | 5% | 3% | 1% |

Referring to Table 2, it can be confirmed that the spatial correlations of the neighboring blocks A and B among the neighboring blocks to the current block are high. Therefore, through an example of deriving the inherited affine candidate using only the neighboring blocks A and B whose spatial correlations are high, it is possible to achieve advantageous effects of reducing the processing time and providing high decoding performance.

Meanwhile, the pruning check process may be performed to prevent the same candidates from existing in the candidate list. As the pruning check process may remove redundancy, there may be a merit in terms of encoding efficiency, and however, there is a drawback that the computational complexity increases by performing the pruning check process. Particularly, as the pruning check process for the affine candidate should be performed on the affine type (e.g., the affine motion model is 4-affine motion model or 6-affine motion model), the reference picture (or reference picture index), CP0, CP1 and CP2 of MV, the computational complexity is very high. Therefore, the present example proposes a method of not performing the pruning check process between the inherited affine candidate (e.g., inherited_A) derived based on the neighboring block A and the inherited affine candidate (e.g., inherited_B)derived based on the neighboring block B. The neighboring blocks A and B are far in distance, and thus their spatial correlation is low. Therefore, the probability that the inherited_A and the inherited_B are the same is very low. Accordingly, it is appropriate that the pruning check process between the inherited affine candidates is not performed.

Alternatively, a method of performing a minimal pruning check process may be proposed based on the above. For example, the encoding apparatus/decoding apparatus may perform the pruning check process by comparing MVs of CP0 of the inherited affine candidate.

Meanwhile, the present document proposes another example of deriving the inherited affine candidate.

Figure 17:
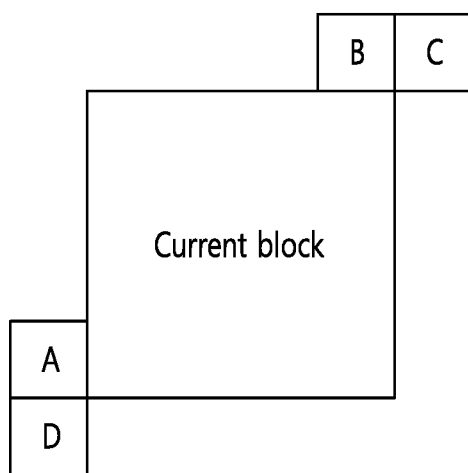
FIG. 17 illustratively represents a neighboring block position which is scanned to derive the inherited affine candidate.

FIG. 17 illustratively represents a neighboring block position which is scanned to derive the inherited affine candidate.

The encoding apparatus/decoding apparatus may derive the maximum two inherited affine candidates from neighboring blocks of the current block. FIG. 17 may represent the neighboring blocks for the inherited affine candidates. For example, the neighboring blocks may include a neighboring block A to a neighboring block D shown in FIG. 17. The neighboring block A may represent the above-described left neighboring block A0; the neighboring block B, the above-described top neighboring block B0; the neighboring block C, the above-described top-right corner neighboring block B1; and the neighboring block D, the above-described bottom-left corner neighboring block A1.

For example, the encoding apparatus/decoding apparatus may check the neighboring blocks in a specific order whether it is available, and derive the inherited affine candidate of the current block based on the neighboring block which is first confirmed to be available. That is, the encoding apparatus/decoding apparatus may check the neighboring blocks in a specific order whether it satisfies a specific condition, and derive the inherited affine candidate of the current block based on the neighboring block which is first confirmed to be available. Further, the encoding apparatus/decoding apparatus may derive the inherited affine candidate of the current block based on the neighboring block which is second confirmed to satisfy the specific condition. That is, the encoding apparatus/decoding apparatus may derive the inherited affine candidate of the current block based on the neighboring block which is second confirmed to satisfy the specific condition. Here, being available may be that a block is coded with the affine motion model, and that a reference picture of a block is the same as a reference picture of the current block. That is, the specific condition may be that a block is coded with the affine motion model, and that a reference picture of a block is the same as a reference picture of the current block.

The neighboring blocks A and D of FIG. 17 may be used when deriving a left predictor among the inherited affine candidate, and the neighboring blocks B and C may be used when deriving a top predictor among the inherited affine candidate.

The left predictor, that is the motion candidate which may be added from the left neighboring block, may be added to a candidate to which "neighboring significant block" that is first determined to be available in block A→block D or block D→block A order is inherited. The top predictor, that is the motion candidate which may be added from the top neighboring block, may be added to a candidate to which "neighboring significant block" that is first determined to be available in block B→block C or block C→block B order is inherited. That is, the maximum number of the inherited candidate which may be derived from each of the left predictor and the top predictor is one.

When the "neighboring significant block" is coded with 4-parameter affine motion model, the inherited candidate may be determined using 4-parameter affine motion model, and when the "neighboring significant block" is coded with 6-parameter affine motion model, the inherited candidate may be determined using 6-parameter affine motion model.

When the number of the inherited candidates determined by the left predictor and the top predictor is two, the pruning check process may be performed or not be performed. Although it is general to perform the pruning check process and prevent the same candidate from being added into the candidate list, the pruning check process increases complexity because MV of each CP should be compared in motion prediction in which the affine model is used. However, when the inherited candidate is configured using the example described with reference to FIG. 17, the probability that the candidates determined by the left predictor and the top predictor are different from each other is very high because the candidates are far in distance. Therefore, there is an advantage that, even without performing the pruning check process, the coding performance rarely decreases.

Meanwhile, the present document proposes still another example of deriving the inherited affine candidate.

Figure 18:
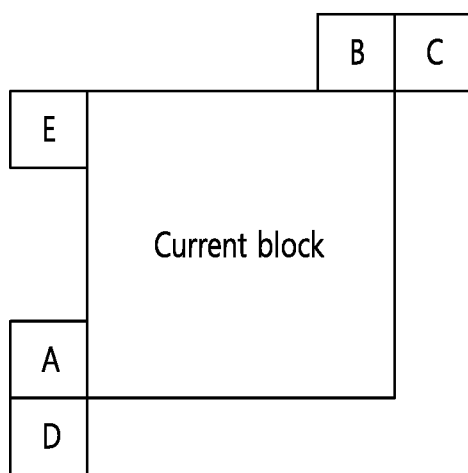
FIG. 18 illustratively represents a position for deriving the inherited affine candidate.

FIG. 18 illustratively represents a position for deriving the inherited affine candidate.

The encoding apparatus/decoding apparatus may derive the maximum two inherited affine candidates from neighboring blocks of the current block. FIG. 18 may represent the neighboring blocks for the inherited affine candidates according to the example. For example, the neighboring blocks may include a neighboring block A to a neighboring block E shown in FIG. 18. The neighboring block A may represent the above-described left neighboring block A0; the neighboring block B, the above-described top neighboring block B0; the neighboring block C, the above-described top-right corner neighboring block B1; the neighboring block D, the above-described bottom-left corner neighboring block A1; and the neighboring block E, a left neighboring block located adjacent to the bottom of the top-left corner neighboring block B2.

For example, the encoding apparatus/decoding apparatus may check the neighboring blocks in a specific order whether it is available, and derive the inherited affine candidate of the current block based on the neighboring block which is first confirmed to be available. That is, the encoding apparatus/decoding apparatus may check the neighboring blocks in a specific order whether it satisfies a specific condition, and derive the inherited affine candidate of the current block based on the neighboring block which is first confirmed to be available. Further, the encoding apparatus/decoding apparatus may derive the inherited affine candidate of the current block based on the neighboring block which is second confirmed to satisfy the specific condition. That is, the encoding apparatus/decoding apparatus may derive the inherited affine candidate of the current block based on the neighboring block which is second confirmed to satisfy the specific condition. Here, being available may be that a block is coded with the affine motion model, and that a reference picture of a block is the same as a reference picture of the current block. That is, the specific condition may be that a block is coded with the affine motion model, and that a reference picture of a block is the same as a reference picture of the current block.

The neighboring blocks A, D and E of FIG. 18 may be used when deriving a left predictor among the inherited affine candidate, and the neighboring blocks B and C may be used when deriving a top predictor among the inherited affine candidate.

The left predictor, that is the motion candidate which may be added at the left neighboring block, may be added to a candidate to which "neighboring significant block" that is first determined to be available in block A→block E→block D (or block A→block E→block D, block D→block A→block E) order is inherited. The top predictor, that is the motion candidate which may be added at the top neighboring block, may be added to a candidate to which "neighboring significant block" that is first determined to be available in block B→block C or block C→block B order is inherited. That is, the maximum number of the inherited candidate which may be derived from each of the left predictor and the top predictor is one.

When the "neighboring significant block" is coded with 4-parameter affine motion model, the inherited candidate may be determined using 4-parameter affine motion model, and when the "neighboring significant block" is coded with 6-parameter affine motion model, the inherited candidate may be determined using 6-parameter affine motion model.

When the number of the inherited candidates determined by the left predictor and the top predictor is two, the pruning check process may be performed or not be performed. Although it is general to perform the pruning check process and prevent the same candidate from being added into the candidate list, the pruning check process increases complexity because MV of each CP should be compared in motion prediction in which the affine model is used. However, when the inherited candidate is configured using the example described with reference to FIG. 18, the probability that the candidates determined by the left predictor and the top predictor are different from each other is very high because the candidates are far in distance. Therefore, there is an advantage that, even without performing the pruning check process, the coding performance rarely decreases.

Meanwhile, a pruning check method whose complexity is low may be used instead of performing the pruning check process. For example, the pruning check process may be performed with a method of comparing only MV of CP0.

The reason that E is determined to be at a position of a neighboring block to be scanned for the inherited candidate is as follows. In a line buffer reduction method to be described later, when the reference block (i.e., the neighboring block B, the neighboring block C) located above the current block does not exist in the same CTU as the current block, the line buffer reduction method may not be used. Therefore, when the line buffer reduction method is applied together while generating the inherited candidate, the position of the neighboring block expressed in FIG. 18 is used to maintain the coding performance.

Further, the method may configure maximum one inherited candidate and use it as the affine MVP candidate. At this time, the motion vector of the neighboring block which is first significant based on an order of A→B→C→D without distinction of the left predictor and the top predictor may be used as the inherited candidate.

Meanwhile, the present document proposes still another example of deriving the inherited affine candidate.

In the present example, the inherited candidate may be derived using the neighboring block shown in FIG. 18.

That is, the encoding apparatus/decoding apparatus may derive the maximum two inherited affine candidates from neighboring blocks of the current block.

Further, the encoding apparatus/decoding apparatus may check the neighboring blocks in a specific order whether it is available, and derive the inherited affine candidate of the current block based on the neighboring block which is first confirmed to be available. That is, the encoding apparatus/decoding apparatus may check the neighboring blocks in a specific order whether it satisfies a specific condition, and derive the inherited affine candidate of the current block based on the neighboring block which is first confirmed to be available. Further, the encoding apparatus/decoding apparatus may derive the inherited affine candidate of the current block based on the neighboring block which is second confirmed to satisfy the specific condition. That is, the encoding apparatus/decoding apparatus may derive the inherited affine candidate of the current block based on the neighboring block which is second confirmed to satisfy the specific condition. Here, being available may be that a block is coded with the affine motion model, and that a reference picture of a block is the same as a reference picture of the current block. That is, the specific condition may be that a block is coded with the affine motion model, and that a reference picture of a block is the same as a reference picture of the current block.

As described above, the neighboring blocks A, D and E may be used when deriving a left predictor among the inherited affine candidate, and the neighboring blocks B and C may be used when deriving a top predictor among the inherited affine candidate.

The left predictor, that is the motion candidate which may be added at the left neighboring block, may be added to a candidate to which "neighboring significant block" that is first determined to be available in block A→block E→block D (or block A→block E→block D, block D→block A→block E) order is inherited. The top predictor, that is the motion candidate which may be added at the top neighboring block, may be added to a candidate to which "neighboring significant block" that is first determined to be available in block B→block C or block C→block B order is inherited. That is, the maximum number of the inherited candidate which may be derived from each of the left predictor and the top predictor is one.

When the "neighboring significant block" is coded with 4-parameter affine motion model, the inherited candidate may be determined using 4-parameter affine motion model, and when the "neighboring significant block" is coded with 6-parameter affine motion model, the inherited candidate may be determined using 6-parameter affine motion model.

Further, according to even the present example, when the number of the inherited candidates determined by the left predictor and the top predictor is two, the pruning check process may be performed or not be performed. Although it is general to perform the pruning check process and prevent the same candidate from being added into the candidate list, the pruning check process increases complexity because MV of each CP should be compared in motion prediction in which the affine model is used. However, when the inherited candidate is configured using the example described with reference to FIG. 18, the probability that the candidates determined by the left predictor and the top predictor are different from each other is very high because the candidates are far in distance. Therefore, there is an advantage that, even without performing the pruning check process, the coding performance rarely decreases.

Meanwhile, a pruning check method whose complexity is low may be used instead of performing the pruning check process. For example, the pruning check process may be performed determining whether the neighboring block E is included in the same coding block as the neighboring block A only when the neighboring block E is a "neighboring significant block". The complexity is low because it performs the pruning check only one time. The reason that the pruning check is performed only on the neighboring block E is that the probability that the reference block (the neighboring block B, the neighboring block C) of the top predictor except the neighboring block E, and the reference block (the neighboring block A, the neighboring block D) of the left predictor configure the same inherited candidate is very low because they are located enough far from each other, and because contrarily, in the case of the neighboring block E, the probability that it configures the same inherited candidate exists when it is included in the same block as the neighboring block A.

The reason that E is determined as a position of a neighboring block to be scanned for the inherited candidate is as follows. In a line buffer reduction method to be described later, when the reference block (i.e., the neighboring block B, the neighboring block C) located above the current block does not exist in the same CTU as the current block, the line buffer reduction method may not be used. Therefore, when the line buffer reduction method is applied together while generating the inherited candidate, the position of the neighboring block expressed in FIG. 18 is used to maintain the coding performance.

Further, the method may configure maximum one inherited candidate and use it as the affine MVP candidate. At this time, the motion vector of the neighboring block which is first significant based on an order of A→B→C→D without distinction of the left predictor and the top predictor may be used as the inherited candidate.

Meanwhile, according to an example of the present document, the generation method of the affine MVP list described with reference to FIGS. 16 to 18 may be applied to a method of deriving the inherited candidate of the merge candidate list based on the affine motion model. According to the present example, there is an advantage in terms of design cost because the same process can be applied to the affine MVP list generation and the merge candidate list generation. An example of generating the merge candidate list based on the affine motion model is as follows, and this process may be applied to configure the inherited candidate when generating other merge list.

Specifically, the merge candidate list may be configured as below.

Figure 19:
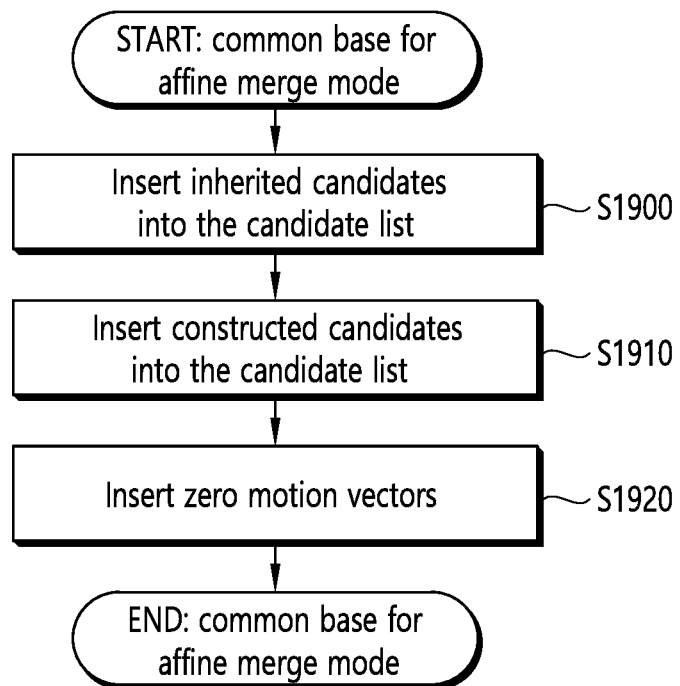
FIG. 19 represents an example of configuring the merge candidate list of the current block.

FIG. 19 represents an example of configuring the merge candidate list of the current block.

Referring to FIG. 19, the encoding apparatus/decoding apparatus may add the inherited merge candidate to the merge candidate list (S1900).

Specifically, the encoding apparatus/decoding apparatus may derive the inherited candidate based on the neighboring blocks of the current block.

Neighboring blocks of the current block for deriving the inherited candidate are as in FIG. 11. That is, the neighboring blocks of the current block may include a bottom-left corner neighboring block A0 of the current block, a left neighboring block A1 of the current block, an top-right corner neighboring block B0 of the current block, an top neighboring block B1 of the current block, and a top-left corner neighboring block B2 of the current block.

The inherited candidate may be derived based on a significant neighboring reconstructed block which has been coded in the affine mode. For example, the encoding apparatus/decoding apparatus may check the neighboring blocks A0, A1, B0, B1 and B2 sequentially, or neighboring blocks A1, B1 B0, A0 and B2 sequentially, and, if the neighboring block has been coded in the affine mode (that is, if the neighboring block is a neighboring block which has been significantly reconstructed by using the affine motion model), may derive two CPMVs or three CPMVs for the current block based on the affine motion model of the neighboring block, and the CPMVs may be derived as the inherited candidate of the current block. As one example, maximum five inherited candidates may be added into the merge candidate list. That is, the maximum five inherited candidates may be derived based on the neighboring blocks.

When following the present example, in order to derive the inherited candidate, not the neighboring block of FIG. 11 but the neighboring block of FIGS. 16 to 18 may be used and the example described with reference to FIGS. 16 to 18 may be applied.

After this, the encoding apparatus/decoding apparatus may add a constructed candidate into the merge candidate list (S1910).

For example, if the number of merge candidates of the merge candidate list is less than five, the constructed candidate may be added into the merge candidate list. The constructed candidate may represent a merge candidate which is generated by combining neighboring motion information on each of CPs of the current block (i.e., motion vector of the neighboring block and reference picture index). The motion information on each of CPs may be derived based on a spatial neighboring block or a temporal neighboring block for the corresponding CP. The motion information on each of the CPs may be represented as a candidate motion vector for the corresponding CP.

Figure 20:
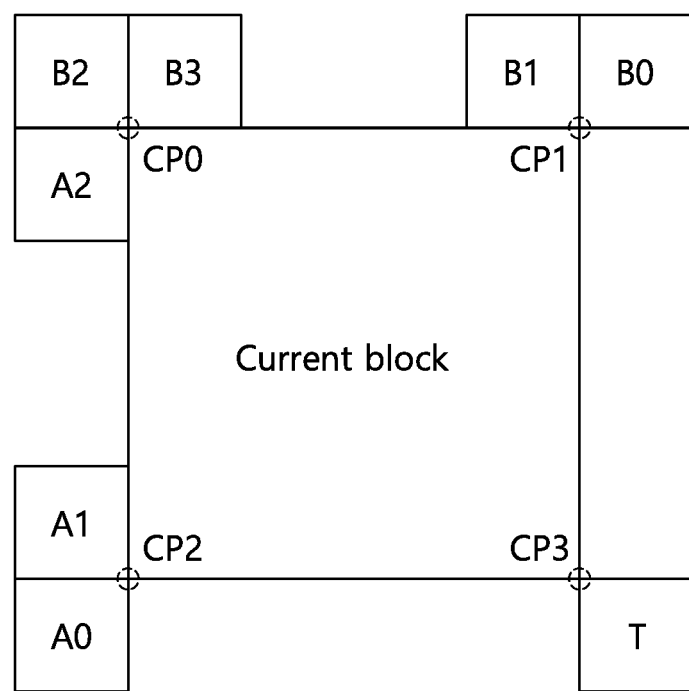
FIG. 20 represents neighboring blocks of the current block for deriving a constructed candidate according to an example of the present document.

FIG. 20 represents neighboring blocks of the current block for deriving a constructed candidate according to an example of the present document.

Referring to FIG. 20, the neighboring blocks may include spatial neighboring blocks and a temporal neighboring block. The spatial neighboring blocks may include a neighboring block A0, a neighboring block A1, a neighboring block A2, a neighboring block B0, a neighboring block B1, a neighboring block B2, and a neighboring block B3. A neighboring block T shown in FIG. 20 may represent the temporal neighboring block.

Here, the neighboring block B2 may represent a neighboring block located top left of a top-left sample position of the current block; the neighboring block B3, a neighboring block located top of the top-left sample position of the current block; and the neighboring block A2, a neighboring block located left of the top-left sample position of the current block. In addition, the neighboring block B1 may represent a neighboring block located top of the top-right sample position of the current block; and the neighboring block B0, a neighboring block located top right of the top-right sample position of the current block. In addition, the neighboring block A1 may represent a neighboring block located left of the bottom-left sample position of the current block; and the neighboring block A0, a neighboring block located bottom left of the bottom-left sample position of the current block.

Further, referring to FIG. 20, the CPs of the current block may include CP0, CP1, CP2 and/or CP3. The CP0 may represent a top-left position of the current block; the CP1, a top-right position of the current block; the CP2, a bottom-left position of the current block; and the CP3, a bottom-right position of the current block. For example, if a size of the current block is W×H, and x component of the top-left sample position of the current block is 0 and y component thereof is 0, the CP0 may represent a position at coordinates (0, 0); the CP1, a position at coordinates (W, 0); the CP2, a position at coordinates (0, H); and the CP3, a position at coordinates (W, H).

A motion vector for each of the forgoing CPs may be derived as below.

For example, the encoding apparatus/decoding apparatus may check neighboring blocks in a first group in a first order whether it is available, and may derive as a candidate motion vector for the CP0 a motion vector of the neighboring block which is first confirmed to be available during the check process. That is, the candidate motion vector for the CP0 may be a motion vector of the neighboring block which is first confirmed to be available while checking neighboring blocks in the first group in the first order. The being available may represent existence of a motion vector of the neighboring block. That is, the available neighboring block may be a block which has been coded in inter prediction (that is, a block to which the inter prediction has been applied). Here, for example, the first group may include the neighboring block B2, the neighboring block B3 and the neighboring block A2. The first order may be an order in the first group from the neighboring block B2 to the neighboring block B3, and then to the neighboring block A2. As one example, if the neighboring block B2 is available, the motion vector of the neighboring block B2 may be derived as the candidate motion vector for the CP0; if the neighboring block B2 is not available and the neighboring block B3 is available, the motion vector of the neighboring block B3, as the candidate motion vector for the CP0; and if none of the neighboring blocks B2 and B3 is available and the neighboring block A2 is available, the motion vector of the neighboring block A2, as the candidate motion vector for the CP0.

Further, for example, the encoding apparatus/decoding apparatus may check neighboring blocks in a second group in a second order whether it is available, and may derive as a candidate motion vector for the CP1 a motion vector of the neighboring block which is first confirmed to be available during the check process. That is, the candidate motion vector for the CP1 may be a motion vector of the neighboring block which is first confirmed to be available while checking neighboring blocks in the second group in the second order. The being available may represent existence of a motion vector of the neighboring block. That is, the available neighboring block may be a block which has been coded in inter prediction (that is, a block to which the inter prediction has been applied). Here, the second group may include the neighboring block B1 and the neighboring block B0. The second order may be an order in the second group from the neighboring block B1 to the neighboring block B0. As one example, if the neighboring block B1 is available, the motion vector of the neighboring block B1 may be derived as the candidate motion vector for the CP1; and if the neighboring block B1 is not available and the neighboring block B0 is available, the motion vector of the neighboring block B0, as the candidate motion vector for the CP1.

Further, for example, the encoding apparatus/decoding apparatus may check neighboring blocks in a third group along a third order whether it is available, and may derive as a candidate motion vector for the CP2 a motion vector of the neighboring block which is first confirmed to be available during the check process. That is, the candidate motion vector for the CP2 may be a motion vector of the neighboring block which is first confirmed to be available while checking neighboring blocks in the third group in the third order. The being available may represent existence of a motion vector of the neighboring block. That is, the available neighboring block may be a block which has been coded in inter prediction (that is, a block to which the inter prediction has been applied). Here, the third group may include the neighboring block A1 and the neighboring block A0. The third order may be an order in the third group from the neighboring block A1 to the neighboring block A0. As one example, if the neighboring block A1 is available, the motion vector of the neighboring block A1 may be derived as the candidate motion vector for the CP2; and if the neighboring block A1 is not available and the neighboring block A0 is available, the motion vector of the neighboring block A0, as the candidate motion vector for the CP2.

Further, for example, the encoding apparatus/decoding apparatus may check the temporal neighboring block (i.e., the neighboring block T) whether it is available, and if the temporal neighboring block (i.e., the neighboring block T) is available, a motion vector of the temporal neighboring block (i.e., the neighboring block T) may be derived as a candidate motion vector for the CP3.

Combination of the candidate motion vector for the CP0, the candidate motion vector for the CP1, the candidate motion vector for the CP2, and/or the candidate motion vector for the CP3 may be derived as a constructed candidate.

For example, as described above, the 6-affine model needs motion vectors of three CPs. For the 6-affine model, three CPs may be selected from among the CP0, the CP1, the CP2 and the CP3. For example, the CPs may be selected as one of {CP0, CP1, CP3}, {CP0, CP1, CP2}, {CP1, CP2, CP3} and {CP0, CP2, CP3}. As one example, the 6-affine model may be configured by using CP0, CP1 and CP2. In this case, the CPs may be represented as the {CP0, CP1, CP2}.

Further, for example, as described above, the 4-affine model needs motion vectors of two CPs. For the 4-affine model, two CPs may be selected from among the CP0, the CP1, the CP2 and the CP3. For example, the CPs may be selected as one of {CP0, CP3}, {CP1, CP2}, {CP0, CP1}, {CP1, CP3}, {CP0, CP2} and {CP2, CP3}. As one example, the 4-affine model may be constituted by using CP0 and CP1. In this case, the CPs may be represented as the {CP0, CP1}.

The constructed candidate, which is combinations of candidate motion vectors, may be added into the merge candidate list in the following order. That is, after candidate motion vectors for the CPs have been derived, the constructed candidate may be derived in the following order:

{CP0, CP1, CP2}, {CP0, CP1, CP3}, {CP0, CP2, CP3}, {CP1, CP2, CP3}, {CP0, CP1}, {CP0, CP2}, {CP1, CP2}, {CP0, CP3}, {CP1, CP3}, {CP2, CP3}

That is, for example, a constructed candidate including a candidate motion vector for the CP0, a candidate motion vector for the CP1 and a candidate motion vector for the CP2, a constructed candidate including a candidate motion vector for the CP0, a candidate motion vector for the CP1 and a candidate motion vector for the CP3, a constructed candidate including a candidate motion vector for the CP0, a candidate motion vector for the CP2 and a candidate motion vector for the CP3, a constructed candidate including a candidate motion vector for the CP1, a candidate motion vector for the CP2 and a candidate motion vector for the CP3, a constructed candidate including a candidate motion vector for the CP0 and a candidate motion vector for the CP1, a constructed candidate including a candidate motion vector for the CP0 and a candidate motion vector for the CP1, a constructed candidate including a candidate motion vector for the CP0 and a candidate motion vector for the CP2, a constructed candidate including a candidate motion vector for the CP1 and a candidate motion vector for the CP2, a constructed candidate including a candidate motion vector for the CP0 and a candidate motion vector for the CP3, a constructed candidate including a candidate motion vector for the CP1 and a candidate motion vector for the CP3, and a constructed candidate including a candidate motion vector for the CP2 and a candidate motion vector for the CP3 may be added into the merge candidate list in this order.

After this, the encoding apparatus/decoding apparatus may add a zero motion vectors to the merge candidate list (S1920).

For example, if the number of merge candidates of the merge candidate list is less than 5, a merge candidate including zero motion vectors may be added into the merge candidate list until the merge candidate list is configured with the maximum number of merge candidates. The maximum number of the merge candidates may be five. Further, the zero motion vector may represent a motion vector whose vector value is zero.

Meanwhile, the scanning method for configuring the candidate and the position of the neighboring blocks used in the generation method of the affine MVP list described with reference FIGS. 16 to 18 may be used to a normal merge and a normal MVP. Here, the normal merge may mean a merge mode which is not the affine merge mode and may be used in the HEVC or the like, and the normal MVP also may mean an AMVP which is not the affine MVP and may be used in the HEVC. For example, applying the method described with reference to FIG. 16 to the normal merge and/or the normal MVP specifically means scanning the neighboring block of the spatial position of FIG. 16, and/or configuring the left predictor and the top predictor using the neighboring block of FIG. 16, and/or performing the pruning check or performing with a method of low complexity. When this method is applied to the normal merge or the normal MVP, there may be an advantageous effect in terms of design cost.

Further, the present document proposes a method of deriving the constructed candidate, which is different from the above-described example. The proposed example can improve the coding performance by reducing the complexity when compared with the described-above example of deriving a constructed candidate. The proposed example is as described later. Further, when the number of the available inherited affine candidates is less than two (that is, the number of derived inherited affine candidates is less than two), the constructed affine candidate may be considered.

For example, the encoding apparatus/decoding apparatus may check $mv_0$, $mv_1$, and $mv_2$ for the current block. That is, the encoding apparatus/decoding apparatus may determine whether available $mv_0$, $mv_1$, or $mv_2$ exists in the neighboring blocks of the current block. Here, the $mv_0$ may be a CPMVP candidate of CP0 of the current block; the $mv_1$, a CPMVP candidate of CP1; and the $mv_2$, a CPMVP candidate of CP2.

Specifically, the neighboring blocks of the current block may be divided into three groups, and the neighboring blocks may include a neighboring block A, a neighboring block B, a neighboring block C, a neighboring block D, a neighboring block E, a neighboring block F, and a neighboring block G. The first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

The encoding apparatus/decoding apparatus may determine whether available $mv_0$ exists in the first group, may determine whether available $mv_1$ exists in the second group, and may determine whether available $mv_2$ exists in the third group.

Specifically, for example, the encoding apparatus/decoding apparatus may check motion vectors of the neighboring blocks in the first group in a specific order whether it satisfies a specific condition. The encoding apparatus/decoding apparatus may derive as the $mv_0$ the motion vector of the neighboring block which has been first confirmed to satisfy the condition during the check process. That is, the $mv_0$ may be a motion vector which has been first confirmed to satisfy the specific condition while checking motion vectors in the first group in a specific order. When the motion vectors of the neighboring blocks in the first group do not satisfy the specific condition, there may be no available $mv_0$. Here, for example, the specific order may be one from the neighboring block A to the neighboring block B, and then to the neighboring block C in the first group. Further, for example, the specific condition may be that the reference picture for the motion vector of the neighboring block should be the same as the reference picture of the current block.

Further, the encoding apparatus/decoding apparatus may check motion vectors of the neighboring blocks in the second group in a specific order whether it satisfies a specific condition. The encoding apparatus/decoding apparatus may derive as the $mv_1$ the motion vector of the neighboring block which has been first confirmed to satisfy the condition during the check process. That is, the $mv_1$ may be a motion vector which has been first confirmed to satisfy the specific condition while checking motion vectors in the second group in a specific order. When the motion vectors of the neighboring blocks in the second group do not satisfy the specific condition, there may be no available $mv_1$. Here, for example, the specific order may be one from the neighboring block D to the neighboring block E in the second group. Further, for example, the specific condition may be that the reference picture for the motion vector of the neighboring block should be the same as the reference picture of the current block.

Further, the encoding apparatus/decoding apparatus may check motion vectors of the neighboring blocks in the third group in a specific order whether it satisfies a specific condition. The encoding apparatus/decoding apparatus may derive as the $mv_2$ the motion vector of the neighboring block which has been first confirmed to satisfy the condition during the check process. That is, the $mv_2$ may be a motion vector which has been first confirmed to satisfy the specific condition while checking motion vectors in the third group in a specific order. When the motion vectors of the neighboring blocks in the third group do not satisfy the specific condition, there may be no available $mv_2$. Here, for example, the specific order may be one from the neighboring block F to the neighboring block G in the third group. Further, for example, the specific condition may be that the reference picture for the motion vector of the neighboring block should be the same as the reference picture of the current block.

After this, when the affine motion model applied to the current block is 4-affine motion model, and when $mv_0$ and $mv_1$ for the current block are available, the encoding apparatus/decoding apparatus may derive the derived $mv_0$ and $mv_1$ as the constructed candidate of the current block. Meanwhile, when $mv_0$ and/or $mv_1$ for the current block are/is not available, that is, when at least one of $mv_0$ and $mv_1$ is not derived from the neighboring block of the current block, the encoding apparatus/decoding apparatus may not add the constructed candidate to the affine MVP list of the current block.

Further, when the affine motion model applied to the current block is 6-affine motion model, and when $mv_0$, $mv_1$ and $mv_2$ for the current block are available, the encoding apparatus/decoding apparatus may derive the derived $mv_0$, $mv_1$ and $mv_2$ as the constructed candidate of the current block. Meanwhile, when $mv_0$, $mv_1$ and/or $mv_2$ for the current block are/is not available, that is, when at least one of $mv_0$, $mv_1$ and $mv_2$ is not derived from the neighboring block of the current block, the encoding apparatus/decoding apparatus may not add the constructed candidate to the affine MVP list of the current block.

The above-described proposed example is a method which considers as the constructed candidate only when all the motion vectors of CPs for generating an affine motion model of the current block are available. Here, the meaning of being available may represent that the reference picture of the neighboring block is the same as the reference picture of the current block. That is, the constructed candidate may be derived only when among motion vectors of the neighboring blocks for the respective CPs of the current block, there exists the motion vector satisfying the condition. Therefore, when the affine motion model applied to the current block is 4-affine motion model, and only when MVs of CP0 and CP1 of the current block (that is, the $mv_0$ and the $mv_1$) are available, the constructed candidate may be considered. Therefore, when the affine motion model applied to the current block is the 6-affine motion model, and only when MVs of CP0, CP1, and CP2 of the current block (that is, the $mv_0$, the $mv_1$, and the $mv_2$) are available, the constructed candidate may be considered. Therefore, according to the proposed example, there may be no need for the additional configuration of deriving the motion vector for the CP based on Equation 6 or 7. Through this, it is possible to reduce the computational complexity for deriving the constructed candidate. Further, since the constructed candidate is determined only when the CPMVP candidate having the same reference picture is available, it is possible to improve the overall coding performance.

Meanwhile, a pruning check process between the derived inherited affine candidate and the constructed affine candidate may not be performed. The pruning check process may represent a process by which candidates are checked whether they are the same as each other, and, if they are the same, the candidate derived at a later order is removed.

Figure 21:
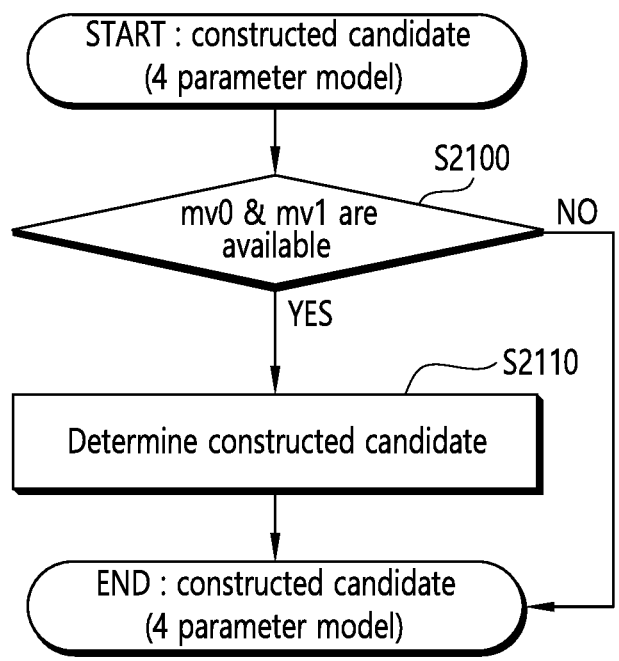
FIG. 21 represents an example of deriving the constructed candidate for a 4-affine motion model being applied to the current block.
Figure 22:
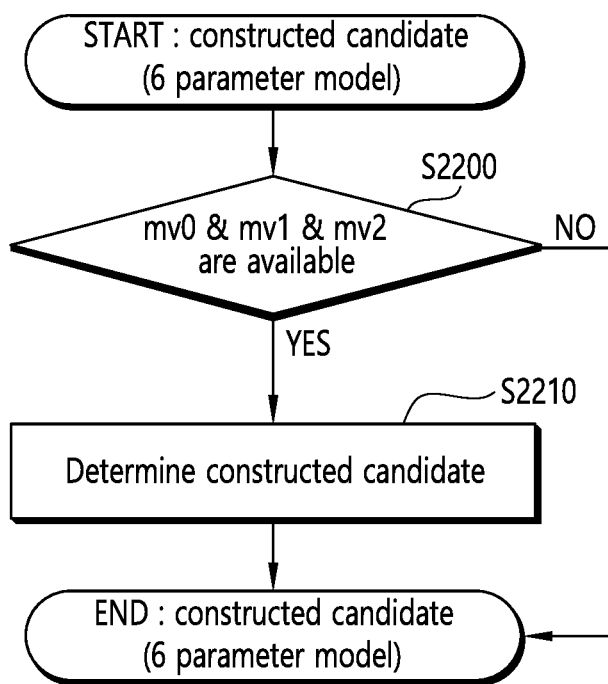
FIG. 22 represents an example of deriving the constructed candidate for a 6-affine motion model being applied to the current block.

The above-described example may be represented as in FIGS. 21 and 22.

FIG. 21 represents an example of deriving the constructed candidate for a 4-affine motion model being applied to the current block.

Referring to FIG. 21, the encoding apparatus/decoding apparatus may determine whether $mv_0$ and $mv_1$ for the current block are available (S2100). That is, the encoding apparatus/decoding apparatus may determine whether available $mv_0$ and $mv_1$ exist in the neighboring blocks of the current block. Here, the $mv_0$ may be a CPMVP candidate of CP0 of the current block, and the mv may be a CPMVP candidate of CP1.

The encoding apparatus/decoding apparatus may determine whether available $mv_0$ exists in the first group, and may determine whether available $mv_1$ exists in the second group.

Specifically, the neighboring blocks of the current block may be divided into three groups, and the neighboring blocks may include a neighboring block A, a neighboring block B, a neighboring block C, a neighboring block D, a neighboring block E, a neighboring block F, and a neighboring block G. The first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

Further, the encoding apparatus/decoding apparatus may check motion vectors of the neighboring blocks in the first group in a specific order whether it satisfies a specific condition. The encoding apparatus/decoding apparatus may derive as the $mv_0$ the motion vector of the neighboring block which has been first confirmed to satisfy the condition during the check process. That is, the $mv_0$ may be a motion vector which has been first confirmed to satisfy the specific condition while checking motion vectors in the first group in a specific order. When the motion vectors of the neighboring blocks in the first group do not satisfy the specific condition, there may be no available $mv_0$. Here, for example, the specific order may be one from the neighboring block A to the neighboring block B, and then to the neighboring block C in the first group. Further, for example, the specific condition may be that the reference picture for the motion vector of the neighboring block should be the same as the reference picture of the current block.

Further, the encoding apparatus/decoding apparatus may check motion vectors of the neighboring blocks in the second group in a specific order whether it satisfies a specific condition. The encoding apparatus/decoding apparatus may derive as the $mv_1$ the motion vector of the neighboring block which has been first confirmed to satisfy the condition during the check process. That is, the $mv_1$ may be a motion vector which has been first confirmed to satisfy the specific condition while checking motion vectors in the second group in a specific order. When the motion vectors of the neighboring blocks in the second group do not satisfy the specific condition, there may be no available $mv_1$. Here, for example, the specific order may be one from the neighboring block D to the neighboring block E in the second group. Further, for example, the specific condition may be that the reference picture for the motion vector of the neighboring block should be the same as the reference picture of the current block.

When the $mv_0$ and the $mv_1$ for the current block are available, that is, when the $mv_0$ and the $mv_1$ for the current block are derived, the encoding apparatus/decoding apparatus may derive as the constructed candidate of the current block the derived $mv_0$ and mv (S2110). Meanwhile, when $mv_0$ and/or $mv_1$ for the current block are/is not available, that is, when at least one of $mv_0$ and $mv_1$ is not derived from the neighboring block of the current block, the encoding apparatus/decoding apparatus may not add the constructed candidate to the affine MVP list of the current block.

Meanwhile, a pruning check process between the derived inherited affine candidate and the constructed affine candidate may not be performed. The pruning check process may represent a process by which candidates are checked whether they are the same as each other, and, if they are the same, the candidate derived at a later order is removed.

FIG. 22 represents an example of deriving the constructed candidate for a 6-affine motion model being applied to the current block.

Referring to FIG. 22, the encoding apparatus/decoding apparatus may determine whether $mv_0$, $mv_1$ and $mv_2$ for the current block are available (S2200). That is, the encoding apparatus/decoding apparatus may determine whether available $mv_0$, $mv_1$, or $mv_2$ exists in the neighboring blocks of the current block. Here, the $mv_0$ may be a CPMVP candidate of CP0 of the current block; the $mv_1$, a CPMVP candidate of CP1; and the $mv_2$, a CPMVP candidate of CP2.

The encoding apparatus/decoding apparatus may determine whether available $mv_0$ exists in the first group, may determine whether available $mv_1$ exists in the second group, and may determine whether available $mv_2$ exists in the third group.

Specifically, the neighboring blocks of the current block may be divided into three groups, and the neighboring blocks may include a neighboring block A, a neighboring block B, a neighboring block C, a neighboring block D, a neighboring block E, a neighboring block F, and a neighboring block G. The first group may include a motion vector of the neighboring block A, a motion vector of the neighboring block B, and a motion vector of the neighboring block C; the second group, a motion vector of the neighboring block D, and a motion vector of the neighboring block E; and the third group, a motion vector of the neighboring block F, and a motion vector of the neighboring block G. The neighboring block A may represent a neighboring block located top left of a top-left sample position of the current block; the neighboring block B, a neighboring block located top of the top-left sample position of the current block; the neighboring block C, a neighboring block located left of the top-left sample position of the current block; the neighboring block D, a neighboring block located top of a top-right sample position of the current block; the neighboring block E, a neighboring block located top right of the top-right sample position of the current block; the neighboring block F, a neighboring block located left of the bottom-left sample position of the current block; and the neighboring block G, a neighboring block located bottom left of the bottom-left sample position of the current block.

Further, the encoding apparatus/decoding apparatus may check motion vectors of the neighboring blocks in the first group in a specific order whether it satisfies a specific condition. The encoding apparatus/decoding apparatus may derive as the $mv_0$ the motion vector of the neighboring block which has been first confirmed to satisfy the condition during the check process. That is, the $mv_0$ may be a motion vector which has been first confirmed to satisfy the specific condition while checking motion vectors in the first group in a specific order. When the motion vectors of the neighboring blocks in the first group do not satisfy the specific condition, there may be no available $mv_0$. Here, for example, the specific order may be one from the neighboring block A to the neighboring block B, and then to the neighboring block C in the first group. Further, for example, the specific condition may be that the reference picture for the motion vector of the neighboring block should be the same as the reference picture of the current block.

Further, the encoding apparatus/decoding apparatus may check motion vectors of the neighboring blocks in the second group in a specific order whether it satisfies a specific condition. The encoding apparatus/decoding apparatus may derive as the $mv_1$ the motion vector of the neighboring block which has been first confirmed to satisfy the condition during the check process. That is, the $mv_1$ may be a motion vector which has been first confirmed to satisfy the specific condition while checking motion vectors in the second group in a specific order. When the motion vectors of the neighboring blocks in the second group do not satisfy the specific condition, there may be no available $mv_1$. Here, for example, the specific order may be one from the neighboring block D to the neighboring block E in the second group. Further, for example, the specific condition may be that the reference picture for the motion vector of the neighboring block should be the same as the reference picture of the current block.

Further, the encoding apparatus/decoding apparatus may check motion vectors of the neighboring blocks in the third group in a specific order whether it satisfies a specific condition. The encoding apparatus/decoding apparatus may derive as the $mv_2$ the motion vector of the neighboring block which has been first confirmed to satisfy the condition during the check process. That is, the $mv_2$ may be a motion vector which has been first confirmed to satisfy the specific condition while checking motion vectors in the third group in a specific order. When the motion vectors of the neighboring blocks in the third group do not satisfy the specific condition, there may be no available $mv_2$. Here, for example, the specific order may be one from the neighboring block F to the neighboring block G in the third group. Further, for example, the specific condition may be that the reference picture for the motion vector of the neighboring block should be the same as the reference picture of the current block.

When the $mv_0$, the $mv_1$, and the $mv_2$ for the current block are available, that is, when the $mv_0$, the $mv_1$, and the $mv_2$ for the current block are derived, the encoding apparatus/decoding apparatus may derive as the constructed candidate of the current block the derived $mv_0$, $mv_1$, and $mv_2$ (S2210). Meanwhile, when $mv_0$, $mv_1$ and/or $mv_2$ for the current block are/is not available, that is, when at least one of $mv_0$, $mv_1$ and $mv_2$ is not derived from the neighboring block of the current block, the encoding apparatus/decoding apparatus may not add the constructed candidate to the affine MVP list of the current block.

Meanwhile, a pruning check process between the derived inherited affine candidate and the constructed affine candidate may not be performed.

Meanwhile, when the number of the derived affine candidate is less than two (that is, when the number of the inherited affine candidate and/or the constructed affine candidate is less than two), the HEVC AMVP candidate may be added to the affine MVP list of the current block.

For example, the HEVC AMVP candidate may be derived in the following order.

Specifically, when the number of the derived affine candidate is less than two, and when the CPMV0 of the constructed affine candidate is available, the CPMV0 may be used as the affine MVP candidate. That is, when the number of the derived affine candidate is less than two, and when the CPMV0 of the constructed affine candidate is available (that is, when the number of the derived affine candidate is less than two and the CPMV0 of the constructed affine candidate is derived), a first affine MVP candidate including CPMV0 of the constructed affine candidate as CPMV0, CPMV1, CPMV2 may be derived.

Further, next, when the number of the derived affine candidate is less than two, and when the CPMV1 of the constructed affine candidate is available, the CPMV1 may be used as the affine MVP candidate. That is, when the number of the derived affine candidate is less than two, and when the CPMV1 of the constructed affine candidate is available (that is, when the number of the derived affine candidate is less than two and the CPMV1 of the constructed affine candidate is derived), a second affine MVP candidate including CPMV1 of the constructed affine candidate as CPMV0, CPMV1, CPMV2 may be derived.

Further, next, when the number of the derived affine candidate is less than two, and when the CPMV2 of the constructed affine candidate is available, the CPMV2 may be used as the affine MVP candidate. That is, when the number of the derived affine candidate is less than two, and when the CPMV2 of the constructed affine candidate is available (that is, when the number of the derived affine candidate is less than two and the CPMV2 of the constructed affine candidate is derived), a third affine MVP candidate including CPMV2 of the constructed affine candidate as CPMV0, CPMV1, CPMV2 may be derived.

Further, next, when the number of the derived affine candidate is less than two, a HEVC temporal motion vector predictor (TMVP) may be used as the affine MVP candidate. The HEVC TMVP may be derived based on motion information of the temporal neighboring block of the current block. That is, when the number of the derived affine candidate is less than two, a third affine MVP candidate including the motion vector of the temporal neighboring block of the current block as CPMV0, CPMV1, CPMV2 may be derived. The temporal neighboring block may represent a collocated block in a collocated picture corresponding to the current block.

Further, next, when the number of the derived affine candidate is less than two, a zero motion vector (zero MV) may be used as the affine MVP candidate. That is, when the number of the derived affine candidate is less than two, a third affine MVP candidate including the zero motion vector as CPMV0, CPMV1, CPMV2 may be derived. The zero motion vector may represent a motion vector whose value is zero.

It can decrease the complexity when compared to the conventional method of deriving a HEVC AMVP candidate because the steps of using CPMV of the constructed affine candidate reuse MV which has been already considered for generating the constructed affine candidate.

Meanwhile, the present document proposes another example of deriving the inherited affine candidate.

In order to derive the inherited affine candidate, affine prediction information of a neighboring block is required, and specifically the affine prediction information as below is required.

1) Affine_flag indicating whether affine prediction based encoding of the neighboring block is applied 2) Motion information of the neighboring block When the 4-affine motion model is applied to the neighboring block, the motion information of the neighboring block may include L0 motion information and L1 motion information for CP0, and L0 motion information and L1 motion information for CP1. Further, when the 6-affine motion model is applied to the neighboring block, the motion information of the neighboring block may include L0 motion information and L1 motion information for CP0, and L0 motion information and L1 motion information for CP2. Here, the L0 motion information may represent motion information on L0 (List 0), and the L1 motion information may represent motion information on L1 (List 1). The L0 motion information may include L0 reference picture index and L0 motion vector, and the Li motion information may include L1 reference picture index and L1 motion vector.

As described above, in the case of the affine prediction, the information amount to be stored is great, which thus may become a major cause of increasing hardware costs in actually embodying it in the encoding apparatus/decoding apparatus. Particularly, when the neighboring block is located top of the current block and is a CTU boundary, a line buffer should be used to store affine prediction-related information of the neighboring block, and thus the cost problem may occur more greatly. The problem may be represented hereinafter as a line buffer issue. So, the present document proposes an example of deriving an inherited affine candidate, in which the hardware cost is minimized by not storing the affine prediction-related information in the line buffer or by reducing it. The proposed example can improve coding performance by reducing computational complexity in deriving the inherited affine candidate. Meanwhile, for reference, in the line buffer the motion information of a block having a 4×4 size has been already stored, and when the affine prediction-related information is stored, the stored information amount increases three times compared with the previous storing amount.

In the present example, in the line buffer no information on the affine prediction may be additionally stored, and when information in the line buffer should be referenced in order to generate the inherited affine candidate, the generation of the inherited affine candidate may be restricted.

Figure 23A:
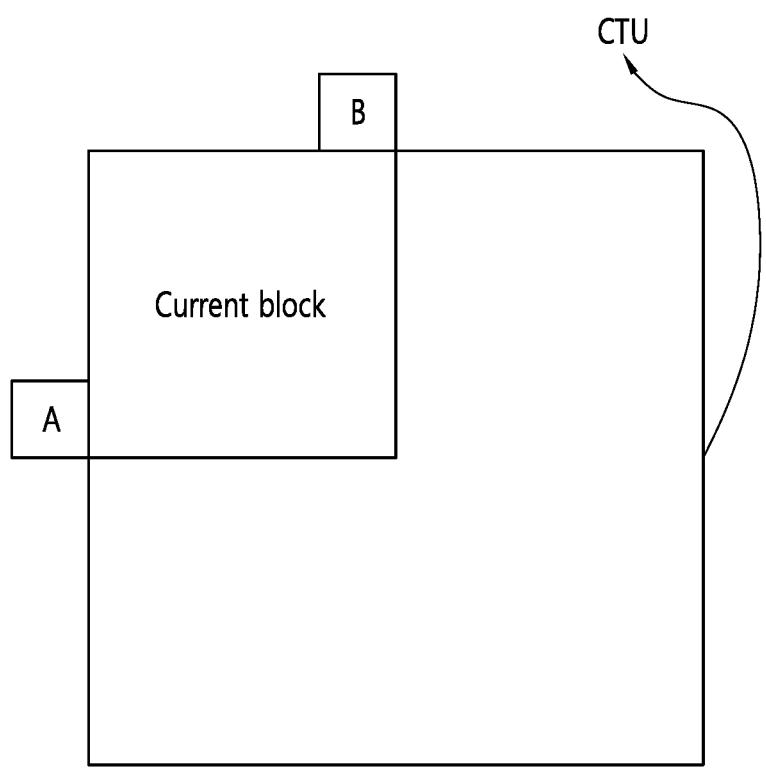
FIGS. 23a and 23b illustratively represent an example of deriving the inherited affine candidate.
Figure 23B:
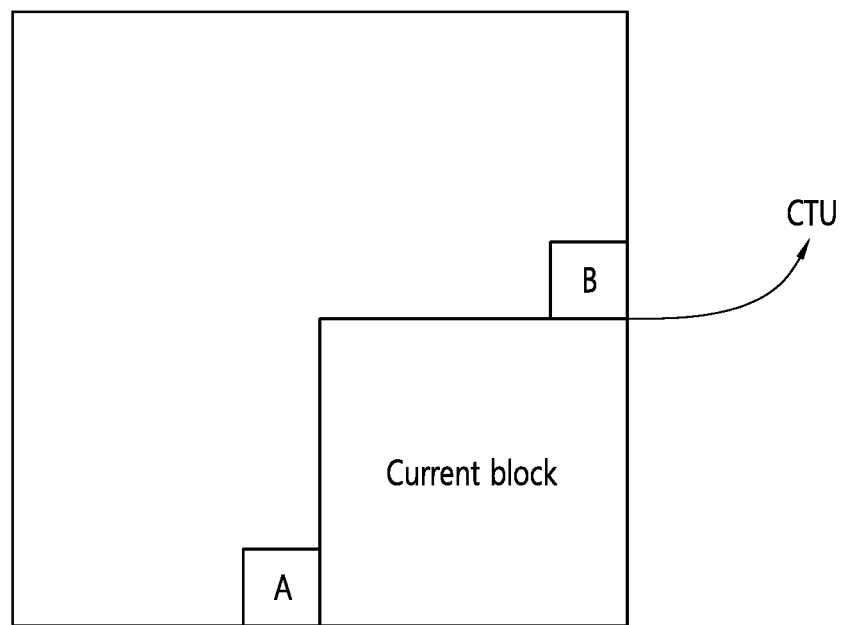

FIGS. 23a and 23b illustratively represent an example of deriving the inherited affine candidate.

Referring to FIG. 23a, when the neighboring block B of the current block (i.e., the top neighboring block of the current block) does not exist in the same CTU (i.e., the current CTU) as the current block, the neighboring block B may not be used for generating the inherited affine candidate. Meanwhile, even though a neighboring block A does not exist in the same CTU as the current block, information on the neighboring block A may be used for generating the inherited affine candidate as it is not stored in the line buffer. Therefore, in the present example, only when the top neighboring block of the current block is included in the same CTU as the current block, it may be used for generating the inherited affine candidate. Further, when the top neighboring block of the current block is not included in the same CTU as the current block, the top neighboring block may not be used for generating the inherited affine candidate.

Referring to FIG. 23b, the neighboring block B of the current block (i.e., the top neighboring block of the current block) may exist in the same CTU as the current block. In this case, the encoding apparatus/decoding apparatus may generate the inherited affine candidate with reference to the neighboring block B.

Figure 24:
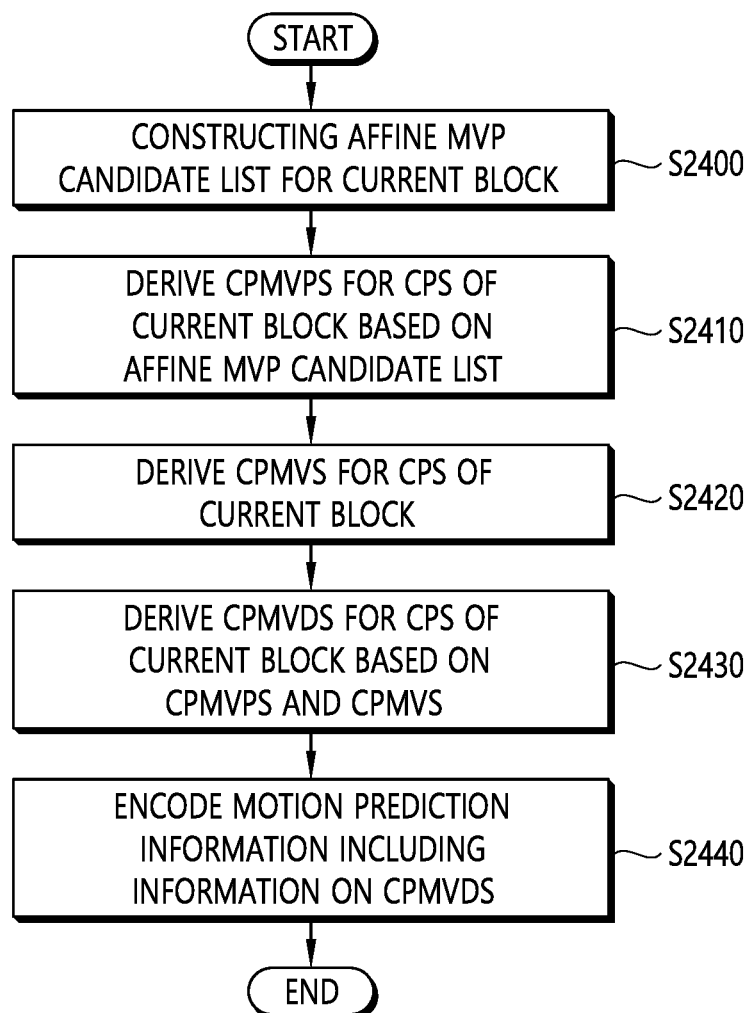
FIG. 24 schematically represents an image encoding method by an encoding apparatus according to the present document.

FIG. 24 schematically represents an image encoding method by an encoding apparatus according to the present document. The method disclosed in FIG. 24 may be performed by the encoding apparatus disclosed in FIG. 2. Specifically, for example, S2400 to S2430 of FIG. 24 may be performed by the predictor of the encoding apparatus, and S2440 may be performed by the entropy encoder of the encoding apparatus. Further, although not shown, the process of deriving prediction samples for the current block based on the CPMVs may be performed by the predictor of the encoding apparatus; the process of deriving the residual sample for the current block based on the prediction sample and the original sample for the current block, by the subtractor of the encoding apparatus; the process of generating information on residual for the current block based on the residual sample, by the transformer of the encoding apparatus; and the process of encoding the information on residual, by the entropy encoder of the encoding apparatus.

The encoding apparatus configures an affine motion vector predictor (MVP) candidate list for the current block (S2400). The encoding apparatus may configure the affine MVP candidate list including the affine MVP candidate for the current block. The maximum number of the affine MVP candidates of the affine MVP candidate list may be two.

Further, as an example, the affine MVP candidate list may include an inherited affine MVP candidate. The encoding apparatus may check whether the inherited affine MVP candidate of the current block is available, and when the inherited affine MVP candidate is available, the inherited affine MVP candidate may be derived. For example, the inherited affine MVP candidates may be derived based on the neighboring blocks of the current block, and the maximum number of the inherited affine MVP candidates may be two. The neighboring blocks may be checked in a specific order whether it is available, and the inherited affine MVP candidate may be derived based on checked available neighboring block. That is, the neighboring blocks may be checked in a specific order whether it is available, and a first inherited affine MVP candidate may be derived based on the neighboring block which has been first checked to be available, and a second inherited affine MVP candidate may be derived based on the neighboring block which has been second checked to be available. The being available may represent that a block is coded with the affine motion model, and that a reference picture of the neighboring block is the same as a reference picture of the current block. That is, the available neighboring block is a neighboring block which is coded with the affine motion model (that is, to which the affine prediction is applied), and whose reference picture is the same as a reference picture of the current block. Specifically, the encoding apparatus may derive motion vectors for the CPs of the current block based on the affine motion model of the neighboring block which has been first checked to be available, and may derive the first inherited affine MVP candidate including the motion vectors as CPMVP candidates. Further, the encoding apparatus may derive motion vectors for the CPs of the current block based on the affine motion model of the neighboring block which has been second checked to be available, and may derive the second inherited affine MVP candidate including the motion vectors as CPMVP candidates. The affine motion model may be derived as foregoing Equation 1 or 3.

Further, in other words, the neighboring blocks may be checked in a specific order whether it satisfies a specific condition, and the inherited affine MVP candidate may be derived based on the neighboring block which has been checked to satisfy the specific condition. That is, the neighboring blocks may be checked in a specific order whether it satisfies a specific condition, and the first inherited affine MVP candidate may be derived based on the neighboring block which has been first checked to satisfy the specific condition, and the second inherited affine MVP candidate may be derived based on the neighboring block which has been second checked to satisfy the specific condition. Specifically, the encoding apparatus may derive motion vectors for the CPs of the current block based on the affine motion model of the neighboring block which has been first checked to satisfy the specific condition, and may derive the first inherited affine MVP candidate including the motion vectors as CPMVP candidates. Further, the encoding apparatus may derive motion vectors for the CPs of the current block based on the affine motion model of the neighboring block which has been second checked to satisfy the specific condition, and may derive the second inherited affine MVP candidate including the motion vectors as CPMVP candidates. The affine motion model may be derived as foregoing Equation 1 or 3. Meanwhile, the specific condition may represent that a block is coded with the affine motion model, and that a reference picture of the neighboring block is the same as a reference picture of the current block. That is, the neighboring block satisfying the specific condition is a neighboring block which is coded with the affine motion model (that is, to which the affine prediction is applied), and whose reference picture is the same as a reference picture of the current block.

Here, for example, the neighboring blocks may include a left neighboring block, a top neighboring block, a top-right corner neighboring block, a bottom-left corner neighboring block, and a top-left corner neighboring block of the current block. In this case, the specific order may be an order from the left neighboring block to the bottom-left corner neighboring block to the top neighboring block to the top-right corner neighboring block and then to the top-left corner neighboring block.

Alternatively, for example, the neighboring blocks may include only the left neighboring block and the top neighboring block. In this case, the specific order may be an order from the left neighboring block to the top neighboring block.

Alternatively, for example, the neighboring blocks may include only the left neighboring block, and when the top neighboring block is included in the current CTU including the current block, the neighboring blocks may further include the top neighboring block. In this case, the specific order may be an order from the left neighboring block to the top neighboring block. Further, when the top neighboring block is not included in the current CTU, the neighboring blocks may not include the top neighboring block. In this case, only the left neighboring block may be checked.

Meanwhile, if a size is W×H, and x component of the top-left sample position of the current block is 0 and y component thereof is 0, the bottom-left corner neighboring block may be a block including a sample at coordinates (−1, H); the left neighboring block, a block including a sample at coordinates (−1, H−1); the top-right corner neighboring block, a block including a sample at coordinates (W, −1); the top neighboring block, a block including a sample at coordinates (W−1, −1); and the top-left corner neighboring block, a block including a sample at coordinates (−1, −1). That is, the left neighboring block may be a left neighboring block among the left neighboring blocks of the current block, which is located lowermost, and the top neighboring block may be a top neighboring block among the top neighboring blocks of the current block, which is located leftmost.

Further, as one example, when a constructed affine MVP candidate is available, the affine MVP candidate list may include the constructed affine MVP candidate. The encoding apparatus may check whether the constructed affine MVP candidate of the current block is available, and when the constructed affine MVP candidate is available, the constructed affine MVP candidate may be derived. Further, for example, after the inherited affine MVP candidate has been derived, the constructed affine MVP candidate may be derived. When the number of the derived affine MVP candidate (i.e., the inherited affine MVP candidate) is less than two and the constructed affine MVP candidate is available, the affine MVP candidate list may include the constructed affine MVP candidate. Here, the constructed affine MVP candidate may include candidate motion vectors for the CPs. The constructed affine MVP candidate may be available when all the candidate motion vectors are available.

For example, when the 4-affine motion model is applied to the current block, the CPs of the current block may include CP0 and CP1. When the motion vector for the CP0 is available and the motion vector for the CP1 is available, the constructed affine MVP candidate may be available, and the affine MVP candidate list may include the constructed affine MVP candidate. Here, the CP0 may represent a top-left position of the current block, and the CP1 may represent a top-right position of the current block.

The constructed affine MVP candidate may include a candidate motion vector for the CP0 and a candidate motion vector for the CP1. The candidate motion vector for the CP0 may be a motion vector of a first block, and the candidate motion vector for the CP1 may be a motion vector of a second block.

Further, the first block may be a block which has been first confirmed while checking neighboring blocks in the first group in a first specific order to be that a reference picture thereof is the same as a reference picture of the current block. That is, the candidate motion vector for the CP1 may be a motion vector of a block which has been first confirmed while checking neighboring blocks in the first group in a first specific order to be that a reference picture thereof is the same as a reference picture of the current block. The being available may represent that the neighboring block exists, and that the neighboring block is coded in inter prediction. Here, when the reference picture of the first block in the first group is the same as the reference picture of the current block, the candidate motion vector for the CP0 may be available. Further, for example, the first group may include the neighboring block A, the neighboring block B, and the neighboring block C, and the first specific order may be an order from the neighboring block A to the neighboring block B, and then to the neighboring block C.

Further, the second block may be a block which has been first confirmed while checking neighboring blocks in the second group in a second specific order to be that a reference picture thereof is the same as a reference picture of the current block. Here, when the reference picture of the second block in the second group is the same as the reference picture of the current block, a candidate motion vector for the CP1 may be available. Further, for example, the second group may include the neighboring block D and the neighboring block E, and the second specific order may be an order from the neighboring block D to the neighboring block E.

Meanwhile, if a size of the current block is W×H, and x component of the top-left sample position of the current block is 0 and y component thereof is 0, the neighboring block A may be a block including a sample at coordinates (−1, −1); the neighboring block B, a block including a sample at coordinates (0, −1); the neighboring block C, a block including a sample at coordinates (−1, 0); the neighboring block D, a block including a sample at coordinates (W−1, −1); and the neighboring block E, a block including a sample at coordinates (W, −1). That is, the neighboring block A may be the top-left corner neighboring block of the current block; the neighboring block B, the top neighboring block among the top neighboring blocks of the current block, which is located leftmost; the neighboring block C, the left neighboring block among the left neighboring blocks of the current block, which is located uppermost; the neighboring block D, the top neighboring block among the top neighboring blocks of the current block, which is located rightmost; and the neighboring block E, the top-right corner neighboring block of the current block.

Meanwhile, when at least one of the candidate motion vector of the CP0 and the candidate motion vector of the CP1 is not available, the constructed affine MVP candidate may not be available.

Alternatively, for example, when the 6-affine motion model is applied to the current block, the CPs of the current block may include CP0, CP1 and CP2. When the motion vector for the CP0 is available and the motion vector for the CP1 is available and the motion vector for the CP2 is available, the constructed affine MVP candidate may be available, and the affine MVP candidate list may include the constructed affine MVP candidate. Here, the CP0 may represent a top-left position of the current block; the CP1, a top-right position of the current block; and the CP2, a bottom-left position of the current block.

The constructed affine MVP candidate may include the candidate motion vector for the CP0, the candidate motion vector for the CP1, and the candidate motion vector for the CP2. The candidate motion vector for the CP0 may be a motion vector of a first block, the candidate motion vector for the CP1 may be a motion vector of a second block, and the candidate motion vector for the CP2 may be a motion vector of a third block.

Further, the first block may be a block which has been first confirmed while checking neighboring blocks in the first group in a first specific order to be that a reference picture thereof is the same as a reference picture of the current block. Here, when the reference picture of the first block in the first group is the same as the reference picture of the current block, the candidate motion vector for the CP0 may be available. Further, for example, the first group may include the neighboring block A, the neighboring block B, and the neighboring block C, and the first specific order may be an order from the neighboring block A to the neighboring block B, and then to the neighboring block C.

Further, the second block may be a block which has been first confirmed while checking neighboring blocks in the second group in a second specific order to be that a reference picture thereof is the same as a reference picture of the current block. Here, when the reference picture of the second block in the second group is the same as the reference picture of the current block, a candidate motion vector for the CP1 may be available. Further, for example, the second group may include the neighboring block D and the neighboring block E, and the second specific order may be an order from the neighboring block D to the neighboring block E.

Further, the third block may be a block which has been first confirmed while checking neighboring blocks in the third group in a third specific order to be that a reference picture thereof is the same as a reference picture of the current block. Here, when the reference picture of the third block in the third group is the same as the reference picture of the current block, the candidate motion vector for the CP2 may be available. Further, for example, the third group may include the neighboring block F, and the neighboring block G, and the third specific order may be an order from the neighboring block F to the neighboring block G.

Meanwhile, if a size of the current block is W×H, and x component of the top-left sample position of the current block is 0 and y component thereof is 0, the neighboring block A may be a block including a sample at coordinates (−1, −1); the neighboring block B, a block including a sample at coordinates (0, −1); the neighboring block C, a block including a sample at coordinates (−1, 0); the neighboring block D, a block including a sample at coordinates (W−1, −1); the neighboring block E, a block including a sample at coordinates (W, −1); the neighboring block F, a block including a sample at coordinates (−1, H−1); and the neighboring block G, a block including a sample at coordinates (−1, H). That is, the neighboring block A may be the top-left corner neighboring block of the current block; the neighboring block B, the top neighboring block among the top neighboring blocks of the current block, which is located leftmost; the neighboring block C, the left neighboring block among the left neighboring blocks of the current block, which is located uppermost; the neighboring block D, the top neighboring block among the top neighboring blocks of the current block, which is located rightmost; the neighboring block E, the top-right corner neighboring block of the current block; the neighboring block F, the left neighboring block among the left neighboring blocks of the current block, which is located lowermost; and the neighboring block G, the bottom-left corner neighboring block of the current block.

Meanwhile, when at least one of the candidate motion vector of the CP0, the candidate motion vector of the CP1, and the candidate motion vector of CP2 is not available, the constructed affine MVP candidate may not be available.

After this, the affine MVP candidate list may be derived based on below-described steps in a particular order.

For example, when the number of the derived affine MVP candidate is less than two, and the motion vector for the CP0 is available, the encoding apparatus may derive a first affine MVP candidate. Here, the first affine MVP candidate may be an affine MVP candidate including a motion vector for the CP0 as candidate motion vectors for the CPs.

Further, for example, when the number of the derived affine MVP candidate is less than two, and the motion vector for the CP1 is available, the encoding apparatus may derive a second affine MVP candidate. Here, the second affine MVP candidate may be an affine MVP candidate including a motion vector for the CP1 as candidate motion vectors for the CPs.

Further, for example, when the number of the derived affine MVP candidate is less than two, and the motion vector for the CP2 is available, the encoding apparatus may derive a third affine MVP candidate. Here, the third affine MVP candidate may be an affine MVP candidate including a motion vector for the CP2 as candidate motion vectors for the CPs.

Further, for example, when the number of the derived affine MVP candidate is less than two, the encoding apparatus may derive a fourth affine MVP candidate including as candidate motion vectors for the CPs a temporal MVP derived based on the temporal neighboring block of the current block. The temporal neighboring block may represent a collocated block in a collocated picture corresponding to the current block. The temporal MVP may be derived based on a motion vector of the temporal neighboring block.

Further, for example, when the number of the derived affine MVP candidate is less than two, the encoding apparatus may derive a fifth affine MVP candidate including a zero motion vector as candidate motion vectors for the CPs. The zero motion vector may represent a motion vector whose value is zero.

The encoding apparatus derives control point motion vector predictors (CPMVPs) for control points (CPs) of the current block based on the affine MVP candidate list (S2410). The encoding apparatus may derive CPMVs for the CPs of the current block which has optimal RD cost, and may select as the affine MVP candidate for the current block the affine MVP candidate from among the affine MVP candidates, which is most similar to the CPMVs. The encoding apparatus may derive control point motion vector predictors (CPMVPs) for control points (CPs) of the current block based on the selected affine MVP candidate from among the affine MVP candidates included in the affine MVP candidate list. Specifically, when the affine MVP candidate includes the candidate motion vector for CP0 and the candidate motion vector for CP1, the candidate motion vector for CP0 of the affine MVP candidate may be derived as the CPMVP of the CP0, and the candidate motion vector for CP1 of the affine MVP candidate may be derived as the CPMVP of the CP1. Further, when the affine MVP candidate includes the candidate motion vector for CP0, the candidate motion vector for CP1, and the candidate motion vector for CP2, the candidate motion vector for CP0 of the affine MVP candidate may be derived as CPMVP of the CP0, the candidate motion vector for CP1 of the affine MVP candidate may be derived as CPMVP of the CP1, and the candidate motion vector for CP2 of the affine MVP candidate may be derived as CPMVP of the CP2. Further, when the affine MVP candidate includes the candidate motion vector for CP0 and the candidate motion vector for CP2, the candidate motion vector for CP0 of the affine MVP candidate may be derived as the CPMVP of the CP0, and the candidate motion vector for CP2 of the affine MVP candidate may be derived as the CPMVP of the CP2.

The encoding apparatus may encode an affine MVP candidate index indicating the selected affine MVP candidate from among the affine MVP candidates. The affine MVP candidate index may indicate the one affine MVP candidate among the affine MVP candidates included in the affine motion vector predictor (MVP) candidate list for the current block.

The encoding apparatus derives CPMVs for the CPs of the current block (S2420). The encoding apparatus may derive CPMVs for the respective CPs of the current block.

The encoding apparatus derives control point motion vector differences (CPMVDs) for the CPs of the current block based on the CPMVPs and the CPMVs (S2430). The encoding apparatus may derive CPMVDs for the CPs of the current block based on the CPMVPs and the CPMVs for the respective CPs.

The encoding apparatus encodes motion prediction information including information on the CPMVDs (S2440). The encoding apparatus may output, in the form of a bitstream, motion prediction information including information on the CPMVDs. That is, the encoding apparatus may output, in the form of a bitstream, image information including the motion prediction information. The encoding apparatus may encode information on CPMVD for the respective CPs, and the motion prediction information may include information on the CPMVDs.

Further, the motion prediction information may include the affine MVP candidate index. The affine MVP candidate index may indicate the selected affine MVP candidate among the affine MVP candidates included in the affine motion vector predictor (MVP) candidate list for the current block.

Meanwhile, as an example, the encoding apparatus may derive prediction samples for the current block based on the CPMVs, derive the residual sample for the current block based on prediction sample and original sample for the current block, generate information on residual for the current block based on the residual sample, and encode information on the residual. The image information may include information on the residual. Meanwhile, the bitstream may be transmitted to the decoding apparatus through a network or a (digital) storage medium. Here, the network may include a broadcast network, a communication network and/or the like, and the digital storage medium may include various storage media such as USB, SD, CD, DVD, Blu-ray, HDD, SSD, and the like.

Figure 25:
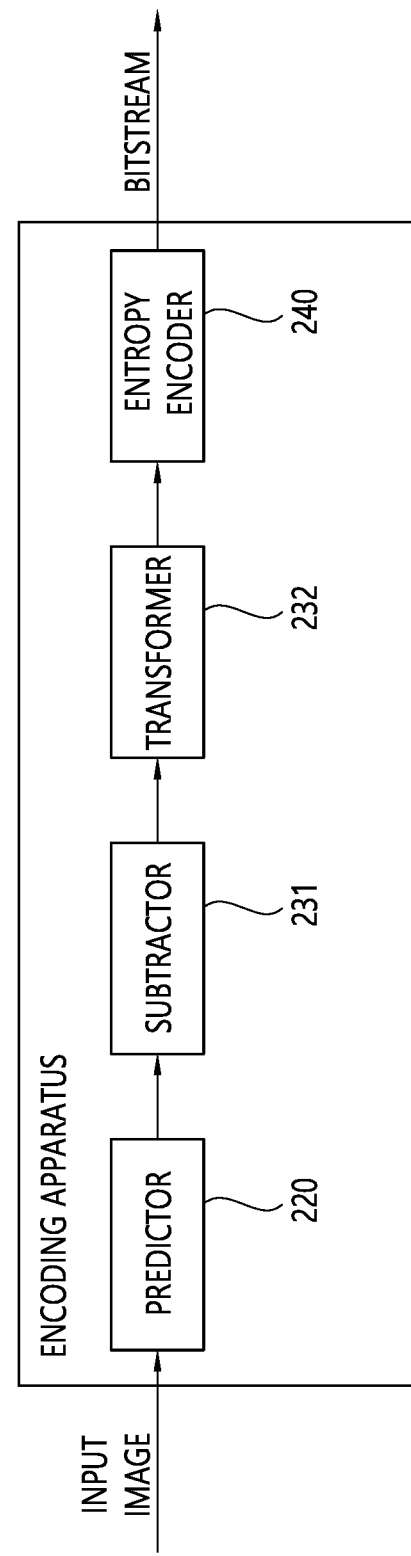
FIG. 25 schematically represents an encoding apparatus performing an image encoding method according to the present document.

FIG. 25 schematically represents an encoding apparatus performing an image encoding method according to the present document. The method disclosed in FIG. 24 may be performed by the encoding apparatus disclosed in FIG. 25. Specifically, for example, the predictor of FIG. 25 may perform S2400 to S2410 in FIG. 24; and the entropy encoder of the encoding apparatus, S2420 in FIG. 24. Further, although not shown, the process of deriving prediction samples for the current block based on the CPMVs may be performed by the predictor of the encoding apparatus of FIG. 25; the process of deriving the residual sample for the current block based on the prediction sample and the original sample for the current block, by the subtractor of the encoding apparatus of FIG. 25; the process of generating information on residual for the current block based on the residual sample, by the transformer of the encoding apparatus of FIG. 25; and the process of encoding the information on residual, by the entropy encoder of the encoding apparatus of FIG. 25.

Figure 26:
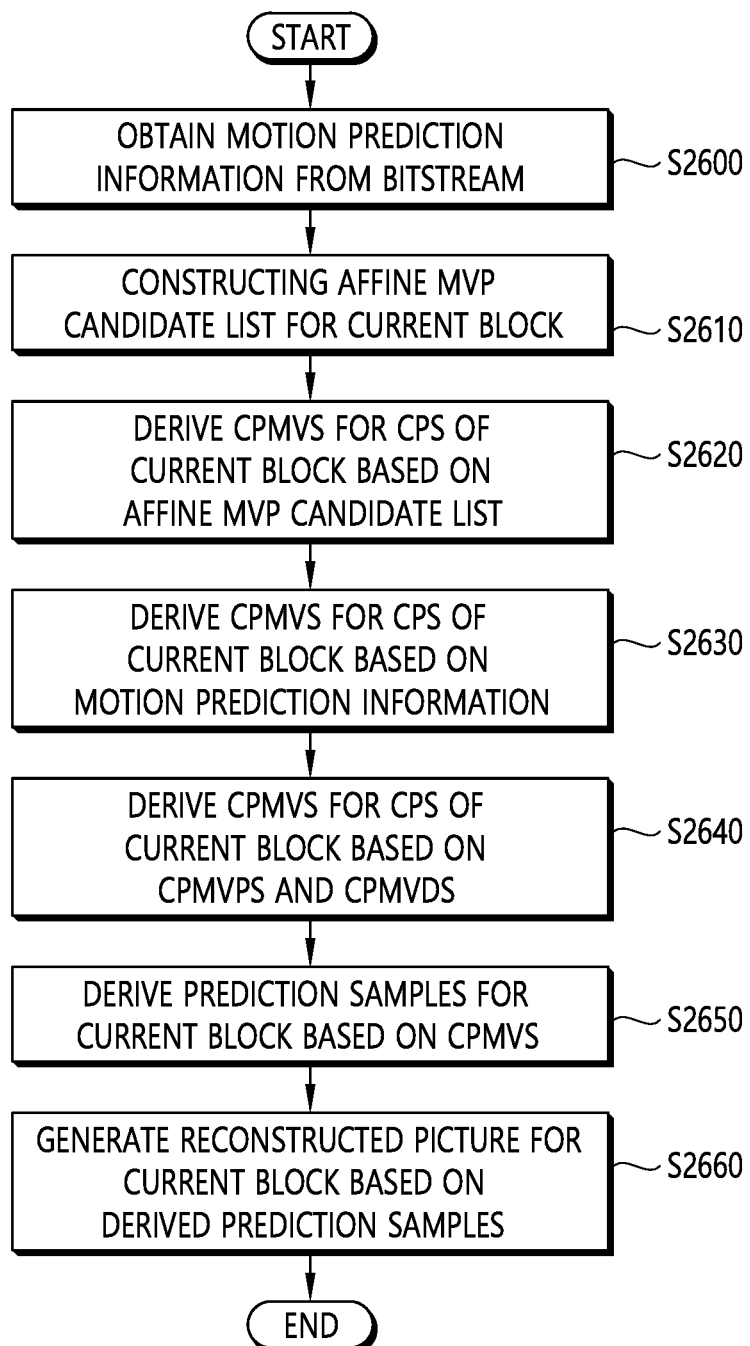
FIG. 26 schematically represents an image decoding method by a decoding apparatus according to the present document.

FIG. 26 schematically represents an image decoding method by a decoding apparatus according to the present document. The method disclosed in FIG. 26 may be performed by the decoding apparatus disclosed in FIG. 3. Specifically, for example, S2600 of FIG. 26 may be performed by the entropy decoder of the decoding apparatus; S2610 to S2650, by the predictor of the decoding apparatus; and S2660, by the adder of the decoding apparatus. Further, although not shown, the process of obtaining information on residual of the current block through a bitstream may be performed by the entropy decoder of the decoding apparatus, and the process of deriving the residual sample for the current block based on the residual information may be performed by the inverse transformer of the decoding apparatus.

The decoding apparatus obtains motion prediction information for the current block from a bitstream (S2600). The decoding apparatus may obtain image information including the motion prediction information from the bitstream.

Further, for example, the motion prediction information may include information on control point motion vector differences (CPMVDs) for control points (CPs) of the current block. That is, the motion prediction information may include information on CPMVD for respective CPs of the current block.

Further, for example, the motion prediction information may include the affine MVP candidate index for the current block. The affine MVP candidate index may indicate one among the affine MVP candidates included in the affine motion vector predictor (MVP) candidate list for the current block.

The decoding apparatus configures an affine motion vector predictor (MVP) candidate list for the current block (S2610). The decoding apparatus may configure an affine MVP candidate list including the affine MVP candidate for the current block. The maximum number of the affine MVP candidates of the affine MVP candidate list may be two.

Further, as an example, the affine MVP candidate list may include an inherited affine MVP candidate. The decoding apparatus may check whether the inherited affine MVP candidate of the current block is available, and when the inherited affine MVP candidate is available, the inherited affine MVP candidate may be derived. For example, the inherited affine MVP candidates may be derived based on the neighboring blocks of the current block, and the maximum number of the inherited affine MVP candidates may be two. The neighboring blocks may be checked in a specific order whether it is available, and the inherited affine MVP candidate may be derived based on checked available neighboring block. That is, the neighboring blocks may be checked in a specific order whether it is available, and a first inherited affine MVP candidate may be derived based on the neighboring block which has been first checked to be available, and a second inherited affine MVP candidate may be derived based on the neighboring block which has been second checked to be available. The being available may represent that a block is coded with the affine motion model, and that a reference picture of the neighboring block is the same as a reference picture of the current block. That is, the available neighboring block is a neighboring block which is coded with the affine motion model (that is, to which the affine prediction is applied), and whose reference picture is the same as a reference picture of the current block. Specifically, the decoding apparatus may derive motion vectors for the CPs of the current block based on the affine motion model of the neighboring block which has been first checked to be available, and may derive the first inherited affine MVP candidate including the motion vectors as CPMVP candidates. Further, the decoding apparatus may derive motion vectors for the CPs of the current block based on the affine motion model of the neighboring block which has been second checked to be available, and may derive the second inherited affine MVP candidate including the motion vectors as CPMVP candidates. The affine motion model may be derived as foregoing Equation 1 or 3.

Further, in other words, the neighboring blocks may be checked in a specific order whether it satisfies a specific condition, and the inherited affine MVP candidate may be derived based on the neighboring block which has been checked to satisfy the specific condition. That is, the neighboring blocks may be checked in a specific order whether it satisfies a specific condition, and the first inherited affine MVP candidate may be derived based on the neighboring block which has been first checked to satisfy the specific condition, and the second inherited affine MVP candidate may be derived based on the neighboring block which has been second checked to satisfy the specific condition. Specifically, the decoding apparatus may derive motion vectors for the CPs of the current block based on the affine motion model of the neighboring block which has been first checked to satisfy the specific condition, and may derive the first inherited affine MVP candidate including the motion vectors as CPMVP candidates. Further, the decoding apparatus may derive motion vectors for the CPs of the current block based on the affine motion model of the neighboring block which has been second checked to satisfy the specific condition, and may derive the second inherited affine MVP candidate including the motion vectors as CPMVP candidates. The affine motion model may be derived as foregoing Equation 1 or 3. Meanwhile, the specific condition may represent that a block is coded with the affine motion model, and that a reference picture of the neighboring block is the same as a reference picture of the current block. That is, the neighboring block satisfying the specific condition is a neighboring block which is coded with the affine motion model (that is, to which the affine prediction is applied), and whose reference picture is the same as a reference picture of the current block.

Here, for example, the neighboring blocks may include a left neighboring block, a top neighboring block, a top-right corner neighboring block, a bottom-left corner neighboring block, and a top-left corner neighboring block of the current block. In this case, the specific order may be an order from the left neighboring block to the bottom-left corner neighboring block to the top neighboring block to the top-right corner neighboring block and then to the top-left corner neighboring block.

Alternatively, for example, the neighboring blocks may include only the left neighboring block and the top neighboring block. In this case, the specific order may be an order from the left neighboring block to the top neighboring block.

Alternatively, for example, the neighboring blocks may include only the left neighboring block, and when the top neighboring block is included in the current CTU including the current block, the neighboring blocks may further include the top neighboring block. In this case, the specific order may be an order from the left neighboring block to the top neighboring block. Further, when the top neighboring block is not included in the current CTU, the neighboring blocks may not include the top neighboring block. In this case, only the left neighboring block may be checked.

Meanwhile, if a size is W×H, and x component of the top-left sample position of the current block is 0 and y component thereof is 0, the bottom-left corner neighboring block may be a block including a sample at coordinates (−1, H); the left neighboring block, a block including a sample at coordinates (−1, H−1); the top-right corner neighboring block, a block including a sample at coordinates (W, −1); the top neighboring block, a block including a sample at coordinates (W−1, −1); and the top-left corner neighboring block, a block including a sample at coordinates (−1, −1). That is, the left neighboring block may be a left neighboring block among the left neighboring blocks of the current block, which is located lowermost, and the top neighboring block may be a top neighboring block among the top neighboring blocks of the current block, which is located leftmost.

Further, as one example, when a constructed affine MVP candidate is available, the affine MVP candidate list may include the constructed affine MVP candidate. The decoding apparatus may check whether the constructed affine MVP candidate of the current block is available, and when the constructed affine MVP candidate is available, the constructed affine MVP candidate may be derived. Further, for example, after the inherited affine MVP candidate has been derived, the constructed affine MVP candidate may be derived. When the number of the derived affine MVP candidate (i.e., the inherited affine MVP candidate) is less than two and the constructed affine MVP candidate is available, the affine MVP candidate list may include the constructed affine MVP candidate. Here, the constructed affine MVP candidate may include candidate motion vectors for the CPs. The constructed affine MVP candidate may be available when all the candidate motion vectors are available.

For example, when the 4-affine motion model is applied to the current block, the CPs of the current block may include CP0 and CP1. When the motion vector for the CP0 is available and the motion vector for the CP1 is available, the constructed affine MVP candidate may be available, and the affine MVP candidate list may include the constructed affine MVP candidate. Here, the CP0 may represent a top-left position of the current block, and the CP1 may represent a top-right position of the current block.

The constructed affine MVP candidate may include a candidate motion vector for the CP0 and a candidate motion vector for the CP1. The candidate motion vector for the CP0 may be a motion vector of a first block, and the candidate motion vector for the CP1 may be a motion vector of a second block.

Further, the first block may be a block which has been first confirmed while checking neighboring blocks in the first group in a first specific order to be that a reference picture thereof is the same as a reference picture of the current block. That is, the candidate motion vector for the CP1 may be a motion vector of a block which has been first confirmed while checking neighboring blocks in the first group in a first specific order to be that a reference picture thereof is the same as a reference picture of the current block. The being available may represent that the neighboring block exists, and that the neighboring block is coded in inter prediction.

Here, when the reference picture of the first block in the first group is the same as the reference picture of the current block, the candidate motion vector for the CP0 may be available. Further, for example, the first group may include the neighboring block A, the neighboring block B, and the neighboring block C, and the first specific order may be an order from the neighboring block A to the neighboring block B, and then to the neighboring block C.

Further, the second block may be a block which has been first confirmed while checking neighboring blocks in the second group in a second specific order to be that a reference picture thereof is the same as a reference picture of the current block. Here, when the reference picture of the second block in the second group is the same as the reference picture of the current block, a candidate motion vector for the CP1 may be available. Further, for example, the second group may include the neighboring block D and the neighboring block E, and the second specific order may be an order from the neighboring block D to the neighboring block E.

Meanwhile, if a size of the current block is W×H, and x component of the top-left sample position of the current block is 0 and y component thereof is 0, the neighboring block A may be a block including a sample at coordinates (−1, −1); the neighboring block B, a block including a sample at coordinates (0, −1); the neighboring block C, a block including a sample at coordinates (−1, 0); the neighboring block D, a block including a sample at coordinates (W−1, −1); and the neighboring block E, a block including a sample at coordinates (W, −1). That is, the neighboring block A may be the top-left corner neighboring block of the current block; the neighboring block B, the top neighboring block among the top neighboring blocks of the current block, which is located leftmost; the neighboring block C, the left neighboring block among the left neighboring blocks of the current block, which is located uppermost; the neighboring block D, the top neighboring block among the top neighboring blocks of the current block, which is located rightmost; and the neighboring block E, the top-right corner neighboring block of the current block.

Meanwhile, when at least one of the candidate motion vector of the CP0 and the candidate motion vector of the CP1 is not available, the constructed affine MVP candidate may not be available.

Alternatively, for example, when the 6-affine motion model is applied to the current block, the CPs of the current block may include CP0, CP1 and CP2. When the motion vector for the CP0 is available and the motion vector for the CP1 is available and the motion vector for the CP2 is available, the constructed affine MVP candidate may be available, and the affine MVP candidate list may include the constructed affine MVP candidate. Here, the CP0 may represent a top-left position of the current block; the CP1, a top-right position of the current block; and the CP2, a bottom-left position of the current block.

The constructed affine MVP candidate may include the candidate motion vector for the CP0, the candidate motion vector for the CP1, and the candidate motion vector for the CP2. The candidate motion vector for the CP0 may be a motion vector of a first block, the candidate motion vector for the CP1 may be a motion vector of a second block, and the candidate motion vector for the CP2 may be a motion vector of a third block.

Further, the first block may be a block which has been first confirmed while checking neighboring blocks in the first group in a first specific order to be that a reference picture thereof is the same as a reference picture of the current block. Here, when the reference picture of the first block in the first group is the same as the reference picture of the current block, the candidate motion vector for the CP0 may be available. Further, for example, the first group may include the neighboring block A, the neighboring block B, and the neighboring block C, and the first specific order may be an order from the neighboring block A to the neighboring block B, and then to the neighboring block C.

Further, the second block may be a block which has been first confirmed while checking neighboring blocks in the second group in a second specific order to be that a reference picture thereof is the same as a reference picture of the current block. Here, when the reference picture of the second block in the second group is the same as the reference picture of the current block, a candidate motion vector for the CP1 may be available. Further, for example, the second group may include the neighboring block D and the neighboring block E, and the second specific order may be an order from the neighboring block D to the neighboring block E.

Further, the third block may be a block which has been first confirmed while checking neighboring blocks in the third group in a third specific order to be that a reference picture thereof is the same as a reference picture of the current block. Here, when the reference picture of the third block in the third group is the same as the reference picture of the current block, the candidate motion vector for the CP2 may be available. Further, for example, the third group may include the neighboring block F, and the neighboring block G, and the third specific order may be an order from the neighboring block F to the neighboring block G.

Meanwhile, if a size of the current block is W×H, and x component of the top-left sample position of the current block is 0 and y component thereof is 0, the neighboring block A may be a block including a sample at coordinates (−1, −1); the neighboring block B, a block including a sample at coordinates (0, −1); the neighboring block C, a block including a sample at coordinates (−1, 0); the neighboring block D, a block including a sample at coordinates (W−1, −1); the neighboring block E, a block including a sample at coordinates (W, −1); the neighboring block F, a block including a sample at coordinates (−1, H−1); and the neighboring block G, a block including a sample at coordinates (−1, H). That is, the neighboring block A may be the top-left corner neighboring block of the current block; the neighboring block B, the top neighboring block among the top neighboring blocks of the current block, which is located leftmost; the neighboring block C, the left neighboring block among the left neighboring blocks of the current block, which is located uppermost; the neighboring block D, the top neighboring block among the top neighboring blocks of the current block, which is located rightmost; the neighboring block E, the top-right corner neighboring block of the current block; the neighboring block F, the left neighboring block among the left neighboring blocks of the current block, which is located lowermost; and the neighboring block G, the bottom-left corner neighboring block of the current block.

Meanwhile, when at least one of the candidate motion vector of the CP0, the candidate motion vector of the CP1, and the candidate motion vector of CP2 is not available, the constructed affine MVP candidate may not be available.

After this, the affine MVP candidate list may be derived based on below-described steps in a particular order.

For example, when the number of the derived affine MVP candidate is less than two, and the motion vector for the CP0 is available, the decoding apparatus may derive a first affine MVP candidate. Here, the first affine MVP candidate may be an affine MVP candidate including a motion vector for the CP0 as candidate motion vectors for the CPs.

Further, for example, when the number of the derived affine MVP candidate is less than two, and the motion vector for the CP1 is available, the decoding apparatus may derive a second affine MVP candidate. Here, the second affine MVP candidate may be an affine MVP candidate including a motion vector for the CP1 as candidate motion vectors for the CPs.

Further, for example, when the number of the derived affine MVP candidate is less than two, and the motion vector for the CP2 is available, the decoding apparatus may derive a third affine MVP candidate. Here, the third affine MVP candidate may be an affine MVP candidate including a motion vector for the CP2 as candidate motion vectors for the CPs.

Further, for example, when the number of the derived affine MVP candidate is less than two, the decoding apparatus may derive a fourth affine MVP candidate including as candidate motion vectors for the CPs a temporal MVP derived based on the temporal neighboring block of the current block. The temporal neighboring block may represent a collocated block in a collocated picture corresponding to the current block. The temporal MVP may be derived based on a motion vector of the temporal neighboring block.

Further, for example, when the number of the derived affine MVP candidate is less than two, the decoding apparatus may derive a fifth affine MVP candidate including a zero motion vector as candidate motion vectors for the CPs. The zero motion vector may represent a motion vector whose value is zero.

The decoding apparatus derives control point motion vector predictors (CPMVPs) for control points (CPs) of the current block based on the affine MVP candidate list (S2620).

The decoding apparatus may select a specific affine MVP candidate from among the affine MVP candidates included in the affine MVP candidate list, and may derive the selected affine MVP candidate as CPMVPs for the CPs of the current block. For example, the decoding apparatus may obtain the affine MVP candidate index for the current block from the bitstream, and may derive as CPMVPs for the CPs of the current block the affine MVP candidate among the affine MVP candidates included in the affine MVP candidate list, which the affine MVP candidate index indicates. Specifically, when the affine MVP candidate includes the candidate motion vector for CP0 and the candidate motion vector for CP1, the candidate motion vector for CP0 of the affine MVP candidate may be derived as the CPMVP of the CP0, and the candidate motion vector for CP1 of the affine MVP candidate may be derived as the CPMVP of the CP1. Further, when the affine MVP candidate includes the candidate motion vector for CP0, the candidate motion vector for CP1, and the candidate motion vector for CP2, the candidate motion vector for CP0 of the affine MVP candidate may be derived as CPMVP of the CP0, the candidate motion vector for CP1 of the affine MVP candidate may be derived as CPMVP of the CP1, and the candidate motion vector for CP2 of the affine MVP candidate may be derived as CPMVP of the CP2. Further, when the affine MVP candidate includes the candidate motion vector for CP0 and the candidate motion vector for CP2, the candidate motion vector for CP0 of the affine MVP candidate may be derived as the CPMVP of the CP0, and the candidate motion vector for CP2 of the affine MVP candidate may be derived as the CPMVP of the CP2.

The decoding apparatus derives control point motion vector differences (CPMVDs) for the CPs of the current block based on the motion prediction information (S2630). The motion prediction information may include information on CPMVD for the respective CPs, and the decoding apparatus may derive the CPMVD for the respective CPs of the current block based on information on the CPMVD for the respective CPs.

The decoding apparatus derives control point motion vectors (CPMVs) for the CPs of the current block based on the CPMVPs and the CPMVDs (S2640). The decoding apparatus may derive CPMV for each CP based on CPMVD and CPMVP for the respective CPs. For example, the decoding apparatus may derive CPMV for the CP by adding CPMVD and CPMVP for each CP.

The decoding apparatus may derive the prediction samples for the current block based on the CPMVs (S2650). The decoding apparatus may derive motion vectors of sub-block units or sample units of the current block based on the CPMVs. That is, the decoding apparatus may derive motion vector of each sub-block or each sample of the current block based on the CPMVs. The motion vectors of the sub-block units or the sample units may be derived based on above-described Equation 1 or Equation 3. The motion vectors may be represented as an affine motion vector field (MVF) or a motion vector array The decoding apparatus may derive prediction samples for the current block based on motion vectors of the sub-block units or the sample units. The decoding apparatus may derive a reference area in a reference picture based on motion vectors of the sub-block unit or the sample unit, and generate a prediction sample of the current block based on reconstructed sample in the reference area.

The decoding apparatus generates a reconstructed picture for the current block based on the derived prediction samples (S2660). The decoding apparatus may generate a reconstructed picture for the current block based on the derived prediction samples. The decoding apparatus may use a prediction sample directly as a reconstructed sample according to prediction mode, or may generate a reconstructed sample by adding a residual sample to the prediction sample. If there exists a residual sample for the current block, the decoding apparatus may acquire information on residual for the current block from the bitstream. The information on residual may include a transform coefficient relating to the residual sample. The decoding apparatus may derive the residual sample (or residual sample array) for the current block based on information on the residual. The decoding apparatus may generate a reconstructed sample based on the prediction sample and the residual sample, and derive a reconstructed block or reconstructed picture based on the reconstructed sample. After this, as described above, the decoding apparatus may apply an in-loop filtering procedure such as an SAO procedure and/or deblocking filtering to the reconstructed picture in order to improve subjective/objective video quality as needed.

Figure 27:
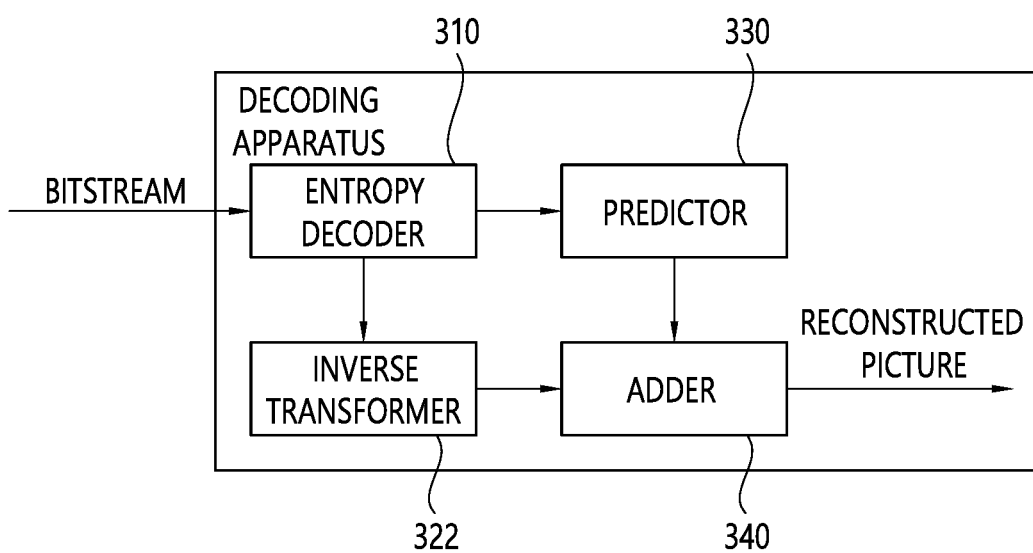
FIG. 27 schematically represents a decoding apparatus performing an image decoding method according to the present document.

FIG. 27 schematically represents a decoding apparatus performing an image decoding method according to the document. The method disclosed in FIG. 26 may be performed by the decoding apparatus disclosed in FIG. 27. Specifically, for example, an entropy decoder of the decoding apparatus of FIG. 27 may perform S2600 of FIG. 26; a predictor of the decoding apparatus of FIG. 27, S2610 to S2650 of FIG. 26; and an adder of the decoding apparatus of FIG. 27, S2660 of FIG. 26. Further, although not shown, the process of obtaining image information including information on residual of the current block through a bitstream may be performed by the entropy decoder of the decoding apparatus of FIG. 27, and the process of deriving the residual sample for the current block based on the residual information may be performed by the inverse transformer of the decoding apparatus of FIG. 27.

According to the above-described present document, it is possible to increase the efficiency of image coding based on the affine motion prediction.

Further, according to the present document, in deriving the affine MVP candidate list, only when all the candidate motion vectors for the CPs of the constructed affine MVP candidate are available, the constructed affine MVP candidate may be added, through which it is possible to reduce the complexity of the process of deriving the constructed affine MVP candidate and the process of configuring the affine MVP candidate list, and to improve the coding efficiency.

Further, according to the present document, in deriving the affine MVP candidate list, the additional affine MVP candidate may be derived based on the candidate motion vector for the CP derived in the process of deriving the constructed affine MVP candidate, through which it is possible to reduce the complexity of the process of configuring the affine MVP candidate list, and to improve the coding efficiency.

Further, according to the present document, in the process of deriving the inherited affine MVP candidate, only when the top neighboring block is included in the current CTU, the inherited affine MVP candidate may be derived using the top neighboring block, through which it is possible to reduce the storing amount of the line buffer for affine prediction, and to minimize hardware costs.

In the above-described embodiment, the methods are explained on the basis of a flowchart by means of a series of steps or blocks, but the present document is not limited to the order of steps, and a certain step may occur in a different order or concurrently with other steps than those described above. Further, it may be understood by a person having ordinary skill in the art that the steps shown in a flowchart is not exclusive, and that another step may be incorporated or one or more steps of the flowchart may be removed without affecting the scope of the present document.

Further, embodiments described in the present document may be embodied and performed on a processor, a microprocessor, a controller or a chip. For example, function units shown in each drawing may be embodied and performed on a processor, a microprocessor, a controller or a chip. In this case, information or algorithm for embodying (e.g., information on instruction) may be stored in a digital storage medium.

Further, the decoding apparatus and the encoding apparatus to which the present document is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an internet streaming service providing device, a three-dimensional (3D) video device, a video telephony video device, a transportation means terminal (e.g., a vehicle terminal, an aircraft terminal, a ship terminal, etc.) and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present document is applied may be produced in the form of a program executed by a computer, and be stored in a computer-readable recording medium. Multimedia data having a data structure according to the present document may be also stored in a computer-readable recording medium. The computer-readable recording medium includes all kinds of storage devices and distribution storage devices in which computer-readable data are stored. The computer-readable recording medium may include, for example, a Blu-ray Disc (BD), a Universal Serial Bus (USB), a ROM, a PROM, an EPROM, an EEPROM, a RAM, a CD-ROM, a magnetic tape, a floppy disk and an optical data storage device. Further, the computer-readable recording medium also includes media embodied in the form of a carrier wave (for example, transmission over the Internet). In addition, the bit stream generated by the encoding method may be stored in a computer-readable recording medium or transmitted through a wired or wireless communication network.

Additionally, the embodiment of the present document may be embodied as a computer program product by program codes, and the program codes may be performed in a computer by the embodiment of the present document. The program codes may be stored on a computer-readable carrier.

Figure 28:
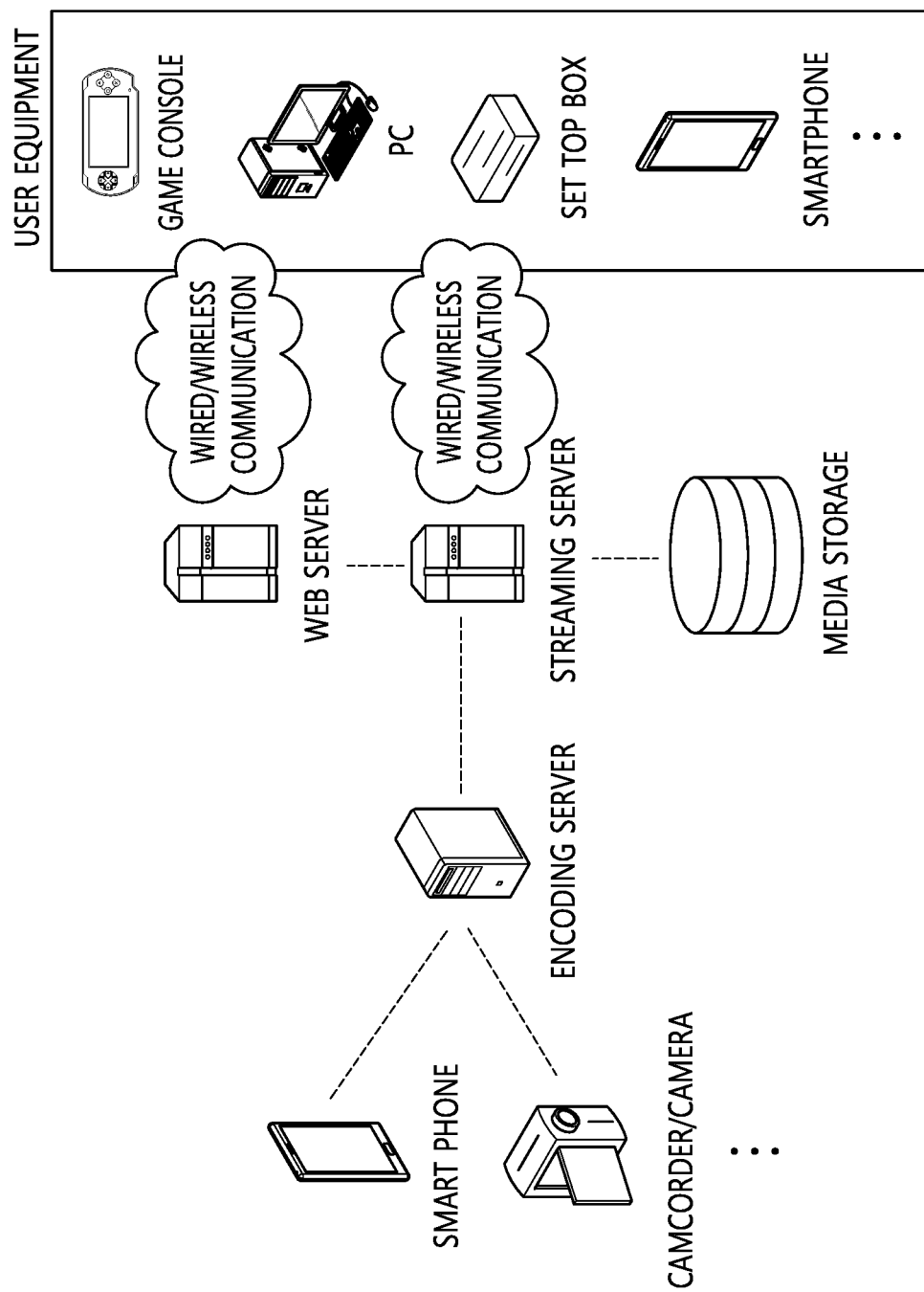
FIG. 28 illustratively represents a contents streaming system structure diagram to which the embodiments disclosed in the present document may be applied.

FIG. 28 represents an example of a contents streaming system to which the embodiments disclosed in the present document may be applied.

Referring to FIG. 28, the content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like. Each server in the content streaming system may be operated as a distributed server, in which case data received from each server may be distributed.

Each of servers in the contents streaming system may be operated as a distributed server, and in this case, data received by each server may be distributedly processed.

What is claimed is:

1. An image decoding method, by a decoding apparatus, comprising:
   obtaining motion prediction information for a current block from a bitstream;
   configuring an affine motion vector predictor (MVP) candidate list for the current block;
   deriving control point motion vector predictors (CPMVPs) for control points (CPs) of the current block based on the affine MVP candidate list;
   deriving control point motion vector differences (CPMVDs) for CPs of the current block based on the motion prediction information;
   deriving control point motion vectors (CPMVs) for CPs of the current block based on the CPMVPs and the CPMVDs;
   deriving prediction samples for the current block based on the CPMVs; and
   generating a reconstructed picture for the current block based on the derived prediction samples,
   wherein the configuring of the affine MVP candidate list comprises:
   checking whether a first affine MVP candidate is available,
   checking whether a second affine MVP candidate is available, and
   checking whether a third affine MVP candidate available when a number of the available affine MVP candidate is less than 2,
   wherein the first affine MVP candidate is available based on a first block in a left block group being coded with an affine motion model and a reference picture of the first block being same as a reference picture of the current block;
   wherein the second affine MVP candidate is available based on a second block in a top block group being coded with the affine motion model and a reference picture of the second block being same as a reference picture of the current block,
   wherein a 4-parameter affine mode is used to an inter prediction,
   wherein for the 4-parameter affine model being used to the inter prediction, the third MVP affine candidate is available based on a first motion vector for CP0 of the current block and a second motion vector for CP1 of the current block being derived from a top-left block group of the current block and a top-right block group of the current block respectively,
   wherein the left block group includes a bottom-left corner neighboring block of the current block, and a first left neighboring block adjacent to an upper side of the bottom-left corner neighboring block, and
   the top block group includes a top-right corner neighboring block of the current block, a first top neighboring block adjacent to a left side of the top-right corner neighboring block, and a top-left corner block; and
   wherein the top-left block group includes a top-left corner neighboring block of the current block, a second left neighboring block adjacent to a bottom side of the top-left corner neighboring block, and a second top neighboring block adjacent to a right side of the top-left corner neighboring block, and the top-right block group includes a top-right corner neighboring block and a top neighboring block.

2. The image decoding method of claim 1, wherein the configuring of the affine MVP candidate list comprises;
   deriving a fourth affine MVP candidate to a sixth affine MVP candidate based on the number of available affine MVP candidates being less than 2,
   wherein the fourth affine MVP candidate to the sixth affine MVP candidate include an available first motion vector for the CP0, an available second motion vector for the CP1 and an available third motion vector for CP2 as candidate motion vectors for the CPs.

3. The image decoding method of claim 2, wherein the configuring of the affine MVP candidate list comprises;
   deriving a seventh affine MVP candidate including a temporal MVP as candidate motion vectors for the CPs based on the number of available affine MVP candidates being less than 2 and the temporal MVP candidate derived based on the temporal neighboring block of the current block being available, and
   deriving an eighth affine MVP candidate including a zero motion vector as candidate motion vectors for the CPs based on the number of available affine MVP candidates being less than 2.

4. The image decoding method of claim 2, wherein a candidate motion vector for the CP0 is available based on a reference picture of a first block in a first group being same as a reference picture of the current block,
   a candidate motion vector for the CP1 is available based on a reference picture of a second block in a second group being same as a reference picture of the current block,
   a candidate motion vector for the CP2 is available based on a reference picture of a third block in a third group being same as a reference picture of the current block, and
   the affine MVP candidate list includes the affine MVP candidate based on the candidate motion vector for the CP0 being available, the candidate motion vector for the CP1 being available, and the candidate motion vector for the CP2 being available.

5. The image decoding method of claim 4, wherein the first group includes a neighboring block A, a neighboring block B and a neighboring block C,
   the second group includes a neighboring block D and a neighboring block E,
   the third group includes a neighboring block F and a neighboring block G, and
   wherein the neighboring block A is a block including a sample at coordinates (−1, −1), the neighboring block B is a block including a sample at coordinates (0, −1), the neighboring block C is a block including a sample at coordinates (−1, 0), the neighboring block D is a block including a sample at coordinates (W−1, −1), the neighboring block E is a block including a sample at coordinates (W, −1), the neighboring block F is a block including a sample at coordinates (−1, H−1), and the neighboring block G is a block including a sample at coordinates (−1, H) based on a size of the current block being W×H, and an x component of a top-left sample position of the current block being 0 and a y component thereof being 0.

6. The image decoding method of claim 5, wherein the first block is a block which has been first confirmed while checking neighboring blocks in the first group in a first predetermined order to be that a reference picture thereof is the same as a reference picture of the current block, the second block is a block which has been first confirmed while checking neighboring blocks in the second group in a second predetermined order to be that a reference picture thereof is the same as a reference picture of the current block, and the third block is a block which has been first confirmed while checking neighboring blocks in the third group in a third predetermined order to be that a reference picture thereof is the same as a reference picture of the current block.

7. The image decoding method of claim 6, wherein the first predetermined order is an order from the neighboring block A to the neighboring block B, and then to the neighboring block C, the second predetermined order is an order from the neighboring block D to the neighboring block E, and the third predetermined order is an order from the neighboring block F to the neighboring block G.

8. An image encoding method, by an encoding apparatus, comprising:

configuring an affine motion vector predictor (MVP) candidate list for a current block;

deriving control point motion vector predictors (CPMVPs) for control points (CPs) of the current block based on the affine MVP candidate list;

deriving control point motion vectors (CPMVs) for the CPs of the current block;

deriving control point motion vector differences (CPMVDs) for CPs of the current block based on the CPMVPs and the CPMVs; and encoding motion prediction information including information on the CPMVDs, wherein the configuring of the affine MVP candidate list comprises:

checking whether a first affine MVP candidate is available;

checking whether a second affine MVP candidate is available, and checking whether a third affine MVP candidate available based on a number of the available affine MVP candidate is less than 2, wherein the first affine MVP candidate is available based on a first block in a left block group being coded with an affine motion model and a reference picture of the first block being same as a reference picture of the current block;

wherein the second affine MVP candidate is available based on a second block in a top block group being coded with the affine motion model and a reference picture of the second block being same as a reference picture of the current block, wherein a 4-parameter affine mode is used to an inter prediction, wherein for the 4-parameter affine model being used to the inter prediction, the third MVP affine candidate is available based on a first motion vector for CP0 of the current block and a second motion vector for CP1 of the current block being derived from a top-left block group of the current block and a top-right block group of the current block respectively, wherein the left block group includes a bottom-left corner neighboring block of the current block, and a first left neighboring block adjacent to an upper side of the bottom-left corner neighboring block, and the top block group includes a top-right corner neighboring block of the current block, a first top neighboring block adjacent to a left side of the top-right corner neighboring block, and a top-left corner block; and wherein the top-left block group includes a top-left corner neighboring block of the current block, a second left neighboring block adjacent to a bottom side of the top-left corner neighboring block, and a second top neighboring block adjacent to a right side of the top-left corner neighboring block, and the top-right block group includes a top-right corner neighboring block and a top neighboring block.

9. The image encoding method of claim 8, wherein the configuring of the affine MVP candidate list comprises;

deriving a fourth affine MVP candidate to a sixth affine MVP candidate based on the number of available affine MVP candidates being less than 2, wherein the fourth affine MVP candidate to the sixth affine MVP candidate include an available first motion vector for the CP0, an available second motion vector for the CP1 and an available third motion vector for CP2 as candidate motion vectors for the CPs.

10. The image encoding method of claim 8, wherein a candidate motion vector for the CP0 is available based on a reference picture of a first block in a first group being same as a reference picture of the current block, a candidate motion vector for the CP1 is available based on a reference picture of a second block in a second group being same as a reference picture of the current block, a candidate motion vector for the CP2 is available based on a reference picture of a third block in a third group being same as a reference picture of the current block, and the affine MVP candidate list includes the affine MVP candidate based on the candidate motion vector for the CP0 being available, the candidate motion vector for the CP1 being available and the candidate motion vector for the CP2 being available.

11. The image encoding method of claim 10, wherein the first block is a block which has been first confirmed while checking neighboring blocks in the first group in a first predetermined order to be that a reference picture thereof is the same as a reference picture of the current block, the second block is a block which has been first confirmed while checking neighboring blocks in the second group in a second predetermined order to be that a reference picture thereof is the same as a reference picture of the current block, and the third block is a block which has been first confirmed while checking neighboring blocks in the third group in a third predetermined order to be that a reference picture thereof is the same as a reference picture of the current block.

12. A non-transitory computer readable storage medium storing a bitstream generated by a method, the method comprising;

configuring an affine motion vector predictor (MVP) candidate list for a current block;

deriving control point motion vector predictors (CPMVPs) for control points (CPs) of the current block based on the affine MVP candidate list;

deriving control point motion vectors (CPMVs) for the CPs of the current block;

deriving control point motion vector differences (CPMVDs) for CPs of the current block based on the CPMVPs and the CPMVs; and encoding motion prediction information including information on the CPMVDs to the bitstream,
wherein the configuring of the affine MVP candidate list comprises:
checking whether a first affine MVP candidate is available,
checking whether a second affine MVP candidate is available, and
checking whether a third affine MVP candidate available when a number of the available affine MVP candidate is less than 2,
wherein the first affine MVP candidate is available based on a first block in a left block group being coded with an affine motion model and a reference picture of the first block being same as a reference picture of the current block;
wherein the second affine MVP candidate is available based on a second block in a top block group being coded with the affine motion model and a reference picture of the second block being same as a reference picture of the current block,
wherein a 4-parameter affine mode is used to an inter prediction,
wherein for the 4-parameter affine model being used to the inter prediction, the third MVP affine candidate is available based on a first motion vector for CP0 of the current block and a second motion vector for CP1 of the current block being derived from a top-left block group of the current block and a top-right block group of the current block respectively,
wherein the left block group includes a bottom-left corner neighboring block of the current block, and a first left neighboring block adjacent to an upper side of the bottom-left corner neighboring block, and
the top block group includes a top-right corner neighboring block of the current block, a first top neighboring block adjacent to a left side of the top-right corner neighboring block, and a top-left corner block; and
wherein the top-left block group includes a top-left corner neighboring block of the current block, a second left neighboring block adjacent to a bottom side of the top-left corner neighboring block, and a second top neighboring block adjacent to a right side of the top-left corner neighboring block, and the top-right block group includes a top-right corner neighboring block and a top neighboring block.

* * * * *